(12) United States Patent
Dayanandan et al.

(10) Patent No.: US 10,182,438 B2
(45) Date of Patent: Jan. 15, 2019

(54) METHODS AND APPARATUSES FOR GRAPHICALLY INDICATING STATION EFFICIENCY AND PSEUDO-DYNAMIC ERROR VECTOR MAGNITUDE INFORMATION FOR A NETWORK OF WIRELESS STATIONS

(71) Applicant: Ubiquiti Networks, Inc., New York, NY (US)

(72) Inventors: Sriram Dayanandan, Dublin, CA (US); Vish Ponnampalam, Palo Alto, CA (US); Robert J. Pera, Seattle, WA (US)

(73) Assignee: Ubiquiti Networks, Inc., New York, NY (US)

( * ) Notice: Subject to any disclaimer, the term of this patent is extended or adjusted under 35 U.S.C. 154(b) by 66 days.

(21) Appl. No.: 14/753,952

(22) Filed: Jun. 29, 2015

(65) Prior Publication Data

US 2016/0066200 A1    Mar. 3, 2016

Related U.S. Application Data

(60) Provisional application No. 62/044,298, filed on Aug. 31, 2014, provisional application No. 62/085,218, (Continued)

(51) Int. Cl.
*H04W 72/04* (2009.01)
*H04W 72/06* (2009.01)
(Continued)

(52) U.S. Cl.
CPC ....... *H04W 72/0453* (2013.01); *H04W 16/00* (2013.01); *H04W 24/02* (2013.01); (Continued)

(58) Field of Classification Search
None
See application file for complete search history.

(56) References Cited

U.S. PATENT DOCUMENTS 4,060,716 A    11/1977 Pekrul et al.
5,131,006 A    7/1992 Kamerman et al.
(Continued)

FOREIGN PATENT DOCUMENTS

JP    2007074193 A    3/2007
KR    10-2013-0141939    12/2013
(Continued)

OTHER PUBLICATIONS

Pera et al.; U.S. Appl. No. 15/276,527 entitled "Compact and integrated key controller apparatus for monitoring networks," filed Sep. 26, 2016.
(Continued)

*Primary Examiner* — Nicholas Sloms
(74) *Attorney, Agent, or Firm* — Shay Glenn LLP

(57) ABSTRACT

Methods and apparatuses providing a visual metric of the efficiency of a network of devices communicating through a wireless access point (AP). These apparatuses and methods may also determine and display pseudo-dynamic error vector magnitude (EVM) information for a network of wireless stations, including displaying a pseudo-dynamic constellation diagrams using EVM information. These methods and apparatuses may transmit a plurality of sounding packets from each of one or more radio devices different modulation types (e.g., BPSK, QPSK, 16QAM, 64QAM, 256QAM and 1024QAM), and receiving at least some of the sounding packets at a second radio device (e.g., an access point) and determining EVM information from the received sounding packets, and displaying (or providing for display) a constellation diagram including pseudo-dynamic EVM information
(Continued)

US 10,182,438 B2

Page 2 that is a constrained approximation of actual EVM information.

20 Claims, 34 Drawing Sheets

Related U.S. Application Data filed on Nov. 26, 2014, provisional application No. 62/104,669, filed on Jan. 16, 2015.

(51) Int. Cl.
| | |
|---|---|
| H04W 24/02 | (2009.01) |
| H04W 16/00 | (2009.01) |
| H04W 88/08 | (2009.01) |
| H04L 12/26 | (2006.01) |
| H04L 12/24 | (2006.01) |
| H04W 24/04 | (2009.01) |

(52) U.S. Cl.
CPC ............ *H04W 72/06* (2013.01); *H04L 41/22* (2013.01); *H04L 43/0817* (2013.01); *H04W 24/04* (2013.01); *H04W 88/08* (2013.01)

(56) References Cited

U.S. PATENT DOCUMENTS

| | | | |
|---|---|---|---|
| 5,151,920 A | 9/1992 | Haagh et al. |
| 5,295,154 A | 3/1994 | Meier et al. |
| 5,406,260 A | 4/1995 | Cummings et al. |
| 5,422,887 A | 6/1995 | Diepstraten et al. |
| 5,428,636 A | 6/1995 | Meier |
| 5,504,746 A | 4/1996 | Meier |
| 5,546,397 A | 8/1996 | Mahany |
| 5,706,428 A | 1/1998 | Boer et al. |
| 5,740,366 A | 4/1998 | Mahany et al. |
| 5,844,893 A | 12/1998 | Gollnick et al. |
| 5,936,542 A | 8/1999 | Kleinrock et al. |
| 5,940,771 A | 8/1999 | Gollnick et al. |
| 6,032,105 A | 2/2000 | Lee et al. |
| 6,130,892 A | 10/2000 | Short et al. |
| 6,194,992 B1 | 2/2001 | Short et al. |
| 6,337,990 B1 | 1/2002 | Koshino |
| 6,374,311 B1 | 4/2002 | Mahany et al. |
| 6,563,786 B1 | 5/2003 | Van Nee |
| 6,636,894 B1 | 10/2003 | Short et al. |
| 6,665,536 B1 | 12/2003 | Mahany |
| 6,697,415 B1 | 2/2004 | Mahany |
| 6,714,559 B1 | 3/2004 | Meier |
| 6,789,110 B1 | 9/2004 | Short et al. |
| 6,795,852 B1 | 9/2004 | Kleinrock et al. |
| 6,810,426 B2 | 10/2004 | Mysore et al. |
| 6,857,009 B1 | 2/2005 | Ferreria et al. |
| 6,868,399 B1 | 3/2005 | Short et al. |
| 7,020,082 B2 | 3/2006 | Bhagavath et al. |
| 7,088,727 B1 | 8/2006 | Short et al. |
| 7,117,526 B1 | 10/2006 | Short |
| 7,194,554 B1 | 3/2007 | Short et al. |
| 7,197,556 B1 | 3/2007 | Short et al. |
| 7,254,191 B2 | 8/2007 | Sugar et al. |
| 7,295,812 B2 | 11/2007 | Haapoja et al. |
| 7,386,002 B2 | 6/2008 | Meier |
| 7,457,646 B2 | 11/2008 | Mahany et al. |
| 7,739,383 B1 | 6/2010 | Short et al. |
| 7,752,334 B2 | 7/2010 | Paunikar et al. |
| 7,826,426 B1 | 11/2010 | Bharghavan et al. |
| 8,077,113 B2 | 12/2011 | Syed et al. |
| 8,190,708 B1 | 5/2012 | Short et al. |
| 8,335,272 B2 | 12/2012 | Roberts |
| 8,483,188 B2 | 7/2013 | Walton et al. |
| 8,804,732 B1 | 8/2014 | Hepting et al. |
| 8,836,601 B2 | 9/2014 | Sanford et al. |
| 8,967,460 B1 | 3/2015 | Baykal et al. |
| 9,078,137 B1 | 7/2015 | Chechani et al. |
| 9,154,970 B1 | 10/2015 | Gatmir-Motahari et al. |
| 9,172,605 B2 | 10/2015 | Hardy et al. |
| 9,516,700 B1 | 12/2016 | Rybak et al. |
| 9,838,927 B2 | 12/2017 | Bergström et al. |
| 2003/0198200 A1 | 10/2003 | Diener et al. |
| 2004/0143428 A1 | 7/2004 | Rappaport et al. |
| 2004/0242274 A1 | 12/2004 | Corbett et al. |
| 2007/0032254 A1 | 2/2007 | Chen |
| 2007/0070691 A1* | 3/2007 | Walvis ............... H04L 27/2601 |
| | | 365/185.03 |
| 2007/0099660 A1 | 5/2007 | Bhesania et al. |
| 2007/0201540 A1 | 8/2007 | Berkman |
| 2008/0049625 A1 | 2/2008 | Edwards et al. |
| 2009/0109867 A1 | 4/2009 | Mangetsu |
| 2009/0175181 A1* | 7/2009 | Kim ..................... H04L 1/0015 |
| | | 370/252 |
| 2009/0196173 A1 | 8/2009 | Wang et al. |
| 2009/0286484 A1 | 11/2009 | Phung et al. |
| 2010/0008237 A1* | 1/2010 | Olgaard ............. H04L 12/2697 |
| | | 370/249 |
| 2010/0124886 A1 | 5/2010 | Fordham et al. |
| 2010/0182983 A1 | 7/2010 | Herscovici et al. |
| 2010/0182984 A1 | 7/2010 | Herscovici et al. |
| 2010/0197317 A1 | 8/2010 | Sadek et al. |
| 2010/0278061 A1* | 11/2010 | Ezri ......................... H04L 1/20 |
| | | 370/252 |
| 2011/0090812 A1 | 4/2011 | Aoyama |
| 2011/0164700 A1 | 7/2011 | Porat et al. |
| 2011/0185059 A1 | 7/2011 | Adnani et al. |
| 2011/0211628 A1 | 9/2011 | Hammarwall et al. |
| 2011/0258678 A1 | 10/2011 | Cowling et al. |
| 2011/0287778 A1 | 11/2011 | Levin et al. |
| 2011/0317633 A1 | 12/2011 | Tan et al. |
| 2012/0061458 A1 | 3/2012 | Bahr et al. |
| 2012/0096271 A1 | 4/2012 | Ramarathinam et al. |
| 2012/0109719 A1 | 5/2012 | Parmar et al. |
| 2012/0122424 A1 | 5/2012 | Herscovici et al. |
| 2012/0188892 A1 | 7/2012 | Demilie et al. |
| 2012/0281000 A1 | 11/2012 | Woodings |
| 2012/0307927 A1 | 12/2012 | Nammi et al. |
| 2012/0317224 A1 | 12/2012 | Caldwell et al. |
| 2013/0017794 A1 | 1/2013 | Kloper et al. |
| 2013/0051441 A1 | 2/2013 | Cho et al. |
| 2013/0067564 A1 | 3/2013 | Fok Ah Cheun et al. |
| 2013/0081113 A1 | 3/2013 | Cherian et al. |
| 2013/0103836 A1 | 4/2013 | Baniqued et al. |
| 2013/0129091 A1 | 5/2013 | Kang et al. |
| 2013/0163653 A1* | 6/2013 | Hirschmann .......... H04B 17/00 |
| | | 375/224 |
| 2013/0201316 A1 | 8/2013 | Binder et al. |
| 2013/0205134 A1 | 8/2013 | Holtmanns et al. |
| 2013/0256407 A1 | 10/2013 | Su et al. |
| 2013/0333005 A1 | 12/2013 | Kim et al. |
| 2013/0340059 A1 | 12/2013 | Christopher et al. |
| 2014/0004865 A1 | 1/2014 | Bhargava et al. |
| 2014/0005809 A1 | 1/2014 | Frei et al. |
| 2014/0036805 A1 | 2/2014 | Sadek et al. |
| 2014/0041012 A1 | 2/2014 | Yeow et al. |
| 2014/0092884 A1 | 4/2014 | Murphy et al. |
| 2014/0115354 A1 | 4/2014 | Jabbaz et al. |
| 2014/0122298 A1 | 5/2014 | Oyer |
| 2014/0126403 A1 | 5/2014 | Siomina |
| 2014/0146764 A1 | 5/2014 | Kim et al. |
| 2014/0211890 A1 | 7/2014 | Adnani et al. |
| 2014/0269375 A1 | 9/2014 | Garcia et al. |
| 2014/0331298 A1 | 11/2014 | Baker et al. |
| 2015/0009901 A1 | 1/2015 | Gorajala Chandra et al. |
| 2015/0156645 A1 | 6/2015 | Ponnuswamy et al. |
| 2015/0163753 A1 | 6/2015 | Valliappan et al. |
| 2015/0245360 A1 | 8/2015 | Gao et al. |
| 2016/0014613 A1 | 1/2016 | Ponnampalam et al. |
| 2016/0014793 A1 | 1/2016 | Klemp et al. |
| 2016/0112257 A1 | 4/2016 | Hardy et al. |
| 2016/0135186 A1 | 5/2016 | Sun et al. |
| 2016/0143028 A1 | 5/2016 | Mancuso et al. |
| 2016/0226623 A1* | 8/2016 | Froberg Olsson .... H04L 1/0023 |
| 2016/0315781 A1 | 10/2016 | Dronadula et al. |

(56) References Cited

U.S. PATENT DOCUMENTS

2016/0323810 A1 11/2016 May
2017/0048243 A1 2/2017 Hardy et al.
2017/0374069 A1 12/2017 Hardy et al.

FOREIGN PATENT DOCUMENTS

| WO | WO98/40990 A1 | 9/1998 |
| WO | WO01/31855 A2 | 5/2001 |
| WO | WO01/31886 A2 | 5/2001 |
| WO | WO01/86877 A2 | 11/2001 |
| WO | WO2008/042804 A2 | 4/2008 |
| WO | WO2011/005710 A2 | 1/2011 |
| WO | WO2013/122591 A1 | 8/2013 |
| WO | WO2013/123445 A1 | 8/2013 |

OTHER PUBLICATIONS

ETSI; Reconfigurable radio systems(RRS) functional architecture (FA) for the managemennt and control of reconfigurable radio systems; ETSI TR 102 682 V1.1.1; 45 pages; retrieved from the internet (http://portal.etsi.org/webapp/WorkProgram/Report_WorkItem.asp?WKI_ID=28797); © Jul. 17, 2009.

Dayanandan et al.; U.S. Appl. No. 14/918,320 entitled "Methods and apparatuses for graphically indicating station efficiency and pseudo-dynamic error vector magnitude information for a network of wireless stations," filed Oct. 20, 2015.

Dayanandan et al.; U.S. Appl. No. 14/938,674 entitled "Methods and tools for persistent spectrum analysis of an operating radio frequency band," filed Nov. 11, 2015.

\* cited by examiner

```c
int _calc_packet_tx_airtime(struct ath_softc*      sc,
                            struct ath_buf*        bf,
                            const struct ath_desc* ds,
                            int*                   succ_dur,
                            int*                   fail_dur)
{
        int dur;
        struct ath_tx_status* tx_status;
        u_int8_t last_series_tries;
        u_int8_t last_series_idx;
        int i;

#ifdef ATHEROS_DRIVER_VERSION_9
        tx_status = &bf->bf_ts;
#else
        tx_status = &ds->ds_txstat;
endif define _MAX_RATE_SERIES 3 if(tx_status->ts_status & HAL_TXERR_XRETRY) {
            last_series_idx         = _MAX_RATE_SERIES;
            last_series_tries       = bf->bf_state.bfs_rcs[last_series_idx].tries;
            *succ_dur               = 0;
    } else {
            last_series_idx         = tx_status->ts_rateindex;
            last_series_tries       = tx_status->ts_shortretry + tx_status->ts_longretry;
            *succ_dur               =
bf->bf_state.bfs_rcs[last_series_idx].duration;
        } for(i = 0; i < last_series_idx; i++) {
                dur     += bf->bf_state.bfs_rcs[i].duration *
bf->bf_state.bfs_rcs[i].tries;

} dur += last_series_tries * bf->bf_state.bfs_rcs[last_series_idx].duration;

*fail_dur = dur;
        *fail_dur -= *succ_dur; /* Substract the last try duration as that was succesful
*/ return dur;
}
```

FIG. 3

```
void _do_sta_tx_stats_refresh(ubnt_poll_sta_t* sta)
{
    unsigned long ts;
    unsigned long diff;

ts      = UBNT_POLL_OS_TIMESTAMP();
    diff    = UBNT_POLL_OS_TIME_DIFF(ts, sta->last_airtime_calc_ts);

#define _AIRTIME_CALC_INT    5000 /* e.g. 5 seconds */
#define _AIRTIME_SCALE       1000
#define _PER_SCALE           1000
define _USECS_IN_MSECS      1000 if(diff > _AIRTIME_CALC_INT) { u_int32_t    usage;
        u_int32_t    per;

usage = (sta->tx_airtime_accum * _AIRTIME_SCALE)/(diff * _USECS_IN_MSECS);

/*
         * Packet error rate is weighted accordin to the packet duration as we
count
         * failed and succesful durations seperately.
         */ per        = (sta->tx_fail_dur * _PER_SCALE)/(sta->tx_success_dur +
sta->tx_fail_dur);

/*
         * This is using exponential averaging...
         * Moving average can also be used...
         */
```

FIG. 4A

```
            sta->tx_airtime_avg   = (sta->tx_airtime_avg + usage)/2;
            sta->tx_per_avg       = (sta->tx_per_avg + per)/2;

sta->tx_airtime_accum      = 0;
            sta->last_airtime_calc_ts  = ts;
            sta->tx_success_dur        = 0;
            sta->tx_fail_dur           = 0;
    } undef _AIRTIME_CALC_INT
undef _AIRTIME_SCALE
#undef _PER_SCALE
#undef _USECS_IN_MSECS
} void _do_sta_packet_accounting(struct ath_buf*     bf,
                               const struct ath_desc*  ds)
{
    wbuf_t    wbuf;
    struct ieee80211_frame*  wh;
    ubnt_poll_sta_t*   sta;
    u_int32_t          tx_airtime;
    int                succ_dur;
    int                fail_dur;

wbuf  = bf->bf_mpdu;
    wh    = (struct ieee80211_frame *)wbuf_header(wbuf);

if(wh == NULL)
        return;

/*
     * Lookup the STA
     */ if(poll_mode == UBNT_POLL_MODE_AP) {
            sta  = (ubnt_poll_sta_t*)ubnt_poll_hash_get(poll_data->ap_data.sta_hash,
wh->i_addr1, UBNT_POLL_MAC_ADDR_SZ);
    } else if(poll_mode == UBNT_POLL_MODE_STA) {
            sta = poll_data->sta_data.current_ap;
    } if(sta == NULL)
            return;

_do_sta_tx_stats_refresh(sta);

tx_airtime = _calc_packet_tx_airtime(bf, ds, &succ_dur, &fail_dur);

sta->tx_airtime_accum    += tx_airtime;
    sta->tx_fail_dur         += fail_dur;
    sta->tx_success_dur      += succ_dur;
}
```

FIG. 4B

| Variable | Description | Allowed Values |
|---|---|---|
| EVM_samples[NUM_EVM_SAMP] | vector of EVM values; each value corresponds to a pilot.<br><br>N, the number of pilots depends on the BW<br><br>N = 4 for 10 MHz, 20 MHz, 30 MHz<br><br>N = 6 for 40 MHz, 50 MHz and 60 MHz<br><br>N = 8 for 80 MHz. | each element of the of the vector is an integer whose value corresponds to EVM in dB. e.g. value of 5 denoted EVM of 5dB. |
| mod_type | denotes the modulation type | Integer in the range 1 to 5 where<br><br>1 denotes BPSK<br>2 denotes QPSK<br>3 denoted 16-QAM<br>4 denotes 64-QAM<br>5 denotes 256-QAM<br>6 denotes 1024-QAM (not used) |
| NUM_EVM_BINS<br>MIN_EVM<br>DEL_EVM | EVM value grid parameters | defaults<br>NUM_EVM_BINS = 41<br>MIN_EVM = 0<br>DEL_EVM = 1 |
| NUM_PRB_BINS<br>MIN_PRB<br>DEL_PRB | probability value grid | defaults<br>NUM_PRB_BINS = 8<br>MIN_PRB = 0<br>DEL_PRB = 0.05 |

FIG. 10

EVM MEASURE REQUEST evm_meas:

| U8 packet_id | U8 rate_id | U8 beam_id |
|---|---|---|

This packet is sent at different rates (e.g., one of two or more or three or more). The rate is specified in the rate_id field.

The packet_id increments every time a packet is sent using the rate. i.e. it is rate specific packet identifier.

The beam_id is the phased-array beam used to send the packet.

FIG. 11A

EVM REPORT
feedback for all the rates in the set. The feedback is a snapshot of the last 64 samples for each rate.

```
struct ubnt_poll_host_evm_info{
u8 rate_id; /* The Rate ID */
u8 packet_id; /* The starting packet number */
u8 start_idx; /* The starting index in the array */
struct {
u8 samples_evm[UBNT_POLL_HOST_EVM_NUM_SAMPLES];
u8 samples_rssi[UBNT_POLL_HOST_EVM_NUM_SAMPLES];
}streams[UBNT_POLL_HOST_EVM_STREAMS];
};
typedef struct ubnt_poll_host_evm_info ubnt_poll_host_evm_info_t;
struct {
u8 rate_count;
ubnt_poll_host_evm_info_t* rates;
}evm_report;
```

FIG. 11B

```
function sigma = look_up_sigma(evm_in_dB)

% constant and static variables
persistent SIGMA_Q;
persistent MIN_EVM;
persistent MAX_EVM;
persistent SIGMA_NORM;

if(isempty(SIGMA_Q))
    MIN_EVM   = 0;
    MAX_EVM   = 40;
    SIGMA_Q   = [180,161,143,128,114,101,90,81,72,64,57,51,45,40,36,32,29,25,23,20,18,16,14,13,11,10,9,8,7,6,6,5,5,4,4,3,3,3,2,2,2];
    SIGMA_NORM = 1/255;
end % round input evm_in_dB val
evm_in_dB_q = round(evm_in_dB);

if (evm_in_dB_q < MIN_EVM )
    evm_in_dB_q = MIN_EVM;
elseif (evm_in_dB_q > MAX_EVM )
    evm_in_dB_q = MAX_EVM;
end % lookup sigma and scale
sigma = SIGMA_Q(evm_in_dB_q+1) * SIGMA_NORM;
end
```

FIG. 12

```
function [x_pts, y_pts] = lookup_qam_constellation(mod_type)

% mod_type can be 1 (BPSK), 2 (QPSK), 3 (16-QAM), 4 (64-QAM), 5(256-QAM) or
% 6(1024-QAM)

switch mod_type case 1 % BPSK
    alpha = 1/sqrt(1);
    x_pts = alpha * [-1,   +1];
    y_pts = alpha * [0,    0];

case 2 % QPSK
    alpha = 1/sqrt(2);
    x_pts = alpha * [-1, +1, -1, +1];
    y_pts = alpha * [-1, -1, +1, +1];
  case 3 % 16-QAM
    alpha = 1/sqrt(10);
    x_pts = alpha * [-3, -1, +1, +3, -3, -1, +1, +3, -3, -1, +1, +3, -3, -1, +1, +3];
    y_pts = alpha * [-3, -3, -3, -3, -1, -1, -1, -1, +1, +1, +1, +1, +3, +3, +3, +3];
  case 4 % 64-QAM
    alpha = 1/sqrt(42);
    x_pts = alpha * [-7, -5, -3, -1, +1, +3, +5, +7, -7, -5, -3, -1, +1, +3, +5, +7, -7, -5, -3, -1, +1, +3, +5, +7, -7,
-5, -3, -1, +1, +3, +5, +7, -7, -5, -3, -1, +1, +3, +5, +7, -7, -5, -3, -1, +1, +3, +5, +7, -7, -5, -3, -1, +1, +3, +5, +7,
-7, -5, -3, -1, +1, +3, +5, +7];
    y_pts = alpha * [-7, -7, -7, -7, -7, -7, -7, -7, -5, -5, -5, -5, -5, -5, -5, -5, -3, -3, -3, -3, -3, -3, -3, -3, -1, -1, -
1, -1, -1, -1, -1, -1, +1, +1, +1, +1, +1, +1, +1, +1, +3, +3, +3, +3, +3, +3, +3, +3, +5, +5, +5, +5, +5, +5, +5, +5,
+7, +7, +7, +7, +7, +7, +7, +7];
  case 5 % 256-QAM
    alpha = 1/sqrt(170);
    x_pts = alpha * [-15, -13, -11, -9, -7, -5, -3, -1, +1, +3, +5, +7, +9, +11, +13, +15, -15, -13, -11, -9, -7, -5,
-3, -1, +1, +3, +5, +7, +9, +11, +13, +15, -15, -13, -11, -9, -7, -5, -3, -1, +1, +3, +5, +7, +9, +11, +13, +15, -15,
-13, -11, -9, -7, -5, -3, -1, +1, +3, +5, +7, +9, +11, +13, +15, -15, -13, -11, -9, -7, -5, -3, -1, +1, +3, +5, +7, +9,
+11, +13, +15, -15, -13, -11, -9, -7, -5, -3, -1, +1, +3, +5, +7, +9, +11, +13, +15, -15, -13, -11, -9, -7, -5, -3, -1,
+1, +3, +5, +7, +9, +11, +13, +15, -15, -13, -11, -9, -7, -5, -3, -1, +1, +3, +5, +7, +9, +11, +13, +15, -15, -13, -
11, -9, -7, -5, -3, -1, +1, +3, +5, +7, +9, +11, +13, +15, -15, -13, -11, -9, -7, -5, -3, -1, +1, +3, +5, +7, +9, +11,
+13, +15, -15, -13, -11, -9, -7, -5, -3, -1, +1, +3, +5, +7, +9, +11, +13, +15, -15, -13, -11, -9, -7, -5, -3, -1, +1,
+3, +5, +7, +9, +11, +13, +15, -15, -13, -11, -9, -7, -5, -3, -1, +1, +3, +5, +7, +9, +11, +13, +15, -15, -13, -11, -
9, -7, -5, -3, -1, +1, +3, +5, +7, +9, +11, +13, +15, -15, -13, -11, -9, -7, -5, -3, -1, +1, +3, +5, +7, +9, +11, +13,
+15, -15, -13, -11, -9, -7, -5, -3, -1, +1, +3, +5, +7, +9, +11, +13, +15];
    y_pts = alpha * [-15, -15, -15, -15, -15, -15, -15, -15, -15, -15, -15, -15, -15, -15, -15, -15, -13, -13, -13, -
13, -13, -13, -13, -13, -13, -13, -13, -13, -13, -13, -13, -13, -11, -11, -11, -11, -11, -11, -11, -11, -11, -11, -11,
-11, -11, -11, -11, -11, -9, -9, -9, -9, -9, -9, -9, -9, -9, -9, -9, -9, -9, -9, -9, -9, -7, -7, -7, -7, -7, -7, -7, -7, -
7, -7, -7, -7, -7, -7, -7, -7, -5, -5, -5, -5, -5, -5, -5, -5, -5, -5, -5, -5, -5, -5, -5, -5, -3, -3, -3, -3, -3, -3, -3, -3, -
3, -3, -3, -3, -3, -3, -3, -3, -1, -1, -1, -1, -1, -1, -1, -1, -1, -1, -1, -1, -1, -1, -1, -1, +1, +1, +1, +1, +1, +1, +1, +1,
+1, +1, +1, +1, +1, +1, +1, +1, +3, +3, +3, +3, +3, +3, +3, +3, +3, +3, +3, +3, +3, +3, +3, +3, +5, +5, +5, +5, +5, +5,
+5, +5, +5, +5, +5, +5, +5, +5, +5, +5, +7, +7, +7, +7, +7, +7, +7, +7, +7, +7, +7, +7, +7, +7, +7, +7, +9, +9, +9, +9,
+9, +9, +9, +9, +9, +9, +9, +9, +9, +9, +9, +9, +11, +11, +11, +11, +11, +11, +11, +11, +11, +11, +11, +11, +11,
+11, +11, +11, +11, +11, +13, +13, +13, +13, +13, +13, +13, +13, +13, +13, +13, +13, +13, +13, +15, +15,
+15, +15, +15, +15, +15, +15, +15, +15, +15, +15, +15];
```

FIG. 13A

```
case 6 % 1024-QAM
    alpha = 1/sqrt(682);
    x_pts = alpha * [-31, -29, -27, -25, -23, -21, -19, -17, -15, -13, -11, -9, -7, -5, -3, -1, +1, +3, +5, +7, +9,
+11, +13, +15, +17, +19, +21, +23, +25, +27, +29, +31, -31, -29, -27, -25, -23, -21, -19, -17, -15, -13, -11, -9,
-7, -5, -3, -1, +1, +3, +5, +7, +9, +11, +13, +15, +17, +19, +21, +23, +25, +27, +29, +31, -31, -29, -27, -25, -
23, -21, -19, -17, -15, -13, -11, -9, -7, -5, -3, -1, +1, +3, +5, +7, +9, +11, +13, +15, +17, +19, +21, +23, +25,
+27, +29, +31, -31, -29, -27, -25, -23, -21, -19, -17, -15, -13, -11, -9, -7, -5, -3, -1, +1, +3, +5, +7, +9, +11,
+13, +15, +17, +19, +21, +23, +25, +27, +29, +31, -31, -29, -27, -25, -23, -21, -19, -17, -15, -13, -11, -9, -7, -
5, -3, -1, +1, +3, +5, +7, +9, +11, +13, +15, +17, +19, +21, +23, +25, +27, +29, +31, -31, -29, -27, -25, -23, -
21, -19, -17, -15, -13, -11, -9, -7, -5, -3, -1, +1, +3, +5, +7, +9, +11, +13, +15, +17, +19, +21, +23, +25, +27,
+29, +31, -31, -29, -27, -25, -23, -21, -19, -17, -15, -13, -11, -9, -7, -5, -3, -1, +1, +3, +5, +7, +9, +11, +13,
+15, +17, +19, +21, +23, +25, +27, +29, +31, -31, -29, -27, -25, -23, -21, -19, -17, -15, -13, -11, -9, -7, -5, -3,
-1, +1, +3, +5, +7, +9, +11, +13, +15, +17, +19, +21, +23, +25, +27, +29, +31, -31, -29, -27, -25, -23, -21, -19,
-17, -15, -13, -11, -9, -7, -5, -3, -1, +1, +3, +5, +7, +9, +11, +13, +15, +17, +19, +21, +23, +25, +27, +29, +31,
-31, -29, -27, -25, -23, -21, -19, -17, -15, -13, -11, -9, -7, -5, -3, -1, +1, +3, +5, +7, +9, +11, +13, +15, +17,
+19, +21, +23, +25, +27, +29, +31, -31, -29, -27, -25, -23, -21, -19, -17, -15, -13, -11, -9, -7, -5, -3, -1, +1, +3,
+5, +7, +9, +11, +13, +15, +17, +19, +21, +23, +25, +27, +29, +31, -31, -29, -27, -25, -23, -21, -19, -17, -15, -
13, -11, -9, -7, -5, -3, -1, +1, +3, +5, +7, +9, +11, +13, +15, +17, +19, +21, +23, +25, +27, +29, +31, -31, -29, -
27, -25, -23, -21, -19, -17, -15, -13, -11, -9, -7, -5, -3, -1, +1, +3, +5, +7, +9, +11, +13, +15, +17, +19, +21,
+23, +25, +27, +29, +31, -31, -29, -27, -25, -23, -21, -19, -17, -15, -13, -11, -9, -7, -5, -3, -1, +1, +3, +5, +7,
+9, +11, +13, +15, +17, +19, +21, +23, +25, +27, +29, +31, -31, -29, -27, -25, -23, -21, -19, -17, -15, -13, -11,
-9, -7, -5, -3, -1, +1, +3, +5, +7, +9, +11, +13, +15, +17, +19, +21, +23, +25, +27, +29, +31, -31, -29, -27, -25,
-23, -21, -19, -17, -15, -13, -11, -9, -7, -5, -3, -1, +1, +3, +5, +7, +9, +11, +13, +15, +17, +19, +21, +23, +25,
+27, +29, +31, -31, -29, -27, -25, -23, -21, -19, -17, -15, -13, -11, -9, -7, -5, -3, -1, +1, +3, +5, +7, +9, +11,
+13, +15, +17, +19, +21, +23, +25, +27, +29, +31, -31, -29, -27, -25, -23, -21, -19, -17, -15, -13, -11, -9, -7, -
5, -3, -1, +1, +3, +5, +7, +9, +11, +13, +15, +17, +19, +21, +23, +25, +27, +29, +31, -31, -29, -27, -25, -23, -
21, -19, -17, -15, -13, -11, -9, -7, -5, -3, -1, +1, +3, +5, +7, +9, +11, +13, +15, +17, +19, +21, +23, +25, +27,
+29, +31, -31, -29, -27, -25, -23, -21, -19, -17, -15, -13, -11, -9, -7, -5, -3, -1, +1, +3, +5, +7, +9, +11, +13,
+15, +17, +19, +21, +23, +25, +27, +29, +31, -31, -29, -27, -25, -23, -21, -19, -17, -15, -13, -11, -9, -7, -5, -3,
-1, +1, +3, +5, +7, +9, +11, +13, +15, +17, +19, +21, +23, +25, +27, +29, +31, -31, -29, -27, -25, -23, -21, -19,
-17, -15, -13, -11, -9, -7, -5, -3, -1, +1, +3, +5, +7, +9, +11, +13, +15, +17, +19, +21, +23, +25, +27, +29, +31,
-31, -29, -27, -25, -23, -21, -19, -17, -15, -13, -11, -9, -7, -5, -3, -1, +1, +3, +5, +7, +9, +11, +13, +15, +17,
+19, +21, +23, +25, +27, +29, +31, -31, -29, -27, -25, -23, -21, -19, -17, -15, -13, -11, -9, -7, -5, -3, -1, +1, +3,
+5, +7, +9, +11, +13, +15, +17, +19, +21, +23, +25, +27, +29, +31, -31, -29, -27, -25, -23, -21, -19, -17, -15, -
13, -11, -9, -7, -5, -3, -1, +1, +3, +5, +7, +9, +11, +13, +15, +17, +19, +21, +23, +25, +27, +29, +31, -31, -29, -
27, -25, -23, -21, -19, -17, -15, -13, -11, -9, -7, -5, -3, -1, +1, +3, +5, +7, +9, +11, +13, +15, +17, +19, +21,
+23, +25, +27, +29, +31, -31, -29, -27, -25, -23, -21, -19, -17, -15, -13, -11, -9, -7, -5, -3, -1, +1, +3, +5, +7,
+9, +11, +13, +15, +17, +19, +21, +23, +25, +27, +29, +31, -31, -29, -27, -25, -23, -21, -19, -17, -15, -13, -11,
-9, -7, -5, -3, -1, +1, +3, +5, +7, +9, +11, +13, +15, +17, +19, +21, +23, +25, +27, +29, +31, -31, -29, -27, -25,
-23, -21, -19, -17, -15, -13, -11, -9, -7, -5, -3, -1, +1, +3, +5, +7, +9, +11, +13, +15, +17, +19, +21, +23, +25,
+27, +29, +31, -31, -29, -27, -25, -23, -21, -19, -17, -15, -13, -11, -9, -7, -5, -3, -1, +1, +3, +5, +7, +9, +11,
+13, +15, +17, +19, +21, +23, +25, +27, +29, +31, -31, -29, -27, -25, -23, -21, -19, -17, -15, -13, -11, -9, -7, -
5, -3, -1, +1, +3, +5, +7, +9, +11, +13, +15, +17, +19, +21, +23, +25, +27, +29, +31, -31, -29, -27, -25, -23, -
21, -19, -17, -15, -13, -11, -9, -7, -5, -3, -1, +1, +3, +5, +7, +9, +11, +13, +15, +17, +19, +21, +23, +25, +27,
+29, +31];
```

FIG. 13B

```
    y_pts = alpha * [-31, -31, -31, -31, -31, -31, -31, -31, -31, -31, -31, -31, -31, -31, -31, -31, -31, -31, -
31, -31, -31, -31, -31, -31, -31, -31, -31, -31, -31, -31, -31, -31, -31, -29, -29, -29, -29, -29, -29, -29, -29, -29, -29,
-29, -29, -29, -29, -29, -29, -29, -29, -29, -29, -29, -29, -29, -29, -29, -29, -29, -29, -29, -29, -29, -29, -27, -27, -
27, -27, -27, -27, -27, -27, -27, -27, -27, -27, -27, -27, -27, -27, -27, -27, -27, -27, -27, -27, -27, -27, -27, -27, -27,
-27, -27, -27, -27, -27, -27, -27, -25, -25, -25, -25, -25, -25, -25, -25, -25, -25, -25, -25, -25, -25, -25, -25, -
25, -25, -25, -25, -25, -25, -25, -25, -25, -25, -25, -25, -25, -25, -23, -23, -23, -23, -23, -23, -23, -23, -23,
-23, -23, -23, -23, -23, -23, -23, -23, -23, -23, -23, -23, -23, -23, -23, -23, -23, -23, -23, -23, -23, -23, -
21, -21, -21, -21, -21, -21, -21, -21, -21, -21, -21, -21, -21, -21, -21, -21, -21, -21, -21, -21, -21, -21, -21,
-21, -21, -21, -21, -21, -21, -21, -21, -19, -19, -19, -19, -19, -19, -19, -19, -19, -19, -19, -19, -19, -19, -
19, -19, -19, -19, -19, -19, -19, -19, -19, -19, -19, -19, -19, -19, -19, -19, -19, -17, -17, -17, -17, -17, -17, -17,
-17, -17, -17, -17, -17, -17, -17, -17, -17, -17, -17, -17, -17, -17, -17, -17, -17, -17, -17, -17, -17, -17, -17, -
17, -17, -15, -15, -15, -15, -15, -15, -15, -15, -15, -15, -15, -15, -15, -15, -15, -15, -15, -15, -15, -15,
-15, -15, -15, -15, -15, -15, -15, -15, -15, -15, -13, -13, -13, -13, -13, -13, -13, -13, -13, -13, -13, -13, -
13, -13, -13, -13, -13, -13, -13, -13, -13, -13, -13, -13, -13, -13, -13, -13, -13, -13, -11, -11, -11, -11, -11,
-11, -11, -11, -11, -11, -11, -11, -11, -11, -11, -11, -11, -11, -11, -11, -11, -11, -11, -11, -11, -11, -11, -
11, -11, -11, -11, -9, -9, -9, -9, -9, -9, -9, -9, -9, -9, -9, -9, -9, -9, -9, -9, -9, -9, -9, -9, -9, -9, -9, -9, -9, -9, -9, -9,
-9, -9, -9, -9, -7, -7, -7, -7, -7, -7, -7, -7, -7, -7, -7, -7, -7, -7, -7, -7, -7, -7, -7, -7, -7, -7, -7, -7, -7, -7, -7, -7, -7, -
7, -7, -7, -5, -5, -5, -5, -5, -5, -5, -5, -5, -5, -5, -5, -5, -5, -5, -5, -5, -5, -5, -5, -5, -5, -5, -5, -5, -5, -5, -5, -5, -
5, -5, -3, -3, -3, -3, -3, -3, -3, -3, -3, -3, -3, -3, -3, -3, -3, -3, -3, -3, -3, -3, -3, -3, -3, -3, -3, -3, -3, -3, -3, -
3, -1, -1, -1, -1, -1, -1, -1, -1, -1, -1, -1, -1, -1, -1, -1, -1, -1, -1, -1, -1, -1, -1, -1, -1, -1, -1, -1, -1, -1,
+1, +1, +1, +1, +1, +1, +1, +1, +1, +1, +1, +1, +1, +1, +1, +1, +1, +1, +1, +1, +1, +1, +1, +1, +1, +1,
+1, +1, +1, +3, +3, +3, +3, +3, +3, +3, +3, +3, +3, +3, +3, +3, +3, +3, +3, +3, +3, +3, +3, +3, +3, +3,
+3, +3, +3, +3, +3, +3, +3, +5, +5, +5, +5, +5, +5, +5, +5, +5, +5, +5, +5, +5, +5, +5, +5, +5, +5, +5,
+5, +5, +5, +5, +5, +5, +5, +5, +5, +5, +5, +5, +7, +7, +7, +7, +7, +7, +7, +7, +7, +7, +7, +7, +7, +7, +7,
+7, +7, +7, +7, +7, +7, +7, +7, +7, +7, +7, +7, +7, +7, +7, +9, +9, +9, +9, +9, +9, +9, +9, +9, +9, +9, +9, +9,
+9, +9, +9, +9, +9, +9, +9, +9, +9, +9, +9, +9, +9, +9, +9, +9, +9, +11, +11, +11, +11, +11, +11, +11, +11, +11,
+11, +11, +11, +11, +11, +11, +11, +11, +11, +11, +11, +11, +11, +11, +11, +11, +11, +11, +11, +11, +11,
+11, +13, +13, +13, +13, +13, +13, +13, +13, +13, +13, +13, +13, +13, +13, +13, +13, +13, +13, +13,
+13, +13, +13, +13, +13, +13, +13, +13, +13, +13, +13, +15, +15, +15, +15, +15, +15, +15, +15, +15,
+15, +15, +15, +15, +15, +15, +15, +15, +15, +15, +15, +15, +15, +15, +15, +15, +15, +15, +15, +15,
+15, +15, +17, +17, +17, +17, +17, +17, +17, +17, +17, +17, +17, +17, +17, +17, +17, +17, +17, +17,
+17, +17, +17, +17, +17, +17, +17, +17, +17, +17, +17, +17, +19, +19, +19, +19, +19, +19, +19,
+19, +19, +19, +19, +19, +19, +19, +19, +19, +19, +19, +19, +19, +19, +19, +19, +19, +19, +19,
+19, +19, +19, +21, +21, +21, +21, +21, +21, +21, +21, +21, +21, +21, +21, +21, +21, +21, +21,
+21, +21, +21, +21, +21, +21, +21, +21, +21, +21, +21, +21, +23, +23, +23, +23, +23, +23,
+23, +23, +23, +23, +23, +23, +23, +23, +23, +23, +23, +23, +23, +23, +23, +23, +23, +23,
+23, +23, +23, +23, +25, +25, +25, +25, +25, +25, +25, +25, +25, +25, +25, +25, +25, +25,
+25, +25, +25, +25, +25, +25, +25, +25, +25, +25, +25, +25, +25, +25, +27, +27, +27, +27, +27, +27,
+27, +27, +27, +27, +27, +27, +27, +27, +27, +27, +27, +27, +27, +27, +27, +27, +27, +27, +27, +27,
+27, +27, +27, +27, +27, +29, +29, +29, +29, +29, +29, +29, +29, +29, +29, +29, +29, +29, +29, +29,
+29, +29, +29, +29, +29, +29, +29, +29, +29, +29, +29, +29, +29, +29, +29, +29, +31, +31, +31, +31, +31,
+31, +31, +31, +31, +31, +31, +31, +31, +31, +31, +31, +31, +31, +31, +31, +31, +31, +31, +31, +31, +31,
+31, +31, +31, +31, +31];
end end
```

FIG. 13C

```
function randn_samples = get_gaussian_noise_samples(num_samples)

% constants
NUM_OFFSETS    = 16;   % a prime number used to randomize sequence
NORM_FACTOR    = 64;   % noise sample normalization factor
SAMP_SEQ_LEN   = 1024; % length of pre-computed Gaussian sample sequence persistent sample_seq;  % pre-computed Gaussian sample sequence
persistent rand_offsets;% random offset bank
persistent idx_d;       % index to noise sample
persistent idx_s;       % index to sign of noise sample (we use LSB of another sample for sign)

if(isempty(sample_seq))

% precomputed gaussian random number samples
  sample_seq = [ 34,  67,  97,   5,  44,  19,  19,  95, 127,  75,  64,  49,  65,  18,  27,  11,  27,  64,
138,   9,  62,  66,  10,  64,  11,  34,  18,  41,  74,  34,  19,  41,...
    116,  51,   5, 122, 129,  53,   1,  28, 142, 102,  30, 114, 118,  34,  37,  19,  11,  40,  21,  89,
 74,  42,  43,  13,  32,  97,  40,  77,  25,   6,  44,  20,...
    142, 185,  94,  28,  22,  71,   3,  10, 140,   2,   9, 117,  59,  19,   4,   8,  14,  13,  45,  65, 109,
158,  35,  20,  75,  13,   5,  17,  82,  48,  52, 111,...
     54,  91,  47, 113,  52, 159,  52,  17,  21, 123,  18,  38,  50,  69, 127,  38,  34,  55,  20,  18,  18,
 67,  71, 122,  41,  31,  34,  57,  37,  44,  44,  95,...
     20,  20,  67,  53,  99, 104,  96,  16,  63,  64,  19,   7,  55,  31,  62,  66,  25,  66,  26,  49, 100,
 73,  97,  36,  22,  24,  80,  18,  27,  81,  29,  10,...
     82,  48, 148,  56,  32,  19,  29,  28, 105,  54,  25,  35,  20,  11,  39,  12,  47,  17,  36,  36,   7,
  3,  69,  16,   3,  26,  70,  29,  32,  51,  56,  18,...
     27,  86,  39,   6,  18,  79,  13,  25,  37,   0,  59,   7,  35,   3,   3,  21, 112,  28,   9,  87,  50,  81,
 89,  99,  50,  26,  62,  26,   6,  78,  27,  73,...
     22, 108,  47,  34,   2,  55,  39,  79,  18,   4,  11,  57,  20,   4,  70,  15,  77,  26, 103,  15,   0,  23,
  4,  30,  98,  23, 115,  32,  75,  14,  56,  72,...
    225,   6,  12,  19,  84,  11,  12,  60,  27, 157, 134,  29,  36,  39,  39,  14,  81,  62,  48,  51,   6,
 48,  26,  84,  11,  38,  87,  78,   8, 127,  32,  42,...
    174,  15,  56,  38,  71,  50,  65,  47, 105,  37,  72,   8,  65,   7,  16,  28, 147,  19,  52,  13,  24,
 36,  23,   2,   4,  37,   4,  38,  65,   2,  25,  42,...
     85,  20,  48,  31,  22,  84,  60,  32,  30, 138,  40,  93,  57, 114,  63,  39,  57,  72,  33,  55,  93,
 35,  86,  54,  76,  54,  28,   4,  54,  19,  32,  25,...
    191,  20,  88,  47,  19, 147,  19,  20,  76, 146,  76,  54,  13,  20,  61,  17, 116,  33,   1, 128,   3,
 35,  49,  25,  51, 117,  23,  92,  11,  59,  50,  42,...
     46,  54,  90, 108,   1,  91,   9,   1,   4,   5,  16,  49, 107, 114,  40,  38,   4,  61,  73,  58,  61,  56,
 28,  44,  66,  13,  64, 102,  12, 105,  42,  36,...
      4,   2,  31,  12,  17,  21,  32, 191,  41,  60,  90,  19,  38,  46, 114,   6,   2,  33,   1,  17, 110,  26,
  6, 103,  47,  17, 194, 124,  55,   8,  75,  49,...
     45,  10,  11, 135, 110,  25,  16,  29,  21,  26,   1,  15,   7,  33,  68, 109, 140,  11,  43,  40,  27,
```

FIG. 14A 10, 64, 92, 59, 41, 39, 164, 11, 33, 50, 67, ...
13, 40, 12, 53, 18, 28, 59, 78, 68, 43, 35, 67, 44, 16, 13, 38, 4, 61, 42, 27, 103, 26, 55, 129, 80, 30, 18, 61, 80, 60, 18, 35, ...
8, 69, 89, 85, 52, 8, 10, 67, 63, 54, 137, 18, 17, 38, 96, 46, 32, 26, 54, 83, 10, 60, 26, 8, 31, 4, 12, 16, 16, 54, 0, 27, ...
94, 70, 18, 68, 62, 12, 9, 59, 41, 44, 72, 5, 31, 37, 46, 110, 15, 28, 7, 26, 24, 20, 22, 62, 176, 59, 26, 61, 13, 25, 23, 23, ...
89, 54, 12, 61, 73, 30, 34, 22, 16, 28, 157, 93, 93, 138, 37, 57, 15, 126, 25, 77, 14, 5, 22, 75, 46, 10, 89, 72, 139, 73, 222, 22, ...
89, 5, 100, 8, 34, 54, 106, 2, 59, 6, 28, 12, 64, 84, 25, 55, 4, 60, 56, 3, 72, 83, 46, 37, 49, 17, 46, 35, 49, 3, 7, 17, ...
42, 76, 51, 91, 126, 86, 55, 11, 83, 52, 88, 52, 28, 91, 59, 5, 38, 27, 11, 37, 128, 13, 21, 30, 53, 26, 72, 99, 88, 28, 98, 162, ...
76, 70, 44, 124, 61, 29, 30, 99, 58, 34, 16, 6, 7, 25, 19, 57, 77, 41, 35, 63, 149, 8, 32, 56, 71, 45, 38, 107, 24, 7, 121, 29, ...
45, 0, 53, 12, 33, 53, 45, 5, 0, 57, 10, 21, 71, 93, 24, 12, 20, 23, 43, 4, 32, 74, 56, 87, 90, 4, 81, 28, 33, 16, 38, 117, ...
103, 97, 15, 76, 1, 21, 74, 101, 3, 8, 47, 57, 18, 21, 51, 18, 85, 44, 74, 38, 83, 87, 76, 123, 45, 116, 139, 5, 96, 12, 41, 65, ...
31, 48, 14, 183, 2, 35, 12, 6, 57, 9, 17, 18, 79, 51, 50, 7, 65, 89, 30, 86, 40, 20, 65, 27, 49, 25, 36, 125, 113, 65, 165, 57, ...
65, 23, 73, 52, 50, 65, 17, 3, 37, 63, 99, 22, 30, 34, 8, 28, 84, 101, 89, 22, 20, 16, 53, 25, 20, 34, 13, 53, 7, 20, 35, 15, ...
46, 14, 72, 87, 64, 70, 96, 46, 22, 134, 30, 116, 74, 66, 36, 6, 26, 65, 1, 11, 9, 32, 11, 6, 89, 57, 59, 26, 20, 48, 19, 11, ...
19, 70, 7, 67, 8, 79, 16, 2, 79, 32, 21, 65, 8, 25, 26, 176, 9, 92, 3, 59, 45, 56, 76, 31, 25, 41, 6, 120, 52, 110, 49, 15, ...
19, 69, 46, 30, 45, 42, 67, 15, 59, 80, 42, 153, 41, 47, 62, 73, 57, 3, 107, 2, 49, 120, 19, 68, 59, 46, 71, 25, 31, 73, 67, 6, ...
50, 2, 163, 17, 85, 4, 101, 27, 15, 24, 5, 60, 93, 96, 48, 117, 19, 110, 32, 119, 39, 8, 204, 61, 101, 34, 19, 26, 48, 150, 111, 52, ...
56, 35, 42, 69, 14, 12, 78, 23, 43, 41, 56, 20, 10, 2, 41, 72, 65, 10, 0, 134, 41, 66, 68, 36, 42, 61, 74, 72, 49, 96, 27, 22, ...
72, 69, 12, 18, 37, 14, 14, 15, 41, 52, 20, 27, 52, 103, 38, 69, 22, 78, 58, 74, 27, 14, 90, 51, 135, 10, 61, 39, 93, 11, 66, 11];

rand_offsets = [2,3,5,7,11,13,17,19,23,29,31,37,41,43,47,53];

idx_d = round( (SAMP_SEQ_LEN-1) * rand(1));
idx_s = round( (SAMP_SEQ_LEN-1) * rand(1));

%fprintf('Init: i_d = %d i_s =%d \n',idx_d,idx_s);

end

FIG. 14B

```
% init output vector
randn_samples = zeros(1,num_samples);

for i_num = 1:num_samples rand_offset_idx = round( (NUM_OFFSETS-1) * rand(1));
    offset  = rand_offsets(rand_offset_idx+1);

% get next sample index
    idx_d = mod(idx_d+offset,SAMP_SEQ_LEN);

% get next sign index
    idx_s = mod(idx_d+offset,SAMP_SEQ_LEN);

% lookup samples
    randn_samples(i_num) = sample_seq(idx_d+1)/NORM_FACTOR;

% negate is needed
    if(bitand(sample_seq(idx_s+1),1))
       randn_samples(i_num) = -1 * randn_samples(i_num);
    end %fprintf('Next: i_d = %d i_s =%d \n',idx_d,idx_s);

end end
```

FIG. 14C

```
function bin_idx_vec = place_in_bins(inp_vec,num_bins,min_bin,del_bin)

% allocate space for output
bin_idx_vec = zeros(size(inp_vec));

for i_bin = 1:numel(inp_vec)

% quantize to closest integer
    bin_q = round( (inp_vec(i_bin)-min_bin)/del_bin ) + 1;

if (bin_q<1) % check if lower than min
       bin_q=1;
    elseif(bin_q>num_bins) % check if higheer than max
       bin_q=num_bins;
    end % assign bin index
    bin_idx_vec(i_bin) = bin_q;
end
end
```

FIG. 15

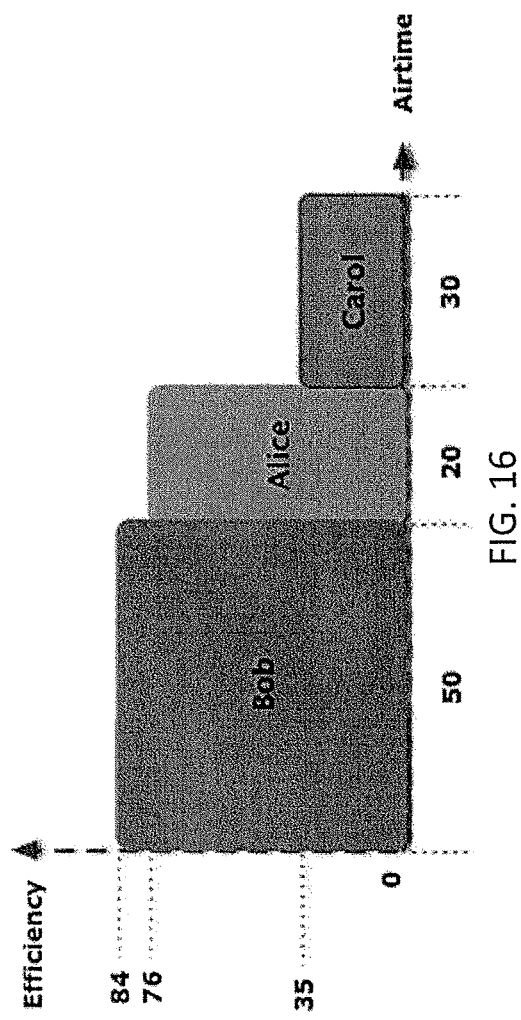
FIG. 16
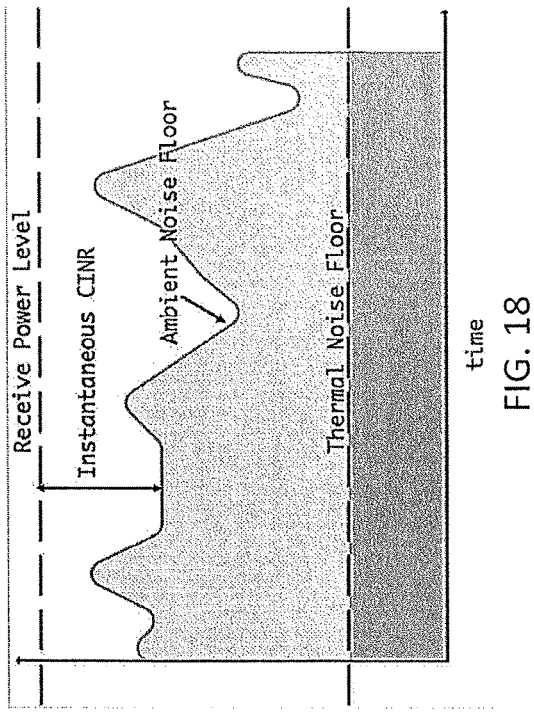
FIG. 18
FIG. 17

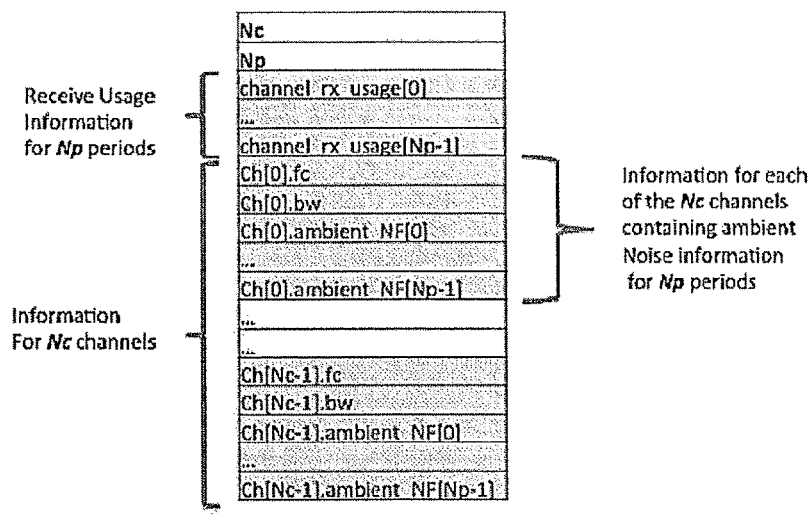
FIG. 21
$$PBW[k].goodness[j] = \frac{\sum_{0}^{Nd-1} CD[i].SpectrumInfo[j].goodness \times CD[i].Priority}{\sum_{0}^{Nd-1} CD[i].Priority}$$
FIG. 22A
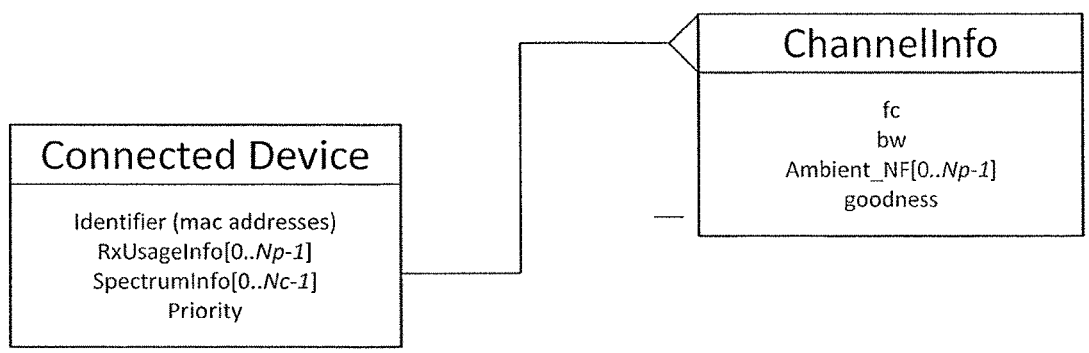
FIG. 22B

METHODS AND APPARATUSES FOR GRAPHICALLY INDICATING STATION EFFICIENCY AND PSEUDO-DYNAMIC ERROR VECTOR MAGNITUDE INFORMATION FOR A NETWORK OF WIRELESS STATIONS

CROSS REFERENCE TO RELATED APPLICATIONS

This patent application claims priority to U.S. Provisional Patent Application No. 62/044,298, filed on Aug. 31, 2014, and titled "METHODS AND APPARATUSES FOR MONITORING NETWORK HEALTH"; U.S. Provisional Patent Application No. 62/085,218, filed on Nov. 26, 2014, and titled "METHODS AND APPARATUSES FOR MONITORING NETWORK HEALTH"; and U.S. Provisional Patent Application No. 62/104,669, filed on Jan. 16, 2015, titled "METHODS AND APPARATUSES FOR MONITORING AND IMPROVING NETWORK HEALTH." Each of these provisional patent applications is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

In establishing communications networks it is often difficult to manage the demands on the network made by various stations, particularly when the individual stations may have different usage and operational parameters. For example, a wireless network may be established e.g., by a wireless Internet service provider (WISP), that services multiple independent stations, e.g., customer provided equipment (CPE). Individual stations may make demand the bandwidth of the network to which the station connects at different times and intensities. Further, individual stations may be capable of operating at different rates because of structural limitations (e.g., hardware, software, firmware of the station) or because of geographic limitations (e.g., strength of connection to the network access point(s)).

Although in general, the demands on networks, from devices including mobile devices, such as smart phones and tablets, have increased with increasing prevalence in recent years, networks are becoming increasing stressed. Further, the availability of multimedia streaming (e.g., video, sound, data) over these same networks has become more common. Given the fast advance in mobile computing power and far-reaching wireless Internet access, more and more users view streamed videos on their mobile devices. The detection of network congestion has become increasingly important for network operators attempting to maximize user experience on the network. Even as network operators are ever increasing the capacity of their networks, the demand for bandwidth is growing at an even faster pace. Managing network growth and dealing with congestion in the infrastructure is particularly important because of the high cost of licensed radio spectrum and limitations of radio access network (RAN) equipment utilized by wireless mobile networks.

Network elements may be able to provide operators a view into the current state of traffic in their network, but they do not provide overall diagnostic health indicators in a manner that could readily allow a network operator to identify and potentially address potential (or actual) problems with the network, including any elasticity and capability in the network, as well as rapidly and intuitively indicating how various stations are influencing the network by at the current time and historically. Such indicators of network health would be important for improving and enhancing a network's ability to deliver data in a reliable and sustainable fashion. For example, a minimum data rate may be required to prevent stalling and re-buffering during the streaming of multimedia content to stations in a network; ensuring sufficient bandwidth to all (or a majority of) stations/users is important to quality of experience. Typically, multimedia content providers are sufficiently equipped to deliver multimedia content at levels far beyond the capabilities of wireless infrastructure. Hence, the burden falls on wireless service providers to implement network data optimization to ease the traffic burden and maximize the experience of each and every user on the network. Currently, only limited tools are available, which may not provide sufficient information (and in an easily digestible form) to properly monitor a network.

For example, one tool useful for understanding the health of a network is the constellation diagram. A constellation diagram is generally a representation of a signal modulated by a digital modulation scheme such as quadrature amplitude modulation or phase-shift keying. It displays the signal as a two-dimensional scatter diagram in the complex plane at symbol sampling instants. In a more abstract sense, it represents the possible symbols that may be selected by a given modulation scheme as points in the complex plane. Measured constellation diagrams can be used to recognize the type of interference and distortion in a signal. Constellation diagrams may be generated by measuring the error vector magnitude (EVM) of a signal, which indicates the deviation of the signal from the ideal.

Unfortunately, in practice, even with increasingly fast processors associated with wireless devices (including access points), generation of an action constellation diagram, e.g., using actual measured EVM information, is time consuming, and may require the addition of monitoring components which is impractical and expensive. In particular, the real-time or near-real time display of EVM information (or even reasonably approximate EVM information) would be greatly beneficial.

Further, although many wireless networks operating through an access point are capable of switching channels, current channel-selection/switching techniques are not optimal, and, if they automatically switch channels at all, select the new channel based on the immediate needs, without optimizing at all, or without optimizing based on the likely ongoing needs of the network. Tools such as those described above may be used to optimize an access point and thus a network (or more than one network) communicating or through the access point. For example, it would be beneficial to optimize the choice of the frequency channel (and/or the channel bandwidth) for a network. In particular, it would be beneficial to optimize a frequency channel for a network based on both the operation and/or needs of all or a subset of client devices (e.g., the biggest users, highest priority users, etc.) as well as the actual and/or historical state of the frequency spectrum surrounding the client (and AP) devices. It would also be beneficial to automatically select an optimal channel and/or bandwidth.

Described herein are apparatuses, including devices and systems (e.g., tools) and methods, for monitoring, interpreting, and improving the overall health of a network that may address some or all of the problems addressed above.

SUMMARY OF THE DISCLOSURE

In general, described herein are methods and apparatuses, including devices, systems, tools, etc. which may include software, firmware and/or hardware, for providing metrics of a network, and in particular, the efficiency of communication between networked devices, including devices networked through a wireless access point. For example, described herein are methods and apparatuses for displaying an indicator of the efficiency and average airtime of all or a subset of stations communicating with an access point. Also described herein are methods and apparatuses that determine and display error vector magnitude (EVM) information for a network of wireless stations, including displaying constellation diagrams using EVM (or approximated EVM) information. This information may be displayed in a dynamic or pseudo-dynamic manner. Also described herein are methods and apparatuses for optimization of channel selection for an access point of a wireless network, including automatic optimization of the wireless network. Channels selection may be optimized by usage data and historical frequency spectral information.

For example, described herein are methods and apparatuses providing a visual metric of the efficiency of a network of devices communicating through a wireless access point (AP). These methods and apparatuses may display a graphical indicator of the efficiency and average airtime of all or a subset of stations communicating with an AP by time division multiple access (TDMA). An access point or a method of operating an access point, may be configured to determine a set of n stations having higher usage values compared to all of the stations communicating with the access point, determine a station efficiency and an average airtime for each of the n stations in the set, and to graphically display an indicator of the station efficiency, average airtime and an identity for each of the n stations in the set in order of station efficiency.

As used herein an access point (AP) may be a wireless access point is a device that allows wireless devices to connect to a wired network using Wi-Fi, or related standards. The AP may connect to a router (via a wired network) as a standalone device, but it may also be an integral component of the router itself.

A client device is typically a device having wireless capability that may communicate with an access point. The client device may include customer provided equipment (CPE). A client device may also include, and may be referred to as a wireless device. A client device may be a terminal and/or equipment that connects with a wireless network through, e.g., an access point.

Described herein are methods and systems for monitoring wireless networks, and particularly for determining the effectiveness of one or more access point (AP) of a wireless network and/or any client devices communicating with the AP, and presenting information in a quick, graphical manner that allows intuitive understanding of the efficiency of the network based on a number (e.g., 5, 6, 7, 8, 9, 10, 1, 12, 13, 14, 15, 16, 17, 18, 19, 20, 30, 40, 50, 60, 70, 80, 90, 100, 200, 300, 400, etc.) of stations that communicate with the AP.

For example, described herein are method of monitoring and presenting the health of a wireless network, the method comprising: determining, for an AP, a predetermined number, n, of stations having the highest usage values from all of the stations communicating with the access point, within a predetermined time interval; determining a station efficiency for each of the n stations; determining an average airtime for each of the n stations; and graphically displaying an indicator of the station efficiency, average airtime and an identity for each of the n stations arranged with the n stations in descending order of station efficiency.

Also described are methods of graphically displaying an indicator of the efficiency of an access point using only a limited number of the stations communicating with the access point, the method comprising: determining, for the access point, a predetermined number, n, of stations having the highest usage values from all of the stations communicating with the access point, within a predetermined time interval; determining a station efficiency for each of the n stations; determining an average airtime for each of the n stations; and graphically displaying an indicator of the efficiency of the access point using the station efficiency and average airtime for each of the n stations.

Any of the methods herein may also include displaying an indicator of the efficiency of the access point using the indicator of the station efficiency and average airtime for each of the n stations. For example, an overall area displayed, or a fraction of the area displayed, in the graphical representation may reflect the efficiency of the network. For example, graphically displaying the indicator of the efficiency of the access point may include graphically displaying an indicator of the station efficiency, average airtime and an identifier for each of the n stations arranged with the n stations in descending order of station efficiency. The identifier may generally or uniquely identify the station in the network (e.g., by name, code, alphanumeric, position/location identifier, etc.). This may allow the network operator to act one or more specific stations to enhance performance of the network.

In any of these methods, determining the predetermine number of stations may include creating a sorted list by determining for each station communicating with the access within the predetermined time interval the usage value and the total isolated capacity, sorting the stations by highest usage value on top and within usage index by lowest isolated capacity and selecting the top n stations from the sorted list.

The predetermined time interval may be any appropriate time period, e.g., 2 hours, 4 hours, 8 hours, 12 hours, 18 hours, 24 hours, 36 hours, 48 hours, 3 days, 4 days, 5 days, 6 days, 7 days, 2 weeks, 3 weeks, 4 weeks, 5 weeks, 2 months, 3 months, 4 months, 5 months, 6 months, etc.

Any of these methods may be configured to select any appropriate number of the top stations as the predetermined number of stations. For example, the predetermined number, n, nay be 5, 6, 7, 8, 9, 10, 11, 12, 13, 14, 15, 16, 17, 18, 19, 20, 21, 22, 23, 24, 25, etc. In some variations n is limited to 10.

Any of these methods may also include determining for each station communicating with the access point within the predetermined time interval the usage value, wherein the usage value for a station is calculated from the active airtime for that station and a period of activity for that station.

In general, graphically displaying may include displaying a figure, picture, chart, graph, or the like that include the sorted and scaled station efficiency and active time. The graphical display may be interactive, e.g., allowing the presentation of additional information when selecting or moving over each parts of the display (e.g., showing the identity or other station-specific information, etc.). Graphically displaying may comprise scaling each indicator of the station efficiency by a maximum capacity for the access point. Graphically displaying may include scaling each indicator of station average airtime by the sum of all of the station average airtimes for the n stations. Graphically displaying an indicator of the station efficiency, average airtime and identify for each of the n stations may include displaying a bar graph wherein each station forms a bar having a height equivalent to the station efficiency for the station and a width equivalent to the average airtime for the station.

Any of these methods may also include periodically repeating the determining and displaying steps at a predetermined sampling interval. The sampling interval may be the "heartbeat" rate for the network (in which status information is transmitted components of the network, e.g., to a cloud application) The sampling interval may be between 1 second and 1 day or more (e.g., 10 sec, 15 sec, 30 sec, 1 min, 5 min, 10 min, 15 min, 30 min, etc.). In some variations the predetermined sampling interval is 30 seconds.

Any of these methods may also include periodically transmitting from each station to the access point a total packet transmit duration and a duration of failed attempts. A method may include determining a transmit packet air time and error rate accounting for each station.

In any of these methods, a total air time may be determined by: determining for each station a downlink time and packet error rate from the station to the access point; and determining for each station an uplink time and a packet error rate from the access point to the station.

The methods described herein may also include remotely accessing, using a processor that is remote to the access point, the usage values for all of the stations communicating with the access point.

Also described herein are systems for monitoring a network (e.g., one or more access point communicating with a plurality of different stations). Any of these systems may be configured as a non-transitory computer-readable storage medium storing a set of instructions capable of being executed by a processor, that when executed by the processor causes the processor to perform steps including any of the method steps described above. The processor may be general-purpose processor, or it may be a custom and/or dedicated processor. A dedicated processor may be faster and more efficient.

For example, described herein are non-transitory computer-readable storage medium storing a set of instructions capable of being executed by a processor, that when executed by the processor causes the processor to: determine, for an access point, a predetermined number, n, of stations having the highest usage values from all of the stations communicating with the access point, within a predetermined time interval; determine a station efficiency for each of the n stations; determine an average airtime for each of the n stations; and cause to be graphical displayed, an indicator of the station efficiency, average airtime and an identity (identifier) for each of the n stations arranged with the n stations in descending order of station efficiency.

A non-transitory computer-readable storage medium storing a set of instructions capable of being executed by a processor, that when executed by the processor may cause the processor to: determine, for the access point, a predetermined number, n, of stations having the highest usage values from all of the stations communicating with the access point, within a predetermined time interval; determine a station efficiency for each of the n stations; determine an average airtime for each of the n stations; and cause to be graphically displayed, an indicator of the efficiency of the access point using the station efficiency and average airtime for each of the n stations.

For example, a method of monitoring and presenting the health of a wireless network may provide a ranked indicator of station efficiency, and may include: determining, for an access point, a set of a predetermined number, n, of stations having higher usage values compared to all of the stations communicating with the access point, within a predetermined time interval; determining a station efficiency for each of the n stations in the set; determining an average airtime for each of the n stations in the set; and graphically displaying an indicator of the station efficiency, average airtime and an identity for each of the n stations in the set arranged with the n stations in descending order of station efficiency.

Any of these methods may be configured as methods of graphically displaying an indicator of the efficiency of an access point communicating with a plurality of stations, using only a limited number of the stations by providing a ranked indicator of station efficiency, and may include: determining, for the access point, a set of a predetermined number, n, of stations having higher usage values compared to all of the stations communicating with the access point, within a predetermined time interval; determining a station efficiency for each of the n stations in the set; determining an average airtime for each of the n stations in the set; and graphically displaying an indicator of the efficiency of the access point using the station efficiency and average airtime for each of the n stations in the set.

As mentioned, any of the methods described herein may include displaying an indicator of the efficiency of the AP using the indicator of the station efficiency and average airtime for each of the n stations in the set. Graphically displaying the indicator of the efficiency of the access point may include graphically displaying an indicator of the station efficiency, average airtime and an identity for each of the n stations in the set arranged with the n stations. This may be displayed in either ascending or descending order of station efficiency.

Determining the set of stations may include creating a sorted list by determining for each station communicating with the access point within the predetermined time interval the usage value and a total isolated capacity, sorting the stations by highest usage value on top and within usage index by lowest isolated capacity and selecting the top n stations from the sorted list.

Any appropriate predetermined time interval may be used, for example, 24 hours, 48 hours, 3 days, 4 days, 5 days, 6 days, 7 days, 8 days, etc.

As mentioned above, the predetermined number, n, may be between any appropriate number of stations representing a sub-set of the total number of stations communicating with the access point. For example, n may be between about 5 and about 50, e.g., between about 10 and about 40, between about 10 and about 30, between about 15 and about 25, about 20, etc.

Any of the methods described herein may include determining for each station communicating with the access within the predetermined time interval the usage value, wherein the usage value for a station is calculated from the active airtime for that station and a period of activity for that station.

When graphically displaying any of the information described herein (including station efficiency and average airtime), the method, or an apparatus configured to perform the method, may scale the information. For example, when graphically displaying the station efficiency, each indicator of the station efficiency may be scaled by a maximum capacity for the access point. Graphically displaying may include scaling each indicator of station average airtime by the sum of all of the station average airtimes for the set of n stations.

As mentioned, any appropriate graphical display may be used, including charts, graphs, and the like. For example, graphically displaying an indicator of the station efficiency, average airtime and identify for each of the n stations in the set may include displaying a bar graph wherein each station forms a bar having a height equivalent to the station efficiency for that station and a width equivalent to the average airtime for that station.

Any of the methods described herein may include repeating any of the steps, including repeating the determining and displaying steps. For example, any of the methods may include periodically repeating the determining and displaying steps at a predetermined sampling interval. Any predetermined sampling interval may be used, including, e.g., 0.5 seconds, 1 second, 2 seconds, 5 seconds, 10 seconds, 15 seconds, 30 seconds, 45 seconds, 1 minute, 2 minutes, 3 minutes, 4 minutes, 5 minutes, 10 minutes, 15 minutes, etc.

Any of the methods described herein may include periodically transmitting from each station to the access point a total packet transmit duration and a duration of failed attempts. Any of these methods may include determining for each station in the set a transmit packet air time and error rate accounting.

As mentioned above, a total air time may be determined by: determining for each station a downlink time and packet error rate from the station to the access point, and determining for each station an uplink time and a packet error rate from the access point to the station.

In any of the methods described herein, the usage values may be assessed remotely, using a processor that is remote to the access point, for one or more (e.g., all) of the stations communicating with the access point.

An apparatus, and particularly an access point, may be configured to perform any of the methods described herein. The AP may be remotely accessed (e.g., by a user) to provide any of the information, graphical displays, and/or the ability to make modifications to the system (e.g., setting the channel and/or bandwidth, etc.). A user interface may be provided. The user interface may be provided by the access point (e.g., when accessing the information); information presented by the user interface may be provided by the access point. In some variations, the apparatus (e.g., user interface) may include and be configured to present the user with the user interface, for example, when accessing the AP remotely or locally. The user interface (including graphical displays) may be displayed on a user's laptop computer, desktop computer, smartphone, etc.). Any of the apparatuses described herein may generally include a controller and/or processor (or a controller that includes a processor) that is configured to perform any of the functions described herein. These apparatuses may be configured as access points, which may include radio circuitry (transmitter/receiver circuitry), and an antenna. The controller may include a memory, timer, comparator, and the like. These access point apparatuses may generally be configured so that the controller operates the radio (and antenna) to receive and transmit to/from one or more stations as described herein. In general, any of these apparatuses may include non-transitory computer-readable storage media storing instructions that are executed by the processor (e.g., controller) to perform the functions described.

For example, described herein are non-transitory computer-readable storage media storing a set (or sets) of instructions capable of being executed by a processor, that when executed by the processor causes the processor to: determine, for an access point, a set of a predetermined number, n, of stations having higher usage values compared to all of the stations communicating with the access point, within a predetermined time interval; determine a station efficiency for each of the n stations in the set; determine an average airtime for each of the n stations in the set; and graphically displaying an indicator of the station efficiency, average airtime and an identity for each of the n stations in the set arranged with the n stations in descending order of station efficiency For example, described herein are a non-transitory computer-readable storage medium storing a set of instructions capable of being executed by a processor, that when executed by the processor causes the processor to: determine, for the access point, a set of a predetermined number, n, of stations having higher usage values compared to all of the stations communicating with the access point, within a predetermined time interval; determine a station efficiency for each of the n stations in the set; determine an average airtime for each of the n stations in the set; and graphically display an indicator of the efficiency of the access point using the station efficiency and average airtime for each of the n stations in the set.

In general, also described herein are graphical methods of visually displaying and interpreting the performance of a network, access point, and/or clients (e.g., wireless radio antenna systems) by displaying one or both (e.g., side-by-side) histograms and constellation diagrams of the error vector magnitude ("EVM"), which may also referred to as receive constellation error or (RCE).

For example, described herein are methods and apparatuses configured to determine and display error vector magnitude (EVM) information for a network of wireless stations, including displaying a pseudo-dynamic constellation diagrams using EVM information. For example, described herein are methods and apparatuses for monitoring a wireless network by transmitting a plurality of sounding packets from each of one or more radio devices different modulation types (e.g., BPSK, QPSK, 16QAM, 64QAM, 256QAM and 1024QAM), and receiving at least some of the sounding packets at a second radio device (e.g., an access point) and determining EVM information from the received sounding packets, and displaying (or providing for display) a constellation diagram and/or a histogram based on the EVM information. In particular, these apparatuses and methods may generate and display pseudo-dynamic EVM information that is a constrained approximation of actual EVM information. The modulation type for the constellation diagram may be changed based on available modulation types, or it may be automatically selected based on an optimal modulation type.

As used herein a pseudo-dynamic display, e.g., of a constellation diagram, may refer to a display in which the values and/or positions (corresponding to values) being displayed are based on pseudo-EVM data, which is not true or actually measured, but may be randomly generated within a constrained range of an estimated value. Thus, although the display appears to update dynamically, the values displayed illustrate the range, but not the actual value.

In general, the methods and apparatuses described herein include the displays (e.g., user interfaces) for monitoring a wireless network (or a single link of a wireless network), including constellation diagrams. These methods, and apparatuses configured to perform them, may generally use a plurality of sounding packets that are transmitted between devices (e.g., between the access point and each of the stations communicating with the access point) where the sounding packets within a set of sounding packets transmitted each reference a particular modulation types (and multiple modulation types are represented) and are transmitted at the referenced modulation type. Examples of modulation types may include: BPSK, QPSK, 16QAM, 64QAM, 256QAM and 1024QAM. Additional information about the link may also be included in the sounding packet, as described in more detail below. EVM information may be determined based on the received sounding packet (including the quality of the received packet and/or information encoded in the received packet which may include information about packets transmitted by the AP receiving the sounding packets).

For example, described herein are methods of monitoring a wireless network that may include: transmitting a plurality of sounding packets from a first radio device, wherein each of the plurality of sounding packets are transmitted in a different modulation type; receiving at least some of the plurality of sounding packets at a second radio device; determining error vector magnitude information from the received at least some of the plurality of sounding packets; and displaying one or both of a constellation diagram and a histogram based on the error vector magnitude information.

A method of monitoring a wireless network may include: establishing link between a first radio device and a second radio device; periodically transmitting a plurality of sounding packets from the first radio device, wherein each of the plurality of sounding packets are transmitted in a different modulation type; receiving at least some of the plurality of sounding packets at the second radio device; determining error vector magnitude information from the received at least some of the plurality of sounding packets; aggregating the determined error vector magnitude for a predetermined period of time; and displaying one or both of a constellation diagram and a histogram based on the aggregated error vector magnitude information.

A method of monitoring a wireless network may include: transmitting a plurality of sounding packets from a first radio device, wherein each of the plurality of sounding packets are transmitted in a different modulation type; receiving at least some of the plurality of sounding packets at a second radio device; determining error vector magnitude (EVM) information from the received at least some of the plurality of sounding packets; and displaying an animated constellation diagram by generating pseudo-EVM data points based on the EVM information, wherein the pseudo-EVM data points are determined within a standard deviation of the error vector magnitude information.

Any of these methods may include transmitting the plurality of sounding packets from the first radio device by transmitting three or more sounding packets, wherein each of the three or more sounding packets are transmitted in a different modulation type. For example, transmitting the plurality of sounding packets from the first radio device may include transmitting three or more sounding packets, wherein each of the three or more sounding packets are transmitted in a different modulation type selected from the group consisting of: BPSK, QPSK, 16QAM, 64QAM, 256QAM and 1024QAM (ranked from lowest to highest). In any of these methods (or apparatuses configured to perform all or some of these methods), transmitting may include repeatedly and sequentially transmitting sounding patents in each of three of more different modulation types.

As mentioned, each sounding packet may encode error vector magnitude (EVM) information.

Error vector magnitude (EVM) information may be determined from the received sounding packets by, for example, selecting the error vector magnitude information from the received sounding packets based on the highest-order modulation type received by the second radio device.

Displaying one or both of the constellation diagram and the histogram based on the error vector magnitude information may include displaying both the constellation diagram and the histogram. Displaying an animated constellation diagram by generating pseudo-EVM data points may include updating the constellation diagram by generating new pseudo-EVM data points based on the EVM information before determining new EVM information from received at least some of the plurality of sounding packets.

Transmitting the plurality of sounding packets from the first radio device may include transmitting three sounding patents comprising BPSK, 16QAM, and 256QAM (though any other and/or additional modulation types may be used).

Displaying one or both of the constellation diagram and the histogram may include displaying an animated constellation diagram by plotting pseudo-EVM data points based on the error vector magnitude information, wherein the pseudo-EVM data points are determined within a standard deviation of the error vector magnitude information determined as described herein.

Any of the methods described herein may also include selecting the modulation type of the constellation diagram based on the received sounding packets. As mentioned, the constellation diagram may be displayed as the highest modulation type that was successfully and/or reliably transmitted.

Also described herein are wireless devices configured to optimize modulation type when wirelessly communicating. As mentioned above, these apparatuses may be access points configured to estimate EVM (and/or pseudo-EVM) information and provide for the display of this information, e.g., as a constellation diagram. For example, a device may include: a wireless radio; an antenna; and a controller coupled to the wireless radio and configured to receive a plurality of sounding packets wherein at least some of the sounding packets have been modulated with different modulation types, wherein the controller is configured to determine error vector magnitude (EVM) information from the received at least some of the plurality of sounding packets; and an output coupled to the controller and configured to output one or both of a constellation diagram and a histogram based on the error vector magnitude information.

The controller may be configured to transmit a second plurality of sounding packets from the wireless radio and antenna, wherein at least some of the sounding packets of the second plurality of sounding packets are transmitted in different modulation types (e.g., transmitted a three or more modulation types where each sounding packet indicates/encodes the type of modulation that it is being transmitted at). For example, the controller may be configured to receive at least three or more sounding packets, wherein each of the three or more sounding packets are transmitted in a different modulation type. A controller may be configured to receive a plurality of sounding packets, wherein the sounding packets are transmitted in different modulation types selected from the group consisting of: BPSK, QPSK, 16QAM, 64QAM, 256QAM and 1024QAM. The controller may be configured to receive the plurality of sounding packets that are repeatedly and sequentially transmitted in each of three of more different modulation types.

In general, the controller may be configured to receive sounding packets that encode EVM information, including information about packets that the controller previously transmitted that were received by the client device. Thus an apparatus may be a client device that includes a wireless radio, antenna, and a controller (e.g., processor) that also receives sounding packets (transmitted by the AP), and transmits sounding packets back to the AP and encodes information about the sounding packets (e.g., EVM information) that is derived from the received sounding packets (sounding packets from the AP).

Thus, in any of these devices and methods, the controller may be configured to determine EVM information encoded in the received plurality of sounding packets and/or based on the quality of the sounding packets. For example, the controller may be configured to determine EVM information by selecting EVM information from the received sounding packets based on the highest-order modulation type received by the device.

In general, the controller may be configured to output EVM information about one or more links (client devices). For example, the controller may be configured to output both a constellation diagram and a histogram.

A controller may be configured to output an animated constellation diagram by generating pseudo-EVM data points and updating the constellation diagram by generating new pseudo-EVM data points based on the EVM information before determining new EVM information from received at least some of the plurality of sounding packets. Thus, as mentioned above, pseudo-EVM data points may be generated (e.g., randomly generated) within a predetermined range based on the already-determined and/or approximated EVM data, giving the appearance of a dynamic display. For example, the output may be configured to output an animated constellation diagram by providing pseudo-EVM data points based on the error vector magnitude information, wherein the pseudo-EVM data points are within a standard deviation of the error vector magnitude information.

Described herein are method for optimizing and/or automatic selection of the channel frequency and/or bandwidth of a network, e.g., of an access point and its client devices. Also described herein are apparatuses including devices, and in particular access point devices, that are configured to optimize the channel frequency and/or bandwidth (and in some cases automatically change the channel frequency and/or bandwidth) based on historical frequency spectral information going back at least 24 hours, but in some cases further than 48 hours, 3 days, 4 days, 5 days, 6 days, 7 days, 8 days, 9 days, etc., as well as usage data (e.g., signal strength) specific to all or some of the device(s) forming the network. The optimization may also account for device-specific usage parameters based on applied priority (e.g., a ranking or grading applied by the user or another party). This allows the apparatus to more effectively optimize the channel frequency (and/or bandwidth) based on the actual or expected needs of the network.

For example, described herein are methods and apparatuses for optimization of channel selection for an access point of a wireless network, including automatic optimization and channel selection for the wireless network. Channels selection may be optimized by usage data and historical frequency spectral information from all or a sub-set of wireless devices (e.g., stations) in the wireless network. For example, described herein are wireless access points and methods of using them for optimizing channel selection by collecting historical (e.g., 24 hours or longer) frequency spectral information and usage data (e.g., signal strength) devices wirelessly connected to the access point, and determining a list of frequencies having high spectral efficiencies, in bit per second per a channel width.

For example, a method of optimizing channel selection for an access point wirelessly connected to one or more other devices may include collecting, in the access point, 24 hours or longer worth of frequency spectral information; collecting, in the access point, usage data for the one or more other devices wirelessly connected to the access point; and determining a ranking of spectral efficiency, in bit per second per a channel width, for a plurality of frequency channels based on the collected frequency spectral information and the usage data.

A method of optimizing channel selection for an access point wirelessly connected to one or more other devices may include: collecting, in the access point, 24 hours or longer worth of frequency spectral information; collecting, in the access point, usage data for the one or more other devices wirelessly connected to the access point; determining a ranking of spectral efficiency, in bit per second per a channel width, for a plurality of frequency channels based on the collected frequency spectral information and the usage data; and automatically selecting the channel for the access point based on the determined ranking.

Any of these methods may include automatically selecting a channel for the access point based on the determined ranking.

In addition, any of these methods may include displaying the ranking of frequency channels based on the collected frequency spectral information. Displaying the ranking may include displaying some number of the top-ranked channels (e.g., the top one, the top two, the top three, the top four, etc.); the actual rankings/score does not need to be displayed. For example, any of the methods may include displaying one or more of a top-ranked frequency channel based on the determining a ranking.

The methods for optimizing may also include allowing a user to graphically select a frequency and displaying a spectral efficiency for the selected frequency based on the collected frequency spectral information and usage data. Spectral efficiency may also be called spectrum efficiency or bandwidth efficiency and may refer to the information rate that can be transmitted over a given bandwidth in a specific communication system.

In any of the methods (and apparatuses configured to implement these methods) the user may manually set the channel width (bandwidth) and/or one or more default channel widths may be assumed; for example, multiple channel widths may be used and displayed. In some variations the method and/or apparatus may automatically determine a channel width based on the network, such as the use data for the network component devices and/or the properties of the AP and/or client devices (e.g., the maximum and/or preferred bandwidth for the network devices), etc.

In general, the AP and/or all or some of the client devices may be configured to detect spectral information. As described in greater detail below, the AP and/or all or some of the client devices may include a receiver configured as a spectrum analyzer, which may operate in parallel with the wireless radio receiver/transmitter to detect power in the spectrum within and/or around the portion of the frequency spectrum including the operational channels. Frequency spectral information may be collected for any appropriate amount of time, such as for greater than 24 hours, greater than 48 hours, greater than 3 days, greater than 4 days, greater than 5 days, greater than 6 days, greater than 7 days, greater than 8 days, greater than 9 days, etc. This information may be collected by the access point and/or by the client devices, and may be retained locally (e.g., at the AP) and/or stored remotely (e.g., in the cloud). For example, collecting frequency spectral information may include collecting 7 days or longer of frequency spectral information, e.g., in the access point. Collecting frequency spectral information may include collecting frequency spectral information from each of the one or more client devices (although the network may also include client devices that do not monitor and/or collect frequency spectral information). Collecting frequency spectral information may include collecting frequency spectral information covering the portion of the spectrum to be used by the network. For example, any appropriate frequency spectral range may be included, e.g., 5 GHz to 6 GHz (e.g., covering the 5 GHz band), 2.4 GHz to 2.5 GHz (e.g., covering the 2.4 GHz band), 3.60 to 3.70 (e.g., covering the 3.6 GHz band), 60.0 to 61.0 GHz (e.g., covering the 60 GHz band), etc.

The frequency spectral information may be collected at any appropriate rate. For example, collecting frequency spectral information may include collecting frequency spectral information at least once every hour from one or more of the one or more other devices (e.g., once every minute, once every 2 minutes, once every 5 minutes, once every 10 minutes, once every 15 minutes, once every 20 minutes, once every 30 minutes, once every 45 minutes, once every hour, once every 2 hours, once every 3 hours, once every 4 hours, once every 5 hours, once every 6 hours, once every 7 hours, once every 8 hours, once every day, etc.).

Usage data may be collected at the access point for all or some of the devices (e.g., client devices, CPEs, etc.). In general, usage data may refer to the strength of the signal between the device and the AP to which it is communicating. For example, collecting the usage data may include collecting transmitted and received signal strength for the one or more other devices wirelessly connected to the access point. Collecting the usage data may include collecting data including the percentage of time that the one or more other devices are using a channel. Any other usage data for the devices connected to the network may be used or included.

In general, all or a subset of the client devices connected to the access point may be used to determine then spectral efficiency of a plurality of different frequencies for different channels. In some variations a subset of the client device may be used. For example, the client devices may be ranked or weighted and these rankings/weights used to calculate the spectral efficiency. In general for each device (e.g., for each client device communicating with the access point), the spectral information for that device and the signal strength for communication between the device and the AP may be used to determine a data rate (expected data rate) or capacity. For example, the signal strength and historical frequency spectral information may be used to determine a signal to interference plus noise (SINR) that, in the context of each device (e.g., client device) communicating with the AP may be used to determine a data rate. For example, a lookup table specific to each client device (or type of client device) may be used to determine data rate from SINR. The data rate can then be divided by the channel width to give spectral efficiency. When there are multiple devices in the network (e.g., multiple client/CPE devices), the data rates may be combined (e.g., the mean, median, weighted average, etc.) in some way, or the maximum or minimum average may be used. In some variations, only the lowest (worst case) or highest (best case) or some number of lowest or highest data rate devices may be used to determine an aggregate data rate that can be used to determine the spectral efficiency. Alternatively or additionally, the aggregate date rate for the network that may be used to determine overall spectral efficiency for a frequency may be determined by using a subset of devices that meet some predetermined criterion. For example, only devices that are in the top n devices based on their station efficiency, as described above, may be used to determine spectral efficiency.

Thus, a set of spectral efficiencies for different channels may be determined and this set of spectral efficiencies may be ranked (e.g., highest to lowest spectral efficiency). Thus, determining a ranking of spectral efficiency for each of a plurality of frequency channels may include determining a channel capacity for each of a plurality of channels (e.g., by determining an average or minimum data rate from the collected spectral information) and dividing the channel capacity by the channel width.

Also described herein are apparatuses that are configured to optimize the channel selection, and in particular, described herein are access points that are configured determine optimal frequency channels within a range or frequencies based on the usage information and historic frequency spectral information for client devices that are in wireless communication with the access point. For example a wireless access point device configured to optimize channel selection for the access point may include: a wireless radio; an antenna; and a controller configured to collect, receive, and store 24 hours or longer worth of frequency spectral information, and to receive and store usage data for one or more devices that is wirelessly connected to the access point; wherein the controller is configured to determine a ranking of spectral efficiency, in bit per second per a channel width, for a plurality of frequency channels based on the collected frequency spectral information and the usage data, and to either present one or more of the highest-ranked frequency channels or automatically select the channel for the access point based on the determined ranking.

The controller may be configured to automatically set the channel of the wireless radio based on the highest-ranked frequency channel. In methods and apparatuses for automatically selecting the channel, a minimum dwell time may be used (and may be preset or user adjustable). The channel may not be changed until the minimum dwell time has expired (e.g., 1 second, 10 seconds, 30 seconds, 1 minute, 2 minutes, 5 minutes, 10 minutes, 15 minutes, etc.).

The methods and apparatuses described herein may be configured so that the user may be shown a figure representing a range of frequencies and the best (optimized) channels indicated, as well as their score (e.g., the spectral efficiency) shown. In some variations the user may also manually select or input a particular frequency and the spectral efficiency for this channel may also be shown. The user may also manually enter the channel width (or may select a channel width from a menu of options) and/or may select the frequency range of interest to be optimized within. Thus any of the apparatuses described herein may be configured to output the one or more of the highest-ranked frequency channels to a display device. For example, the controller may include or may communicate with a graphical user interface that is configured to display frequency spectral information at different frequencies and label one or more of the highest-ranked frequency channels on the display. For example, the controller (AP) may host a device-specific address that displays and receives (e.g., user input) any of the information described herein. Alternatively or additional the AP may be configured to transmit the information to a third-party server or device for display.

In general, any of the devices (e.g., AP devices) described herein may include an output configured to output the one or more of the highest-ranked frequency channels.

The controller may be configured to collect frequency spectral information for 48 hours or longer.

A method of selecting a channel frequency and bandwidth to change a network comprising an access point and a plurality of stations to may include: receiving from a spectrum analyzer at each of the stations a description of the power in a plurality of frequencies at one or more times to determine an ambient noise floor for each frequency in the plurality of frequencies; weighting each ambient noise floor by a factor weight specific to each frequency; determining a goodness of each of a plurality of channels based on the weighted frequencies; and presenting a list of the plurality of channels ranked by the determined goodnesses.

A method of selecting a channel frequency and bandwidth to change a network comprising an access point and a plurality of stations to, the method comprising: receiving from a spectrum analyzer at each of the stations a description of the power in a plurality of frequencies at one or more times to determine an ambient noise floor for each frequency in the plurality of frequencies; determining an achievable data rate for a plurality of channels; determining a goodness of each of channel of the plurality of channels based on the ambient noise floor for a subset of the plurality of frequencies within each channel and the determined achievable data rate of each channel; and presenting a list of the plurality of channels ranked by the determined goodnesses.

BRIEF DESCRIPTION OF THE DRAWINGS

FIG. 3 is an example of Merlin and WASP (Qualcomm Atheros Wifi chipsets) code that returns transmit duration, the duration of successful attempts (which can be 0 for a total failure), and the total duration of the failed attempts.

FIGS. 4A and FIG. 4B are examples of Merlin and WASP (Qualcomm Atheros Wifi chipsets) code for functions that can account for the airtime used by each packet and that reset the accumulation after an elapsed interval and does the averaging.

FIG. 10 is a table illustrating parameters and variables for one variation of a method of determining constellation plots and/or histograms.

FIGS. 11A and 11B illustrate exemplary EVM packets (e.g., sounding packets/EVM measure requests and EVM reports).

FIG. 12 is one example (shown as Matlab code) of a method for determining the standard deviation of the EVM (estimated EVM) that may be used to generate a constellation diagram as described herein.

FIGS. 13A-C are examples (shown as Matlab code) of a method for looking up various QAM "clean" (e.g. ideal) points.

FIGS. 14A-C are examples (shown in Matlab code) of a method for generating Gaussian noise samples for the estimated EVM values to create the cloud of points representing the distribution of EVM values in a constellation diagram.

FIG. 15 is an example (shown as Matlab code) of a method that may be used to calculate bin placement of estimated EVM (CINR) values when generating a histogram.

FIG. 16 is another example of a graphical representation of an indicator of the efficiency of an access point for monitoring the health of an AP of a wireless network, shown as a bar chart.

FIG. 17 schematically illustrates center frequency and bandwidth.

FIG. 18 graphically illustrates the difference between receive power level, ambient noise floor, and thermal noise, and the instantaneous carrier to interference noise ratio (CINR).

FIG. 21 schematically illustrates one variation of a spectrum information packet.

FIG. 22A shows one example of a calculation to determine goodness over a bandwidth.

FIG. 22B schematically illustrates one variation of the use of channel information and information from the connected device(s) to determine the "goodness" of the bandwidth.

DETAILED DESCRIPTION

Figure 1:
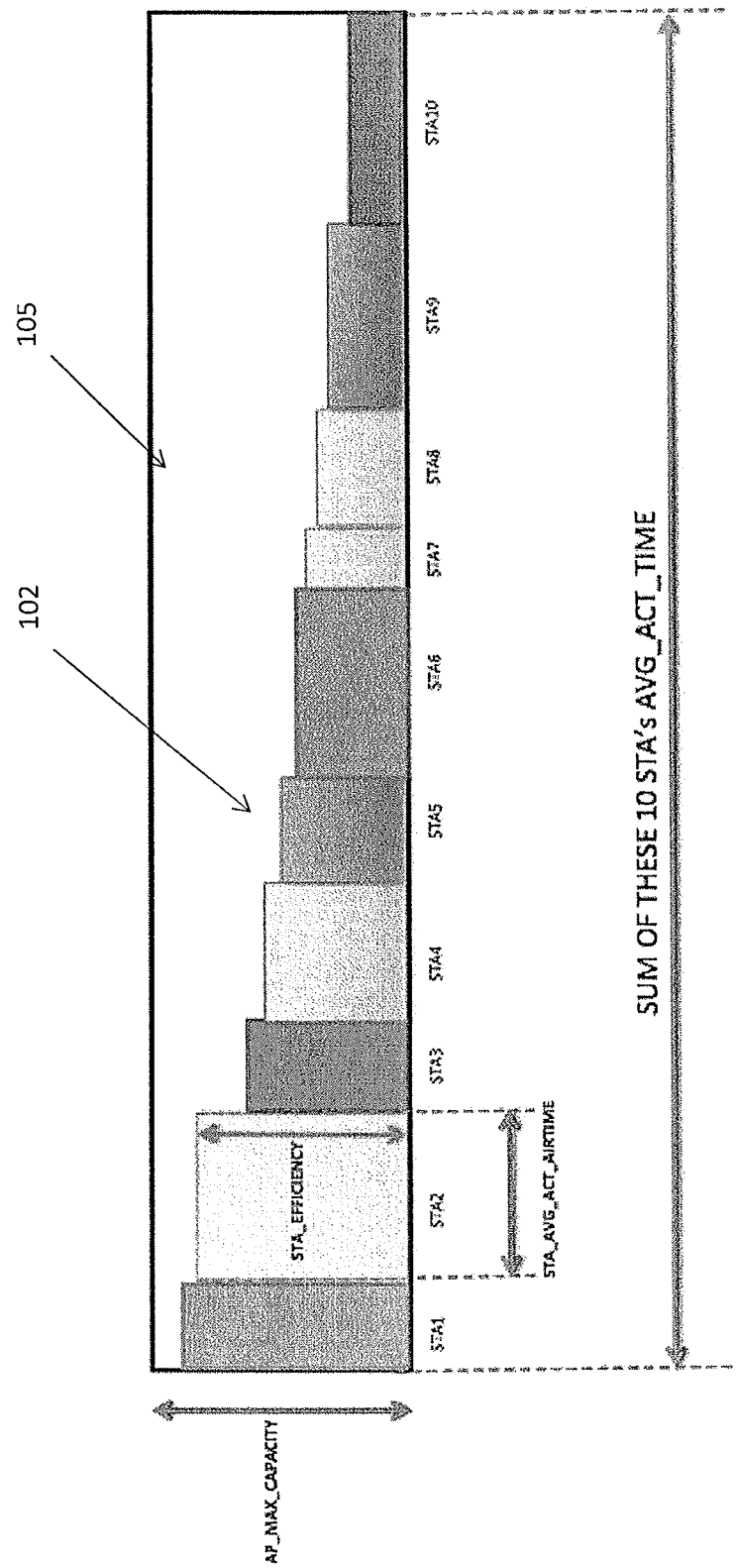
FIG. 1 is a graphical representation of an indicator of the efficiency of an access point for monitoring the health of an AP of a wireless network, shown as a bar chart. In this example, a subset of the stations communicating with the AP (e.g., n=10) are labeled and the station efficiency (as described herein) is shown on the y axis while station average active airtime (as described herein) is shown on the z axis.

Described herein are apparatuses and methods for monitoring network health, including in particular, the health of an access point (AP). The health may be determined and presented as a graphic metric that quickly and usefully informs (at a glance) a network operator (e.g., administer, WISP provider, etc.) of other provider servicing a network, information about the overall and specific efficiency of the network (e.g., AP). For example, described herein are systems and methods for preparing and displaying a metric, including graphical metrics, of the health of the network. A system may include, for example, non-transitory computer-readable storage medium storing a set of instructions capable of being executed by a processor that cause the processor to present the metrics described.

In general, the metrics described herein present a selected and relevant subset of information from the network that is most relevant to overall health as may be required by a network operator. This information is generally determined in a periodic basis and updated, and may include or incorporate both the most recent (e.g., within the last few seconds to minutes) as well as recent historical information (e.g., from the previous minutes, hours, days, weeks, months, etc.).

Part I: Devices (e.g., CPE) Network Ranking

As mentioned, the overall network (or partial network) health, including in particular the health of one more access point of a network, may be monitored by providing information to/from each (e.g., all or most) of the stations communicating with the access point within a predetermined period of time (e.g., hours, days, weeks, months, years) and using a sub-set of these stations (e.g., the "top" stations) to present with information about their impact on the network/access point. Generally, the information used to determine these metrics may be monitored at the access point and at the station and exchanged between them. This information may be stored and otherwise manipulated to determine estimates for overall efficiency of each station as well as actual usage information. In general, this information may include the most recent time period/interval (e.g., sample period of 30 seconds) and/or it may include (or may not include) historical information, which may be weighted so that current data is either emphasized or de-emphasized. Also, in any of the variations described herein the efficiency and activity time for each station may be empirically determined and/or may be compared with ideal or projected information, based on equipment speculations, For example, in general, the transmit air-time of a packet between each station and access point may be tracked. This is the actual air-time used by a packet, including all retries. This is calculated after the transmission is complete. For each packet the following may be used: Total packet transmit duration: Dt; Duration of failed attempts: Df; Duration of successful attempts: Ds. In general, Dt=Df+Ds.

An example Merlin and WASP (Qualcomm Atheros Wifi chipsets) code is shown in FIG. 3, that returns the actual transmit duration and also returns the duration of the successful attempt (which can be 0 for a total failure), and the total duration of the failed attempts.

Per-STA TX packet air-time and error-rate accounting may also be determined between access point and each station. This may be done using simple accumulate and average mechanism. For example, Dt value for the packet may be accumulated on a per-STA basis into a "totalaccumairtime" variable. This may be done over time 'Ai' which is the averaging interval. Similarly, the Df and Ds values may be accumulated on a per-STA basis (totalaccumfail and totalaccumsucc). Once we have accumulated for more than Ai amount of time, i.e., elapsed duration De>Ai, the airtime-usage percentage for the current elapsed period may be calculated, e.g., as follows: airtime=(totalaccumairtime*100)/De Similarly, the packet error rate for the current elapsed period may be computed as: per=(totalaccumfail*100)/(totalaccumsucc+totalaccumfail).

Note that this automatically adds more weight to the packets that are longer in duration as compared to simply counting successful and failed attempts.

The airtime and PER for the current elapsed period may then be added, into an average. In one example, using exponential average: avg_airtime=(avg_airtime+airtime)/2 avg_per=(avg_per+per)/2.

After the averaging, accumulation variables may be reset: totalaccumairtime=totalaccumfail=totalaccumsucc=0. The procedure for accumulation-reset may also need to be called when a remote (e.g., cloud) agent accesses these values to construct a heartbeat if there were no further transmissions to the STA that causes the accounting function to execute.

Example Merlin and WASP code is shown in FIGS. 4A and B, showing an exemplary function (_do_sta_packet_accounting) that accounts for the airtime used by each packet, and a function (_do_sta_tx_stats_refresh) that resets the accumulation after an elapsed interval and does the averaging. For example, _do_sta_packet_accounting may generally be called only during a TXDONE operation. But in the event where there were some transmissions to the station and none after that, the _do_sta_tx_stats_refresh function must be invoked at the time when the cloud agent sends the heartbeat.

The downlink and uplink airtimes may also be determined. For example, on an AP, the routines described above will account for the 'DOWLINK' portion of the airtime and packet-error-rate for each station. On the STA, the routines will account for the 'UPLINK' portion of the airTime and packet-error-rate for the STA→AP direction. Polling protocol modifications are required for AP and STA to communicate these values to each other so that total airTime can be determined As mentioned, polling protocol modifications may be made. As part of the polling protocol in the poll response packet's statistics section (sent by the station) a system may communicate the station's airtime and packet-error-rate to the AP. The statistics portion may typically already contain the current rate-control's PHY rate in Kbps and the max possible PHY rate according to chain-mask. For example, in some systems the AP already evaluates the statistics of each STA. As part of that process, the AP updates the stations TX airtime and per into corresponding RX fields. For example, sta→rx_airtime_avg and sta→rx_per_avg.

In the same way, as part of the poll request packet's statistics section (sent by the AP), a system may communicate the station's TX airtime and packet-error-rate to the STA. The STA may also update the TX airtime and PER into corresponding TX fields.

In general, downlink/uplink isolated capacity may be determined. For example, ISOLATED_CAPACITY may be determined as ISOLATED_CAPACITY=(PHYRATE*MAC_EFFICIENCY_PERCENT*(100−PER))/10000. Since we may have PHYRATE and PER in both directions we will have two separate values Downlink-Isolated-Capacity and Uplink-Isolated-Capacity. MAC_EFFICIENCY_PERCENT may be a system based constant. For example, in an 802.11ac system, 75% may be used and/or may be empirically determined. In other words, these values may indicate potential throughput if the station were using the network alone (i.e. isolated).

This value may be confirmed to confirm that a Subscriber is not RF limited, i.e., the operator may oversubscribe his AP but the RF characteristics may be fine, and in this case the actual throughput may be lower, but it is not lower because of RF for which he may need to take some action.

Total airtime and isolated capacity may be determined. The TOTAL_AIRTIME may be the sum of DOWNLINK and UPLINK airtimes. The TOTAL_ISOLATED_CAPACITY is typically the average of DOWNLINK and UPLINK isolated capacity.

As mentioned above, in general, the methods and systems described herein may be operated, refreshed and/or updated during a remote (e.g., cloud) agent "heartbeat". In general the heartbeat is the transmission of operational parameters from the stations and/or AP to a remote site (e.g., a cloud server or the like) and/or to the AP or another AP. This heartbeat is transmitted at regular intervals, such as every 30 seconds (or any other appropriate time period). The cloud heartbeat may communicate the average-airtime (both directions), average-per, phy-rate, max-phy-rate, downlink-capacity, uplink-capacity to the cloud.

Computations may be performed remotely, including on the cloud. On the cloud, the following computations may be done at each heartbeat (in addition to storing the current heartbeat values into storage):

```
IF HEARTBEATS_SINCE_RESET > WINDOW_SIZE
THEN
    ACTIVE_AIRTIME_COUNTER /= 2
    ACTIVE_AIRTIME_ACCUMULATION /= 2
    HEARTBEATS_SINCE_RESET = 0
ENDIF
IF TOTAL_AIRTIME > Y THEN
    ACTIVE_AIRTIME_ACCUMULATION +=
    TOTAL_AIRTIME
    ACTIVE_AIRTIME_COUNTER++
    AVG_ACTIVE_AIRTIME =
(AVG_ACTIVE_AIRTIME + TOTAL_AIRTIME)/2
ENDIF
HEARTBEATS_SINCE_RESET++
```
WINDOW_SIZE may be defined based on the normal heartbeat interval to prevent any overflows.

For a 30-second heartbeat, there will be 2880 heartbeats in a 24-hour window. Hence WINDOW_SIZE can be defined as 2880. The above code accumulates the periods of air-time when the station's activity was greater than Y. Y should ideally be defined as the 100/NUMBER_OF_STATIONS_ON_CONNECTED_AP. So for an AP with 50 stations, Y would be 2% for fair-sharing the network. And in such a case we accumulate airtimes for times-when the usage is above the 2%.

The Accumulation is reset by half after we cross the window-size. This will essentially use ½ weight for past data.

Station efficiency may also be estimated or calculated. For example, the efficiency of the STATION is computed by a simple ratio of its total isolated capacity to the AP_MAX_CAPACITY as a percent: STA_EFFICIENCY=(TOTAL_ISOLATED_CAPACITY*100)/AP_MAX_CAPACITY Where:
AP_MAX_CAPACITY=(MAX_PHY_RATE_OF_AP*MAC_EFFICIENCY_PERCENT)/100

As mentioned above, when preparing to determine the visual display (and the analysis of network/AP health), the "top" users may be determined. In some variations these top users may be determined on the cloud. For a given AP, the method (or a processor, including a remote or "cloud" server) may get a station list, listing all of the stations communicating with the AP during the predetermined time interval (e.g., hours, days, weeks, months, etc.). For each station, the system (or method) may compute a Usage-Index ("Ui") as follows:

Ui=ACTIVE_AIRTIME_ACCUMULATION/ACTIVE_AIRTIME_COUNTER

The stations may then be sorted as follows: (1) by HIGHER Ui value; (2) if two stations have the same Ui value, sort by LOWER TOTAL_ISOLATED_CAPACITY. From this sorted list selected the first N. This will be the TOP-N users over the last 24 hours. The 'TOPNESS' is not necessarily according to just airTime, but also according to lower-capacity and airTime, and by clients that are bursty. For example, n may be 10 (though any appropriate number may be chosen).

Graphical Display

In preparing a display, the method or system may present a "TDMA window" graph, as shown in FIG. 1. In this example, the image is formed by sorting the TOP-N stations determined above by the STA_EFFICIENCY in descending order. The AVG_ACTIVE_AIRTIME value is used for the horizontal axis, and the STA_EFFICIENCY for the vertical axis. The maximum value for the vertical axis is the AP's maximum possible capacity value=AP_MAX_CAPACITY.

In FIG. 1, the maximum value of the horizontal axis is the SUM_OF_TOP_N(AVG_ACT_AIRTIME) value.

The AP efficiency may be immediately and intuitively determined from FIG. 1 based on the overall amount of shading 102. For example, the efficiency of the AP can be considered as the area of this shaded 102 (colored) area, compared with the unshaded 105 region. In FIG. 1, each station may be uniquely identified by a color; the stations may also be labeled or identified when clicking on or "mouseing over" the shaded region corresponding to the station. As a consequence of the technique/system described above, only the TOP-N stations selected above are considered in determining the efficiency of the AP. Thus:

AIRTIME_SUM=SUM_OF_TOP_N(AVG_ACT_AIRTIME)

WEIGHTED_AIRTIME_EFF=SUM_OF_TOP_N (AVG_ACT_AIRTIME*STA_EFFICIENCY)

AP_EFFICIENCY=(WEIGHTED_AIRTIME_ EFF*100)/(AIRTIME_SUM*AP_MAX_CAPACITY)

Figure 2:
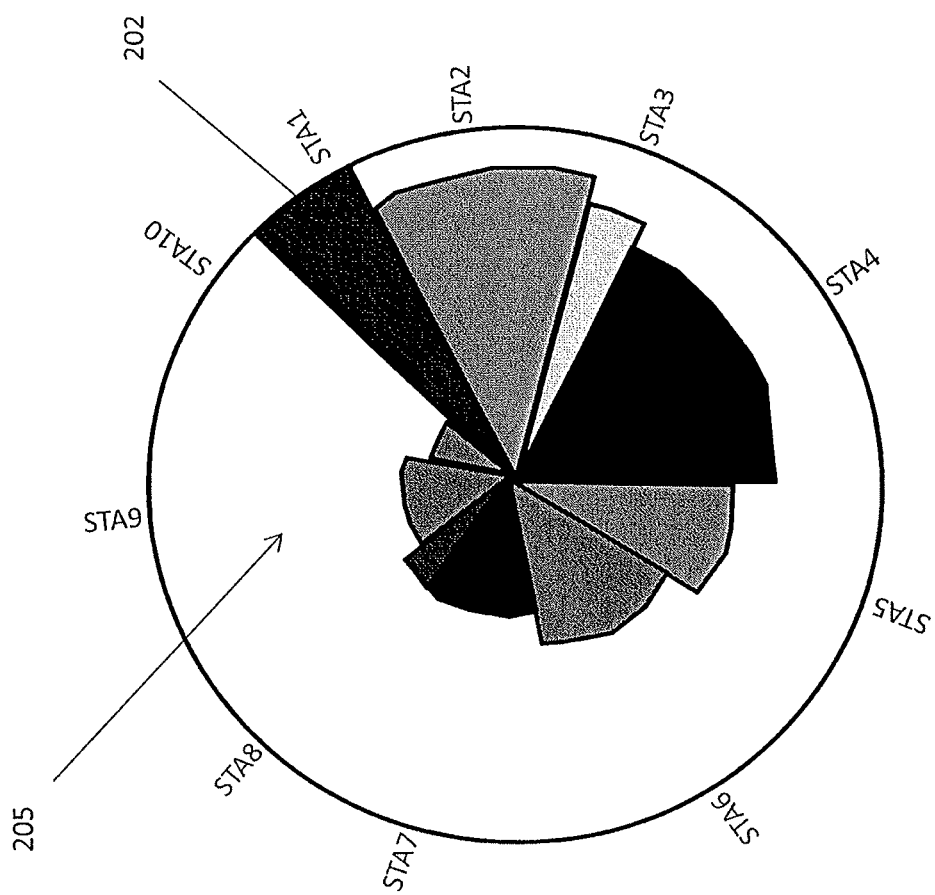
FIG. 2 is another variation of an indicator of the efficiency of an access point for monitoring the health of an AP of a wireless network, shown as a radial chart. In this example, a subset of the stations communicating with the AP (e.g., n=10) are labeled and the station efficiency (as described herein) is shown as the radial distance, while station average active airtime (as described herein) is shown as the angular distance.

As mentioned above, any appropriate graphical presentation or technique may be used to display this information. For example, FIG. 2 illustrates another graphical depiction of the network health, in which a radial axis is used. In this example, the AVG_ACTIVE_AIRTIME value is shown as the angular distance (portion of the circle), while the STA_EFFICIENCY is shown for the radius of each segment of the circle corresponding to the individual stations (ranked by top stations). AP efficiency may be immediately and intuitively determined from FIG. 2, as above for FIG. 1, based on the overall amount of shading 202 compared to non-shaded regions 205.

Estimating and Displaying Error Vector Magnitude

Any of the systems described herein may generate a histogram and/or constellation diagram based on the Error Vector Magnitude (EVM). An EVM, sometimes also called receive constellation error or RCE, is traditionally a measure used to quantify the performance of a digital radio transmitter and/or receiver. As described above, a signal sent by an ideal transmitter or received by a receiver would have all constellation points precisely at the ideal locations (depending on the modulation type), however imperfections such as carrier leakage, low image rejection ratio, phase noise etc., may cause the actual constellation points to deviate from these ideal locations. EVM may be thought of as a measure of how far the points are from the ideal locations. Noise, distortion, spurious signals, and phase noise all degrade EVM, and therefore EVM provides a measure of the quality of the radio receiver or transmitter for use in digital communications.

Although traditionally transmitter EVM is measured by specialized equipment, which demodulates the received signal in a similar way to how a real radio demodulator does it, it would be helpful to provide a measure of EVM (and graphical presentation of EVM) that may be quickly and easily determined and displayed during normal operation of a radio (transmitter and/or receiver).

An error vector is a vector in the I-Q plane between the ideal constellation point and the point received by the receiver. In other words, it is the difference between actual received symbols and ideal symbols. The EVM may be thought of as the average power of the error vector, normalized to signal power. For the percentage format, root mean square (RMS) average may be used. The EVM may be equal to the ratio of the power of the error vector to the root mean square (RMS) power of the reference. EVM, as conventionally defined for single carrier modulations, is a ratio of a mean power to a peak power. Because the relationship between the peak and mean signal power is dependent on constellation geometry, different constellation types (e.g. 16-QAM and 64-QAM), subject to the same mean level of interference, will report different EVM values. EVM, as defined for multi carrier modulations, may be a ratio of two mean powers regardless of the constellation geometry. In this form, EVM is related to Modulation error ratio, the ratio of mean signal power to mean error power.

As used herein, carrier to interference noise ratio (CINR) is an excellent proxy for EVM. For example, in implementation, sounding packets specific to two or more known (predetermined) modulation types may be transmitted and received between devices (e.g., between AP and CPE). The receiving hardware may detect the received packet, and analyze the descriptors in the packet to determine an estimate for EVM based on the carrier to interference noise ratio. For example, the hardware may detect a particular sounding packet (corresponding to a particular modulation type), and may analyze descriptors from the packet, and this info may be is embedded in an EVM signal that is reported for concurrent (immediate or slightly delayed) or later (historical) display, e.g., as a histogram and/or constellation diagram.

This determination of EVM (using predetermined sounding packets) may be performed by all or some of the radios in the network (e.g., and may be designed and/or built-in to the chipset of the radio). The EVM determined in this way (and described in more detail below) may provide an approximate estimate of the EVM for the connection between devices, and may be displayed/presented or used as an indication of the transmission quality, which may be measured by the device that demodulates the signal and calculates the noise. For example, the EVM that the device reports (e.g., and this report may be made to a node, such as an AP and/or may be transmitted to a remote location, such as a server), may be more of than just SNR information. The EVM may make use of pilot signals embedded in the packet; the device(s) typically detect the pilot (sounding) signal and know what it should be, and may then calculate the SNR of the pilot signal. This may be reported as the EVM (e.g., CINR, or carrier to interference noise ratio).

As mentioned above, the EVM estimates (EVM) measured over a period of time as described herein may be shown using a histogram. For example, an EVM measurement may be determined between a two (or in some cases more) devices for each sounding packet or set of sounding packets (where a set may correspond to a complete set of predetermined modulation types, e.g., MCS 3, 5, and 8, in reference to the table of FIG. 10, described below, in which MCS 3 corresponds to modulation type and coding rate BPSK, MCS 5 is 64QAM, and MCS 8 is 256QAM.

For example, a histogram may take 64 samples of measured EVM and use them to display histogram (CINR histogram or EVM histogram) that visually shows the EVM (based on this window of time needed to accumulate the 64 samples). As will be illustrated below, these histograms, which aggregate the estimated/approximated EVM based on sounding packets for two or more (e.g., three or more, e.g., four or more) modulation-specific sounding packets, for a window of time corresponding to x received EVM estimates. E.g., the histogram for CINR (estimated EVM) may indicate that the link has better than 20 dB CINR/EVM, but also indicates a cluster near the low 10-20 dB range.

As mentioned, in general, the use of these modulation type-specific sounding packets may allow estimation of EVM. Because of this, the estimated EVMs described herein may also be referred to as SNR at the receiver, which may include distortion in the transmitter in the transmitted signal, and may also include thermal noise at receiver and interference channel. Although it may be desirable to eliminate the transmission distortion (depending on the MCS that was transmitted), in general, different MCS (modulations) transmit with different distortions, because of a tradeoff in power and mode. Transmitting at lower power may result in clearer transmission for high QAM (less distortion). For example, a device (e.g., an AP) may periodically send test packets (sounding packets) at different MCS rates for the clients measuring the EVM, and vice-versa. These test (sounding) packets are typically not data packets. When a sounding packet is received by the device (e.g., AP) from another device (e.g., a CPE), the first device may receive it and/or broadcast it (or the information received from it. As mentioned, the sounding packets may cycle through all or a subset of the different modes used between the devices. See, e.g., FIG. 10.

For example, in some variations, three modulations are use (e.g., BPSK, 64QAM and 256QAM). If a packet is sent at high MCS (e.g., 256QAM), a relatively high SNR may be needed in the link for the receiver to receive it. If the devices in the link are too far apart, for example, the receiver may not be able to receive it, though a lower MCS may be needed to receive e.g., BPSK. However, as mentioned, at this low MCS, the packets may be heavily distorted. For example when transmitting at BPSK, the packet may never be received at an EVM in excess of 15 dB; there may be lots of noise coming from the transmitter. Thus in general, BPSK may be transmitted at high power and allow more distortion. The system(s) may deliberately allow transmission to be distorted at the transmitter to get high transmission power, as a tradeoff between the MCS rate and the EVM that the system estimates. In practice, in some variations only a subset of the possible modulations (MCS) may be measured for the purposes of measuring EVM (CIPC) as described herein. For example, three MCS types may be used.

Examples of exemplary EVM packets (e.g., sounding packets/EVM measure requests and EVM reports) are shown in FIGS. 11A and 11B. For example, a sounding packet may include a normal preamble and then may have basic information in the MAC layer (e.g., MAC ID of the device sending the packet, and ID to the MCS, and identify the MAC layer that also identifies that it's a sounding, e.g., test, packet).

An EVM sounding packet may be communicated at regular intervals (e.g., every 5 sec) and the device may determine from the sounding packets an estimate of CINR (which may be used to estimate EVM). As will be described in greater detail below, this estimate may be displayed, e.g., in a user interface as either or both a histogram or as an estimate of a constellation diagram. This display me be static/average, or it may be dynamic (and updated periodically). In some variation the display, and in particular, the displayed constellation diagram, does not show actual measured points, but an approximation of these points based on the statistical distribution of the values for the estimated EVM. Thus, the actual point location on the constellation diagram may be a pseudo-representation of the actual point, so that the actual position of the points on the constellation diagram (relative to the ideal locations) is false, but the overall distribution of points is accurate. Thus, the general impression (familiar look and feel) provided by the constellation diagram is correct, even if the specific locations of the points are estimated.

The use of the histogram to display estimate EVM (e.g., CINR) may be particularly helpful as interference may be transient. These histograms may be shown with (e.g., alongside) a constellation diagram. Either or both the histogram and constellation diagram may be displayed as (showing the I and Q components) as an animation. As mentioned, the constellation diagram may be a dynamic recreation of what a more precise EVM testing equipment would show, using pseudo-locations for EVM based on the estimates provided by the sounding packets. Thus, the user interface (UI) may create a real-time animation displaying the estimated EVM.

In general, a connection between two or more devices (radio devices) forming a link may estimate EVM and this information may be displayed as one or more constellation diagram and/or histogram. For example, each device forming the link may send sounding packets to seatmate EVM (CINR). Sounding packets maybe sent at particular MCSs to measure the range of EMVs. For example, an AP may broadcast the sounding packets to one or more CPE; the CPE may transmit sounding packets (and information gleamed from the received sounding packets) to the AP. The information received and/or determined from the sounding packets may be held locally (e.g., at the AP) and accessed from the AP directly, and/or transmitted to a remote site (e.g., a cloud location) that may be remotely accessed. The devices and/or the system may use the statistics from the EVM estimates based on the sounding packets to build an EVM histogram and/or constellation diagram. Because the method uses "standard" sounding packets, the result is a reliable indicator, because it does not report raw (e.g., I and Q) samples. Instead, the devices/system may use statistics provided by the radio. The sounding packets chosen may be selected to span the range (dB) of EVM for the link(s), and thus the sounding packets chosen may be used to determine a minimum number to span the entire EVM range.

For example, a BPSK sounding packet may only measure/ reflect a range of 0-10 dB, and may not measure outside of this range because BPSK is inherently distortive. If a sounding packet is based on 16QAM, the range may be good from 0-20 dB, but the sounding packet may not be heard by all of the clients (e.g., if transmitting by AP). In practice, the analysis (e.g., at an AP) may use the "best" sounding packet from the set of MSC packets; typically the highest MCS sounding packet that was able to receive for a link. The CINR may include the transmission distortion, which may be loudest in low MCS packets. The transmission distortion may mask the SNR.

As will be described in more detail below, a user interface may data (histogram and/or constellation diagrams) for one or more links or ends of the link. For example, a user logging into a user interface may be presented with the histogram and/or constellation diagram for the EVM (CINR) at the access point; however the user may select displays of one or more CPEs that a particular AP is communicating with. Additional information, such as link capacity, signal to noise ratio, remote and/or local signal strength, thermal noise, etc., may also or alternatively be shown, on the same, or a different, screen.

FIGS. 5-6 and 9A-9C illustrate examples of histograms of EVM (CINR). In these examples, the histogram looks at the frequency distribution of different EVMs. This distribution in this example is a rolling window of (e.g., 64) different values of EVMs reported by the device(s). For example, a sounding packet may be received at predetermined intervals, e.g., every 5 seconds. Thus, the histogram and/or constellation diagram may update every time a new sounding packet (or new set of sounding packets spanning the set of MSCs examined) is received. For example, a histogram may update every 5 sec, when a new sample in the sliding window of 64 samples is generated. If the device/system does not receive a test packet, it may assume that there is interference at that MCS. When a full set of test packet includes 3 MSCs (e.g., BPSK, 16QAM, 256QAM), the device/system may determine that there are 3 types of test packets transmitted as different MCSs, and if they do not receive one, it may assume that there was interference; when it does not receive the packet, the device/system may update it as a 0 dB EVM (minimum possible EVM). The device/system typically keeps track of the sequence number and determines if one or more packets was not received, and uses this information to estimate/determine the EVM. Thus this information may be used as interference metric, which may be particularly helpful in detecting and/or indicating transient interference. For example, three MSC types of sounding packets may be used (e.g., a BPSK sounding packet reflecting the 0-10 dB range, a 64QAM packet reflecting the 0-15 dB range, and a 256QAM packet reflecting the 0 db-30 dB range). The apparatus/system may use the information for the highest modulation used. For example, if the apparatus/system receives the 256QAM packet, it may use only this member of the set (rather than the BPSK or 64QAM packets), assuming that this most accurately reflects the CINR (e.g., the other packets may be discarded). For example, if they get the 64QAM packet, it may use just the 64QAM packet (as the frequency number for the packet is typically known).

In some variations, multiple histograms may be generated based on the different sounding packets (e.g., different MCSs). For example, where three modulation types are used, three histograms may be generated; the CINR between them may change due to interference. The system may choose the appropriate MCS level based on the range, e.g., the distance between the ends of the link (e.g., between the AP and CPE). This may be accomplished over time by looking at the best MCS (sounding packet) that is consistently received.

Figure 5:
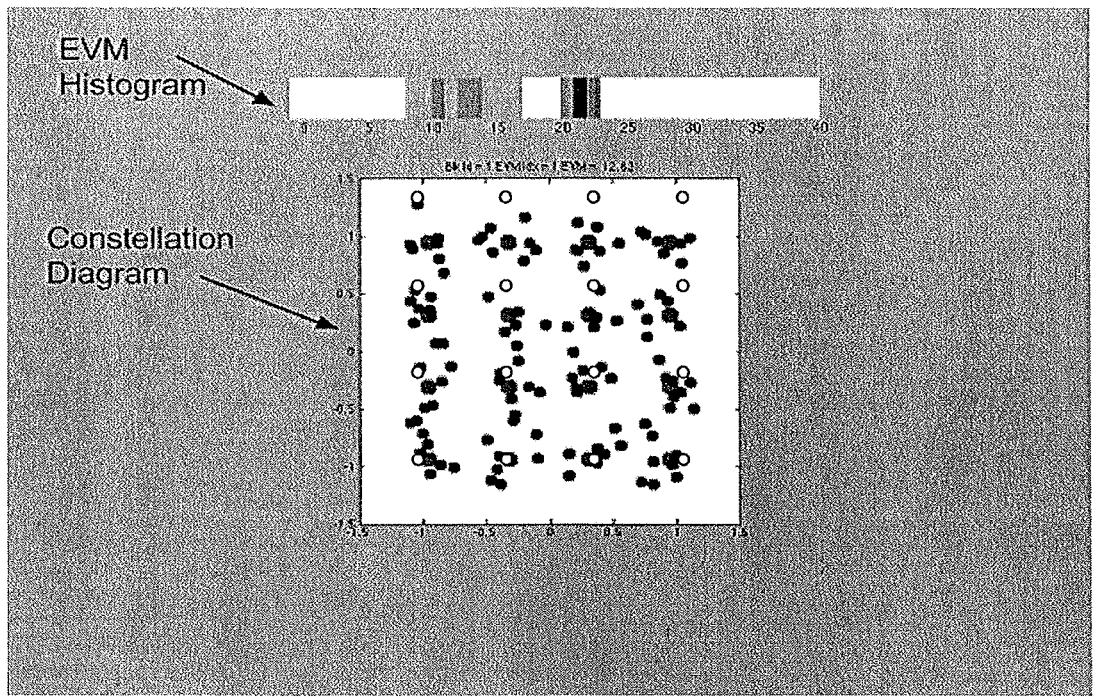
FIG. 5 is an example of a display showing an EVM histogram and a constellation diagram illustrating a snapshot of the performance of an exemplary wireless radio/antenna system.

For example, FIG. 5 schematically illustrates on example of a histogram (top) and constellation diagram for a single stream of one link. FIG. 10 illustrates exemplary parameters and variables that may be used in estimating the EVM/CINR and generating the histogram and/or constellation diagram. In FIG. 5, the constellation diagram shows an approximated (pseudo-valued) distribution of EVM points (solid dots) around ideal locations (circles) for each of the 16 locations in a 16QAM modulation.

An EVM histogram (which may also be referred to as a CINR histogram) may be generated for each end of a link. For example, the firmware/hardware (e.g., driver) of a radio apparatus may be configured to provide a block of EVM samples ("EVM_samples") that are obtained as described above, e.g., from received packet descriptors corresponding to special EVM measurement packets (sounding packets). In one example, the block length of the EVM samples is NUM_EVM_SAMP (with default value of 64). The histogram may be generated by first generating EVM_hist[NUM_EVM_BINS] which represents the histogram of EVM values measured. More precisely: EVM_hist[i_EVM_bin] may correspond to the number of occurrences of the EVM values MIN_EVM+(i_EVM bin-1)*DEL_EVM in the samples set EVM_samples.

Figure 6:
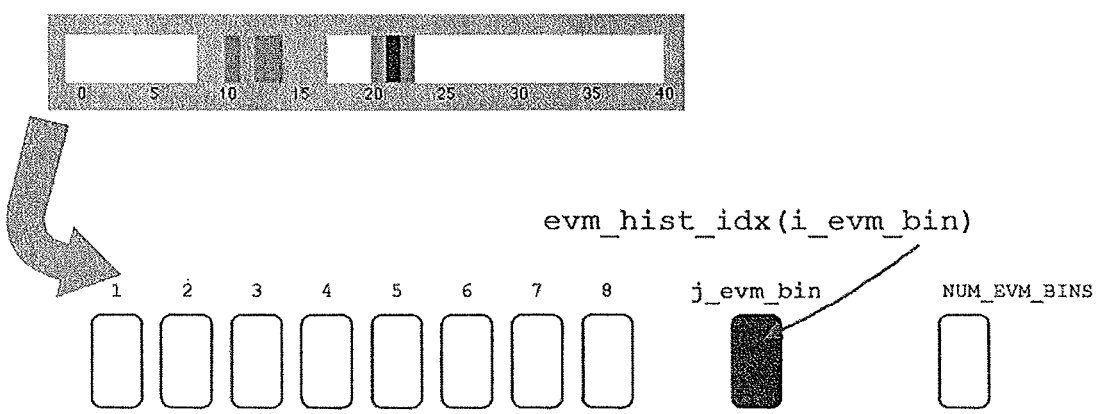
FIG. 6 illustrates one method for generating a histogram of EVM (e.g., CINR) values as described herein.

The EVM histogram may be plotted as shown in FIG. 6, where probabilities are represented by different shades (which may be displayed in color shades). We show NUM_EVM_BINS number of patches where the color of the i_evm_bin-th patch is given by the index evm_hist_idx (i_evm_bin), computed as follows:

Percent (%) convert to probability:
    EVM_prob=EVM_hist/NUM_EVM_SAMP

Percent (%) compute evm_hist_idx:
    evm_hist_idx=place_in_bins(EVM_prob,NUM_PRB_BINS,MIN_PRB,DEL_PRB)

FIG. 15 illustrates one example of a method (shows as Matlab code) that may be used to calculate bin placement (e.g., "place_in_bins").

Figure 7:
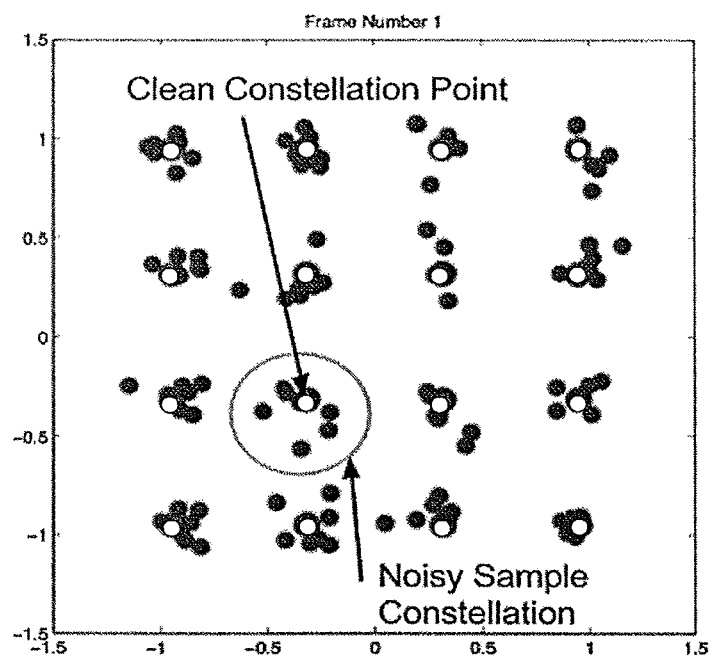
FIG. 7 is another example of a constellation diagram that may be generated, e.g., using pseudo-EMV points illustrating the distribution of the EVM around ideal points, as illustrated herein.
Figure 8:
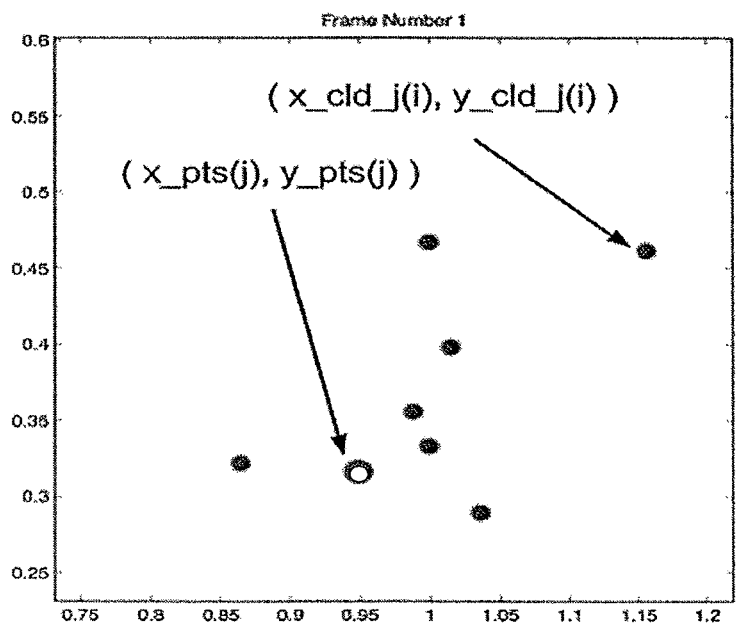
FIG. 8 illustrates a magnified view of the distribution of pseudo-EVM points in the constellation diagram of FIG. 7.

The estimate EMV information (CIRM) may also be used to generate a constellation diagram, as illustrated in FIGS. 5 and 7-8. As mentioned above, this constellation diagram may be a pseudo-EVM constellation diagram, because the EVM is not directly measured, but is instead shown on the constellation diagram based on statistical approximations that may accurately reflect the distribution of EVM values, but not actual measured EVM values. The ability to rapidly and accurately generate estimated constellation diagrams in this manner is advantageous, because these plots, which may be familiar to those using traditional constellation diagrams, may be generated without requiring rigorously generated EVM values (e.g., using dedicated systems necessary to correctly measure EVM).

For example, a single frame of a constellation diagram is shown in FIG. 5 and also in FIG. 7. As mentioned, the constellation diagram may be an animation, which may be updated at actual update rates (e.g., refreshing as new estimated EVM/CINR is determined), or it may be updated/animated/refreshed more often, by generating new pseudo-EVM points using the same distribution information, as described herein. In FIG. 7, the constellation diagram includes: "clean" constellation points shown as open circles (representing the ideal values), and "clouds" of noisy samples associated to each constellation point, shown as solid dots. FIG. 8 shows a close-up of a single constellation point and its associated noisy sample cloud. The distribution cloud points may be generated as described below, from the estimated EVM (CINR) data. For example, the x,y coordinates of the j-th constellation point may be given by:

x_pts(j): x-coordinate of the j-th constellation point
y_pts(j): y-coordinate of the j-th constellation point A total of NUM_NZY_SAMPS noisy samples may be plotted around each constellation point. In the above examples, NUM_NZY_SAMPS=7. For the j-th constellation point, NUM_NZY_SAMPS noisy samples may be plotted, which form a "cloud" around it. The x,y coordinate of i-th point in this cloud may be given by:

x_cld_j(i): x-coordinate of the i-th noisy sample cloud point
y_cld_j(i): y-coordinate of the i-th noisy sample cloud point Example of one variation of a method for computing these values are shown below and exemplary code for performing these methods is shown in FIGS. 12-15.

For example, the standard deviation of the noise samples may be determined. The standard deviation of noise samples, sigma, may be given by:

$$\text{sigma\_average} = \text{sqrt}(\tfrac{1}{2}) \cdot [10^{\wedge}(\text{EVM\_samples}[i\_\text{samp}]/20)]$$

If computing power of 10 is computationally intensive, a look up table may be used. Exemplary code for this is provided in FIG. 12, showing exemplary Matlab code (though other code performing similar or equivalent functions may be used, as is generally true for the exemplary code provided herein), described as "look_up_sigma," for converting a single estimated EVM value into a single sigma value. Using such a function it is possible to calculate:

sigma_average=look_up_sigma(pilot_EVM[1])

Clean constellation points may be generated (QAM constellation points) for each type of modulation. These points may be stored and looked up. For example, exemplary Matlab code is provided in FIGS. 13A-C (lookup_qam_constellation). In this example, vectors of x and y coordinates of the constellation points may be given by:

[x_pts,y_pts]=lookup_qam_constellation(mod_type)

In the constellation diagram, both "clean" constellation points and clouds of noisy sample corresponding to each constellation point are shown. Each of these "clouds" of points representing the distribution of EVM values may include NUM_NZY_SAMPS number of noise samples. For example, noisy samples (in x and y coordinates) may be generated as follows:

x_nze_j=sigma*get_gaussian_noise_samples(NUM_NZY_SAMPS);

y_nze_j=sigma*get_gaussian_noise_samples(NUM_NZY_SAMPS);

An example of a method (encoded as Matlab code) for generating these coordinates is illustrated in FIGS. 14A-C ("get_gaussian_noise_samples"). The noise samples may be added to the constellation points to generate the "noise sample cloud". For example, for the j-th constellation point samples may be estimated as:

x_cld_j=x_pts(j)+x_nze y_cld_j=y_pts(j)+y_nze

Figure 9A:
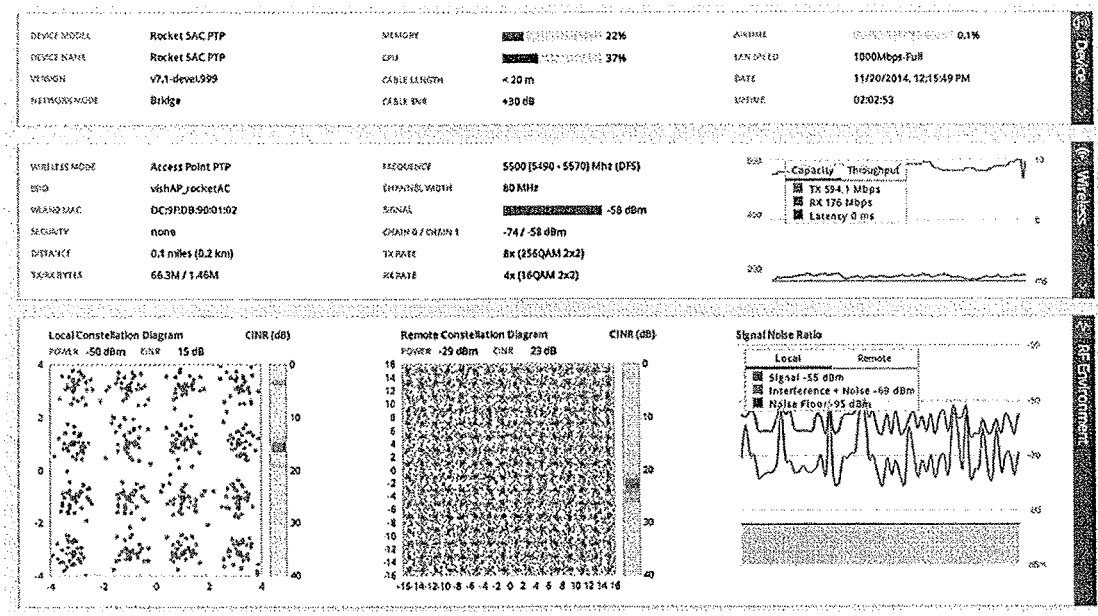
FIGS. 9A-9C illustrate variations of exemplary user interfaces (Us) showing the use of constellation diagrams and histograms of EVM (CINR) data as described herein.
Figure 9B:
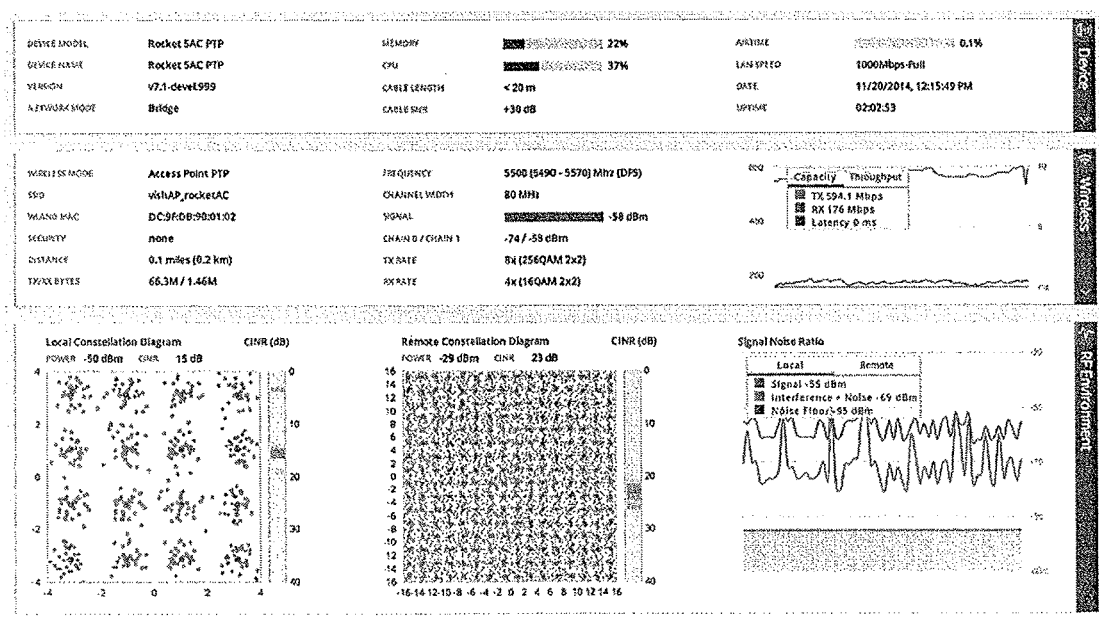
Figure 9C:
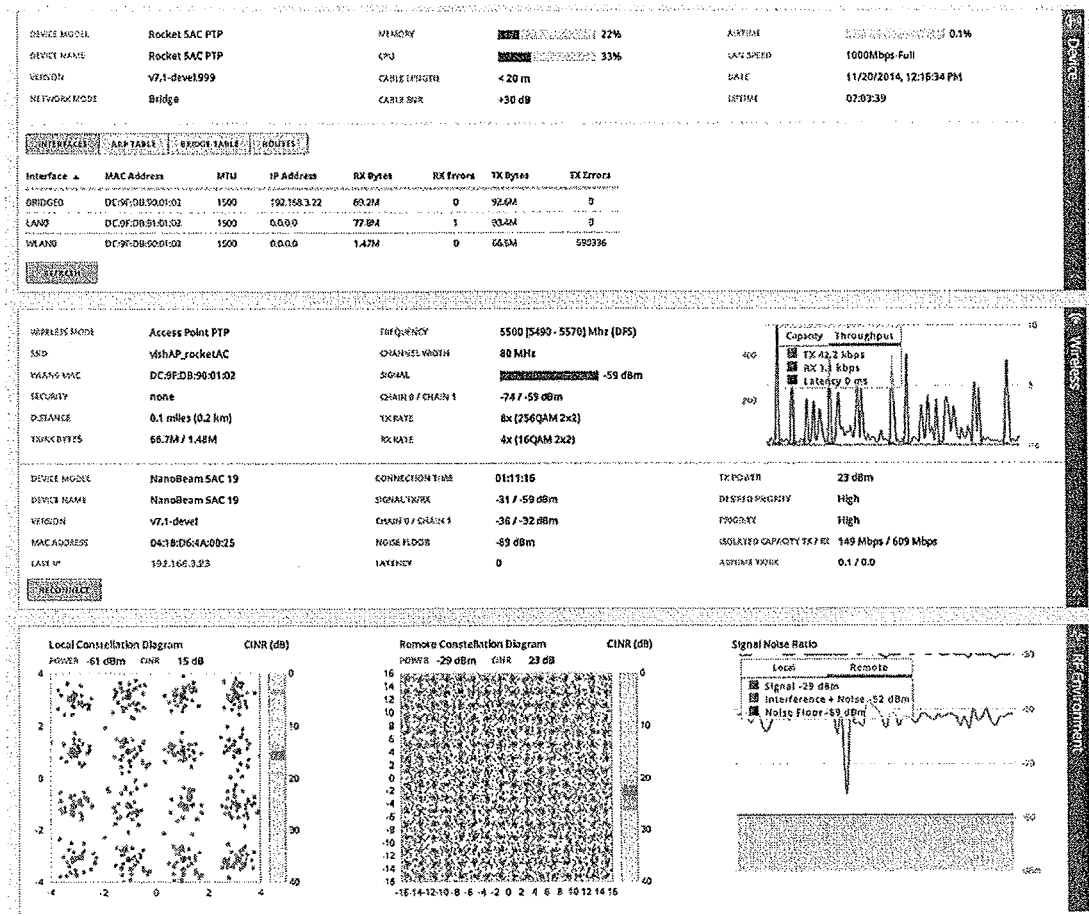
Figure 19:
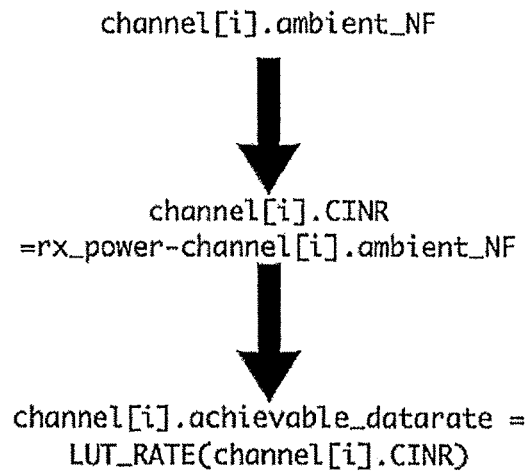
FIG. 19 schematically illustrates one variation of a method of determining goodness of a channel based on estimated achievable data rate of that channel.

FIGS. 9A to 9C show examples of user interfaces that may include pseudo-EVM information in the display, including constellation plots and/or histograms, as well as (in some variations) additional information about the connectivity of a device (or between the device and one or more other devices). For example, in FIG. 19A, the user interface includes a series of panels or regions ("device", "wireless" and "RF environment") describing the status of one or more devices in a network. In this example, the device is described as an exemplary radio (transmitter/receiver), corresponding to a model no. "Rocket 5AC PTP". This device is configured as an access point, and the device tab provides characteristic information, including model, device name, version, network mode, memory, CPU, cable length, cable SNR, airtime, LAN speed, date and uptime. More or less such information may be included. In some variations the device may be selected from a menu of available devices, which may include other (connected) devices. In general this user interface may be accessed either directly, e.g., by connecting to a device such as the AP via a plug, cord or local wireless (e.g., Bluetooth, etc.) connection, or indirectly, via a connection to a remote server (e.g., cloud server) that communicates with the device and/or aggregates the information from the device.

In FIG. 9A, the middle region (tab) may include information specific to the wireless system for the particular device, such as the wireless mode (e.g., access point, CPE, etc.), SSID, MAC identification information, security, distance of link, frequency, channel width, signal, transmission rate, receive rate, etc. This information may be specific to a particular link or more than one link; thus, for example, an access point may communicate with multiple other devices (CPEs, etc.), and a user may toggle between these different links, or the information may be generic to all of the links.

The user interface (including the wireless display portion) may include a graphical illustration of the capacity of the link throughput, as shown in FIG. 9A in the middle right. The graph shown indicates a running (showing the time axis) value of the capacity of the link.

The bottom region of the user interface shown in FIG. 9A indicates the properties of the RF environment, including a pair of constellation diagrams (local and remote) as discussed herein, and EVM (or CINR) histograms adjacent to the constellation diagrams. In this example, the RF environment also shows a running (time axis) view of the signal to noise ratio of the connection, in FIG. 9A the local SNR values are shown (though the remote values may be selected for display, as shown in FIG. 9C).

In the examples shown in FIG. 9A-9C, the local device may refer to the device that you are logged into (e.g., when connected either remotely or directly), while the remote device typically refers to the other device in the particular link you are observing. For example, in FIG. 9B, the signal to noise ratio illustration on the bottom right may be at least partially determined from the EVM data, and also shows the noise floor (thermal noise floor) between the two devices. The signal level may be visualized as the gap between the signal (top trace) and the interference+noise (middle) traces. The lower trace is the thermal noise floor. Large SNR is visualized by the gap between the signal and interference+noise traces.

The constellation diagrams shown in FIGS. 9A-9C may be regularly updated (e.g., animated) either as fast or faster than the actual EVM data is transmitted between the link. This is because the pseudo-EVM data may be graphed by re-calculating new coordinates for the cloud of EVM points around the ideal points in the constellation plots. For example, the plots may be updated approximately 10× per minute or more often (e.g., 10× second, etc.).

In FIGS. 9A-9C, the local constellation diagram is shown as a 16QAM constellation (having 16 ideal points) for local reception, while the remote constellation diagram is a 256QAM diagram.

In any of the examples described herein, the user interface may include a display of colored symbols, shapes (e.g., boxes), etc., representing the values for the various devices in the device list, and may also indicate device detail in a panel that will help communicate to the user where inefficiencies lie. In some variations, this information will be associated with a particularly access point (AP). For example, displayed colored boxes may represent the top number (e.g., top 10) airtime clients in the list, and the user interface may also show additional (e.g., the top 20) airtime clients in the detail view.

Additional information provided by the detail view may include information about the parameters specific to the station (e.g., CPE) represented by the box, wedge or other representation of the value of the station. For example, the detail view may allow hovering over representation (e.g., box) for a quick tooltip, and highlighting the offending device in a list below.

In some variations the detailed list view may also include a number in front to communicate total number of devices, and a percentage of efficiency. The list user interface (e.g., the list view) may have a tooltip, e.g., at the top of the column, to quickly explain what TDMA is. The detailed information (e.g., list view) may also be sortable by TDMA (and other capacity values), e.g., in this column, so efficient or inefficient devices can be shown more quickly, e.g. by bringing them to the top.

In any of the variations described herein, the TDMA may be calculated for past time (historically, e.g., the past 24 hours), rather than (or in addition to) real-time. In the examples described herein, the X axis communicates time, proportionally, and the Y axis communicates throughput. Colors may also be used to indicate the quality ("goodness") for individual stations. For example, good clients (e.g., top 33%) may be colored green, mediocre clients may be colored orange (middle 33%), and bad/inefficient clients may be colored red (bottom 33%). The remaining areas may be greyed out.

EXAMPLE

The techniques described herein typically relate to time division multiple access (TDMA). TDMA may refer to a channel access method for shared medium networks that allows several users to share the same frequency channel by dividing the signal into different time slots. For example, users may transmit in rapid succession, one after the other, each using its own time slot. This may allow multiple stations to share the same transmission medium (e.g. radio frequency channel) while using only a part of the channel capacity. As a simplified example, if TDMA were a party, and there were three guests, Alice, Bob, and Carol talking to the host, each guest may share time talking with the host. For example, for the first 10 seconds, Alice may talk to the host, for the next 10 seconds, its Bob's turn to talk to the host, for the next 10 seconds, its Carol's turn to talk to the host, then for the next 10 seconds, back to Alice, then Bob, and so on. Thus, the frequency-range that is being used may be divided into time-slots, and each user assigned a specific time-slot; users can only send/receive data in their own time-slot. The system may also be configured so that users (devices) may forfeit their time slot (e.g., by analogy, if a guest decides they have nothing to say, they may give up their slot and somebody may use it; thus, if there are 14 people at the party, and only one is being chatty, you avoid long awkward pauses every time that user is done with her slot).

In general, Wi-Fi standards typically have a theoretical speed at which things can operate, e.g. 802.11b at 11 Mbps, 802.11g at 54 Mbps, 802.11n at 300 Mbps, 802.11ac at 1.3 Gbps etc. The reality may be quite different however, because of chipset limitations, etc., thus one can typically get only a percentage of the theoretical speed. To extend the party analogy above, if, just when Alice started to talk, a background noise (e.g., music or TV playing in the background) were turned on so loudly that nothing Alice said could be heard by the host, and as a result, she basically "wasted" her time-slot, she may have to wait until her next time-slot to make her point or points, e.g., she may be making three conversational points in her time-slot, and if the TV came on after she made her second point, she may have gotten two of her points across, but not the third in her time-slot. The next time around, she may get to make her third and final point. Thus, occasionally, Alice may have to use multiple time-slots just to get all her points across, in effect reducing here data-rate. These are effectively failures. Thus, per the limits of this analogy, a CPE, within its time-slot, may send a number of packets, and some (or all) of these packets may not make it through to the AP. This may cause the CPE to have to resend those packets, reducing the data rate.

The concept of usage may also be understood by this analogy. For example, the percentage of the conversation monopolized by Alice may be thought of as her Usage. One way express this would be to take the total amount of time Alice spends talking (success and failures), and dived that by the actual time (e.g., "wall clock time"). However, the analogy becomes more complex if there are a lot of "speakers" (e.g., CPEs). For example, in our analogy, if there are 15 speakers (e.g., 14 other people talking to the host), you can still get Alice's percentage, but given the number of people speaking, the overall percentage may be small. If you're trying to troubleshoot a problem (e.g., Alice, Bob, and Carol are all complaining that the host never seems to hear them because of the background TV noise), it would be better to focus on the guests (e.g., CPEs) of interest. Thus, it may be beneficial to look at Usage for the guests (e.g., CPEs) that are of interest. In the 15 guest example above, the methods and apparatuses described herein may instead calculate the percentage of time that Alice spent speaking, only looking at the times spent by Alice, Bob, and Carol. For example, consider that over a 2 second interval, guests spoke with the host for the following durations:

TABLE 1 time "talking" in 2 second period

| "Guest" (CPE) | Time talking (msec) |
| --- | --- |
| Alice | 20 |
| Bob | 50 |
| Carol | 30 |
| David | 80 |
| Elsa | 40 |
| Famke | 90 |
| Gareth | 200 |
| Hector | 90 |
| Indigo | 50 |
| Jewel | 180 |
| Katrina | 200 |
| Mahesh | 900 |
| Lewis | 20 |
| Nancy | 50 |

From a strictly "wall-clock" usage perspective, Alice's usage was 1%, Bob's was 2.5%, and Carol's was 1.5% in this example. However, if only Alice, Bob and Carol are of interest (or have the highest ranking and/or are otherwise selected), they may be examined in more detail by instead looking only at usage over the total time this subset of guests (CPEs) were "speaking" with the host (AP). In this case, Alice's airtime usage is 20% (over the total of 0.1 second that they each spoke), Bob's airtime usage is 50% and Carol's airtime usage is 30%.

A similar analogy may be used to understand the concept of efficiency (or isolated capacity) as described herein. For example, extending the analogy of the guests speaking at a party even further, it may be helpful to estimate of how impaired communication between Alice and the host was during the time that the background noise (e.g., when a television or radio was playing loudly in the room) by understanding how effective Alice's speaking would be if she was the only person talking (e.g., excluding the other guests). In term of a CPE communicating with an AP, given that there are some packets that need to be retransmitted, it may be helpful to estimate the maximum rate at which the CPE could upload data if there was only one CPE. In Alice's case, we already know how many failures she has in a given period of time (and conversely, how many successes). Since we also know what percentage of time Alice was speaking, her isolated capacity may be readily calculated. For example, if Alice, Bob, and Carol each get to speak for 10 seconds at a time, over a 300 second interval (e.g., each got to speak 10 times), if Alice successfully spoke 7 times, and the background noise (e.g., a loud TV) was turned on 3 times, Alice was "successful" 70% of the time, i.e., this was her efficiency (if she was the only person speaking to the host, the best she would be able to do would be to be successful 70% of the time). Similarly, for a CPE, if there are three CPEs, each of which get to upload data 10 seconds at a time, over a 300 second interval (e.g., each got to upload data 10 times), the first CPE ("Alice") uploaded data successfully 7 times, and failed to upload data 3 times. So, in this case, the CPE "Alice" has an efficiency of 70% for uploads. For a slightly more realistic example, consider an 802.11g CPE that can transmit at 54 Mbps. This means that CPE "Alice" may at best, transmit at 40.5 Mbps in this paradigm. Thus, the isolated capacity of CPE "Alice" is 0.7*40.5=28.35 Mbps (since CPE "Alice" was successful only 7 out of 10 times). Thus, CPE "Alice" has an upload efficiency in this example of 70% and an isolated capacity of 28.35 Mbps. Efficiency indicates how efficient the CPE (Alice) is at communication, while the isolated capacity indicates a boundary on what a system (e.g., a wireless service provider) may expect from a CPE relative to uploading information.

Note that although the general concepts illustrated in this example by analogy are helpful, they may not be complete. For example, (again by analogy), guest such as Alice may be talking, and the Host listening, however the host may sometimes talk as well, which may make this somewhat more complicated. However, it may be useful to assume that the same characterization made above may be applied to the host as well, including the noise analogy. Thus, wherein upload information (talking from CPE to AP) applies, there may also be a download (e.g., talking from AP to CPE). The upload may be called the Uplink, and the download may be called the Downlink. Thus, if both AP and CPEs (e.g., both Alice and the host) are communicating, (i.e., the CPE both uploads and downloads data), a slightly better picture of efficiency may take the average of the upload and download efficiencies. For example, CPE "Alice" may have an uploaded efficiency of 70% as discussed above. Similarly, a download efficiency may be determined (e.g., a download efficiency from the AP of 82%). Thus, the upload and download efficiencies may be averaged to determine Alice's efficiency (e.g., 76%)

This information may be graphically displayed as described above to show efficiency versus air time usage (e.g., the percentage of the time that each CPE is actually on the air. In our example, the time Alice is talking to the host). In the analogy above, Alice has an efficiency of 76% and an air time of 20, Bob has an efficiency of 84% and an air time of 50, and Carol has an efficiency of 35% and an air time of 30.

A graphical illustration of this may be provided by a TDMA chart such as that shown in FIG. 16. In general a TDMA window graph may show all clients (CPE's) of an AP and their air time utilization, ordered by the clients' efficiency. The efficiency of the client may be a percentage value of the client's current performance relative to the maximum performance the AP can support, and air time may indicate the amount of time each of the clients is using on the AP, relative to other clients. The more air time an individual client uses, the less is available for other clients.

Part II: Channel Frequency and Bandwidth Selection Based on Spectral and Traffic Statistics Also described herein are methods and apparatuses to improve transmission on between two or more devices (including between an AP and one or more CPEs) in the presence of noise by determining which channels from a variety of potential transmission channels are better than others. For example, described herein are methods for, and apparatuses configured to, determine a ranking of overall channel quality ("goodness") for transmission between one or more devices. The apparatuses and methods described herein may manually or automatically use this determination (ranking) to switch between channels. In some variations the apparatuses described herein may be configured to perform these rankings at the level of the AP and/or CPEs and/or using a remote (e.g., cloud) server.

A wireless network generally be considered to consist of multiple devices communicating over a single wireless channel. The wireless channel may be identified by its center frequency and its bandwidth, i.e. the amount of spectrum it occupies, as illustrated in FIG. 17, showing a schematic example of a channel having a channel center frequency (fc) and a bandwidth (bw). Wireless systems may be designed to operate over a range of channel frequencies and bandwidths. For example, a wireless network can operate over channels with center frequencies 5150 MHz, 5155 MHz, 5160 MHz, etc., and bandwidths of 10 MHz, 20 MHz or 40 MHz, etc. For one example, all channels in which a wireless channel can operate may be listed as illustrated in Table 2, below:

TABLE 2

| N exemplary channels | | |
|---|---|---|
| Channel ID | Center Frequency | Bandwidth |
| channel[1] | channel[1].fc = 5150 MHz | channel[1].bw = 10 MHz |
| channel[2] | channel[2].fc = 5150 MHz | channel[2].bw = 20 MHz |
| channel[3] | channel[3].fc = 5155 MHz | channel[3].bw = 10 MHz |
| ... | ... | ... |
| channel[Nc] | channel[Nc].fc | channel[Nc].bw |

The performance of a wireless network including achievable data rates, packet transmission latencies and user experience may be directly impacted by interference in the wireless channel, caused by wireless and/or other electronic devices emitting radio waves in the same or adjacent frequencies occupied by the wireless channel. In the case when a wireless network is operating in an unlicensed frequency band, the operator of that network may have no control or ownership over the wireless channel and may be required to share its use with other operators, under applicable spectral regulations and laws.

Most wireless devices and networks operating in the unlicensed spectrum may have the ability to dynamically change channels. Typically, such a channel change may be triggered by detection of excessive interference or presence of, for example, radar signals in the current channel. This approach is inherently reactive and has several drawbacks, including: the performance of the network may have already degraded to a level where connections are dropped etc., before the network is able to detect that quality of the current wireless channel has, in fact, degraded; and the network typically selects the new channel based on data collected over a short time frame. In a longer time frame, this channel's quality may also degrade and another channel change is required. The decision to change from a current channel and the choice of the new channel may be based on short term observations of interference, which may be inadequate. In particular, in highly dynamic interference scenarios, which are particularly typical in unlicensed frequency bands, this approach may be ineffective.

Channel changes, and particularly existing channel channels, may be extremely disruptive to data transmissions and thus reduce the efficiency and usability of the network. Furthermore, for reasons described above channel change algorithms known in prior art are ineffective. Hence, wireless network operators typically disable this feature and resort to manually choosing the channels of their network. As it is not feasible for the operator to manually change channels on a regular basis, they typically select a channel at the time of provisioning the network or when troubleshooting performance issues. In addition to lowering operator productivity, this manual channel selection methodology suffers from the same drawbacks as automated channel selection methodologies known in the prior art, highlighted above.

Ambient Noise Floor and Carrier to Interference and Noise Ratio

In the presence of interference, the goodness/quality of a wireless channel can be characterized by the Carrier to Interference and Noise Ratio (CINR), as mentioned above. When represented in decibels, CINR may be the difference between received signal power and interference plus noise power. We herein refer to the interference plus noise power level as the Ambient Noise Floor, as opposed to the Thermal Noise Floor which is the level of thermal noise power alone. The thermal noise floor is dependent on the receive bandwidth, which is generally static. On the other hand, the ambient noise floor varies significantly with time as it is dependent on interference signal levels, as shown in FIG. 18.

Methods and Apparatuses for Grading/Ranking Channels

In general, described herein are methods and apparatuses for ranking channels (in some variations including any used channel currently being used by the device(s), in other variations including channels not being used by the device(s)) based on a determination of channel "goodness" calculated from an indication of the historical and/or instantaneous (including a time-specific indication) of power (noise, such as the ambient noise floor) for each channel, and in some variations one or more indicators of the capability of one or more stations (e.g., CPEs linked to an AP) specific to that channel. For example, described herein are methods and apparatuses to determine the best channel or a list of best channels to operate a wireless network based on statistical information or radio and data traffic, collected over a (e.g., long, greater than about 12 hr, greater than about 24 hour, greater than about 36 hour, greater than about 48 hours, etc.) time period.

These methods and apparatuses for performing them may, for example, provide a table ranking or listing of channels available to network of APs and CPEs for communication between the two. The listing/array/table may be one-dimensional and unqualified (e.g., simply listing as best to worst, or more/less "good", etc.), or the listing/array/table may be one-dimensional and qualified (e.g., indicating which CPEs in the network would be best/worst for this channel, etc.). In some variations the listing/array/table is multi-dimensional and qualified or unqualified, e.g., including a vector that has individual rankings for all or a sub-set of the CPEs in the network.

An apparatus (generally including device and systems) configured to grade/rank channels as described herein may generally include a spectrum analyzer that is adapted specifically to monitor activity on other channels in the network (e.g., concurrent with transmitting/receiving activity in an in-use channel). For example, any of the devices described herein configured to rank or grade channels, or from part of a network that ranks/grades channels, may include a radio having a first path with a transmitter/receiver (or transceiver) that operates on a channel and may be changed (tuned) to another channel. The apparatus may include a second (in some variations parallel) path that includes a spectrum analyzer for monitoring energy on the frequency spectrum (including or excluding the frequencies currently being used by the radio to transmit/receive). The apparatus may store this information as a matrix of frequency, time and energy (e.g., the energy reading at a particular frequency at time of day). Additionally or alternatively, this information may be transmitted to a remote server and any of the apparatuses described herein may access this matrix in determining the parameters (e.g., ambient noise floor) as described herein.

Using Achievable Data Rate at Channel Quality Metric

In one variation, the goodness of a channel may be determined by an estimated achievable data rate of that channel, which may be specific to individual stations in the network and may therefore be determined separately, or in some variations collectively, for each station. The achievable data rate may be determined by first estimating the ambient noise floor of that channel and then translating it to an achievable data rate, as illustrated schematically in FIG. 19. As shown in this example, given the received signal strength (rx_power), the CINR for that channel (channel[i].CINR) may be determined by subtracting channel[i].ambient_NF from rxpower. The channel[i].achievable_datarate may be computed, for example, from this channel[i].CINR by using a look-up table (LUT_RATE) of values that can be empirically or theoretically determined and may be specific to a device or class of devices. For example, the look up table (LUT_RATE), may include regulatory rules for EIRP in determining the achievable data rate.

Figure 20:
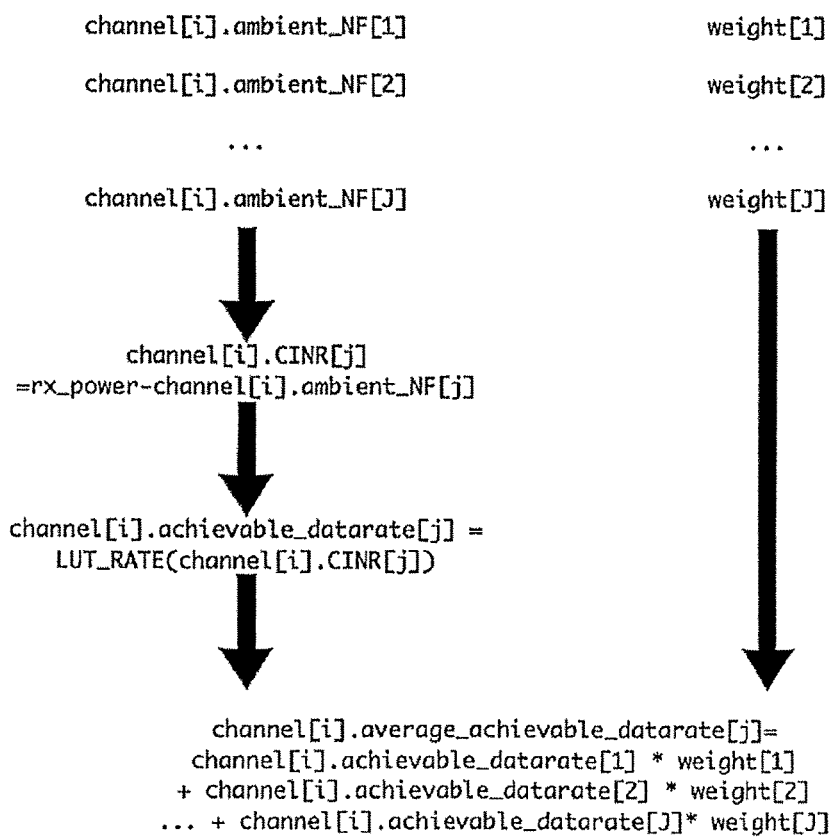
FIG. 20 schematically illustrates one variation of a method of a method of determining goodness of a channel based on average achievable data rate.

In another variation, the goodness (which may be expressed in Kbps/Mbps) of a channel may be measured by the estimated average achievable data rate of that channel, where ambient noise floor values measured at different time periods (and received, for example, from the spectrum analyzer information described above), may be considered in determining the weighted average achievable data rate. The ambient noise floor may be measured at time instant j, and the channel[i].ambient_NF[j] may be converted to an estimated achievable data rate channel[i].achievable_datarate[j] for that period. The average achievable data rate may be determined by averaging channel_[i].achievable_datarate [j] after weighting by a factor weight[j] values as illustrated in FIG. 20. Weighting factors may be based on information specific to the station (CPE and/or AP).

For example, in some variations, weighting factors may be based on receive usage. In some variations, channel usage in the receive direction may be used to compute the weighting factors. The channel receive usage at time instant j may be given by channel_usage[j] with value between 0 and 1 indicating wireless channel receive usage of the network at time j, where 0 indicates no usage and 1 indicates maximum usage. Weight [j] may be computed as follows: Weight[j]= (channel usage [j])/(channel usage [1]+channel usage[2]+ . . . +channel usage [j])

Any of the variations described above may be used with specific end-point devices of point-to-point connections (e.g., AP to single CPE), an may also be adapted for use with point-to-multipoint (AP-multiple CPEs).

For example, for a point-to-point (PTP) wireless link, the apparatus or method implemented by the apparatus(s) may consider information available from both ends (e.g., master and slave, AP and CPE, etc.) of the link to determine the best channel. Similarly, for a point-to-multipoint (PMP) network, the apparatus and method may consider multiple end-points/subscriber modules (SMs) and the access-point (AP) to determine the best channel.

For example, an SMs (in the case of PMP) and the slave device (in the case of PTP) may periodically send a "spectrum information" packet to the AP/master. For the this example, we may refer to SMs/PTPSLAVES and the AP as a Connected Device (CD). FIG. 21 shows one example of the packet (Spectrum information packet) that may be transmitted between the devices (e.g., from the slave/CPE stations to the AP). In this example, the packet indicates the number of channels and periods (Nc, Np) and lists the receive usage information each Np period ("channel_rx_usage[ . . . ]") as well as the frequency (fw), bandwidth (bw) and ambient noise floor for each channel, as illustrated.

In some variations, a connected device can be considered as a 4-tuple, e.g.: (mac-address, priority, channel_rx_usage[0 . . . Np−1], spectrum_info[0 . . . Nc−1]). In this example, channel_rx_usage is a vector containing channel receive usage information for Np periods, and spectrum_info is a vector containing information for Nc channels.

Each spectrum information channel can be considered as a 3-tuple, e.g.: (fc, bw, ambient_NF[0 . . . Np−1], goodness), where ambient NF is a vector containing ambient noise floor information for Np periods, and goodness is computed by using the channel receive usage as weights for each of Np periods. This information may include priority when determining the grading/ranking. For example, see FIG. 22. In general, the AP/PTPMASTER's connected device entity may have the highest priority.

Thus, in general, each device may include multi-dimensional information for each channel (or range of frequencies in the channel) in a multiple-device network (e.g., point-to-multipoint network). The apparatuses and methods described herein may simplify this multi-dimensional information into a single dimension. For example, when a channel includes multiple different frequencies, the noise information (Ambient Noise) used to calculate the goodness may be the maximum (e.g., worst case scenario) from all of the frequencies in the channel, or it may be an average, median, etc. In addition, a subset of timing ranges may be chosen, e.g., using a range of time (going backwards from the instant/current time a particular value, such as 1 hr, 2 hrs, 3 hrs, 4 hrs, 12 hrs, 24 hrs, etc. or any increment thereof), or only the most recent time values may be chosen (e.g., and selected from the matrix of energy provided by the spectral information).

Thus, the apparatuses and methods described herein may determine a ranking/scoring and/or listing of the top N channels for a network for each bandwidth. For example, Nb may be set as the number of available bandwidth options. e.g. (10, 20, 30, 40, 50, 60, 80 MHz) and Nd as the number of connected devices. The apparatuses and methods described herein may split the SpectrumInfo vector by bandwidth, and initialize a PerBandWidth (PBW) entity for each bandwidth k=0 . . . Nb−1. This may be determined by the equation shown below (and in FIG. 22A):

$$PBW[k].goodness[j] = \frac{\sum_{0}^{Nd-1} CD[i].SpectrumInfo[j].goodness \times CD[i].Priority}{\sum_{0}^{Nd-1} CD[i].Priority}$$

Where, for each j, where PBW[k].bw=CD[i].SpectrumInfo[j].bw and where j=0 . . . Nc−1, i=0 . . . Nd−1, k=0 . . . Nb−1. Sorting PBW[k].goodness in descending order and using the top N channels may provide the best frequencies for each available bandwidth option. The bps-per-Hz metric used herein also provides a normalized way to judge spectral usage and efficiency and for a given channel. For example, this metric may be a ratio of the PBW[k].goodness[j] and PBW[k].bw (e.g., PBW[k].goodness_[j]/PBW_[k].bw).

For example table 3, below, shows an example of top-3 channels, with the computed goodness and the bps-per-Hz:

TABLE 3

| | exemplary ranking of bands | | | |
| --- | --- | --- | --- | --- |
| Frequency | 10 MHz | 20 MHz | 40 MHz | 80 MHz |
| 5785 | 62 (6.2 bps/Hz) | 120 (6.0 bps/Hz) | 150 (3.75 bps/Hz) | 250 (3.12 bps/Hz) |
| 5200 | 50 (5.0 bps/Hz) | 80 (4.0 bps/Hz) | 120 (3 bps/Hz) | 180 (2.25 bps/Hz) |
| 5500 | 70 (7.0 bps.Hz) | 100 (5.0 bps/Hz) | 90 (2.25 bps/Hz) | 75 (0.875 bps/Hz) |

In general, and operator using the apparatuses described herein can select the desired frequency, either based on absolute capacity required for that network, or the operator can optimize the network for spectral efficiency based on the computed bps/Hz. As an example: with a 80 MHz channel centered at 5785 MHz, the operator may get a capacity of 250 Mbps, but it comes at a lower spectral efficiency. Dividing this network into three RF domains (sectors), and using 20 MHz channels centered at 5785, 5200 and 5500 MHz may provide a total of 300 Mbps capacity using 60 MHz of total spectrum.

In operation, any of the apparatuses described herein may be used to provide information for automatic or manual switching between channels. For example, in automatic switching, a master device (e.g., AP) may determine that it is time to switch based on any appropriate criterion, such as overall degradation of signal transmission quality, or degradation of transmission quality with one or more high-priority devices. For example, when a quality threshold is passed. This determination may be made locally (at the AP and/or CPEs) or remotely (e.g., in a cloud configuration) or both. Alternatively a user (administrator) may determine that the quality has degraded and may manually determine to switch channels. In either case, the apparatuses may apply the methods described herein to determine which one or more channels provide the best options for switching. In an automatic configuration, the system may switch to the top ranking channel, or may use a selection of the top ranked channels to compare with other factors (including nearby networks or other APs to determine what the switching should be). In manual configurations the system may present the user (administrator) with the channel options in a simple list (annotated or unannotated, as described above) so that the user may make the best decision possible in choosing the band to switch to.

For example, described herein are apparatuses including a processor that holds or receives any of the information described herein and displays the ranking/grading/listing as described herein, and allows a user to select from among the listed/graded/scored bands which frequency band to change to. The apparatus may include software, hardware, firmware of the like, and is dependent upon connection to and/or receiving the information described herein (e.g., spectral information) from one or more stations in the network (and preferably all of the stations).

Optimization of Channel Selection

Any of the methods and apparatuses described herein may be configured to optimize channel selection and either present one or more "top" ranked channels to a user or automatically switch to the top ranked channel, by determining a ranking of frequency channels within a target frequency range by spectral efficiency. Described herein are methods of performing this optimization as well as apparatuses configured to perform these methods. These apparatuses are typically access point devices (though not limited to such devices). These devices may operate in point-to-point (PTP) or point-to-multipoint (PTMP) configurations, and may optimize in both. Any of these apparatuses (e.g., APs) may include a visual tool allowing user interaction, including display of the top (optimized) frequency channels, display of the frequency spectral information for devices communicating with the AP and/or the AP spectral frequency information, as well as selection of the channel bandwidth, the frequency range to be optimized over, etc.

For example, an apparatus such as an access point may be configured to estimate the capacity for all or some of the devices communicating with the AP from the usage data (e.g., signal strength data, including RSSI). The usage data for each link (e.g., between the AP and the client devices) may allow the apparatus to estimate the capacity based on the received signal strength and to determine the capacity at both ends of each link, which may then be used to determine spectral efficiency.

An apparatus, such as an access point, may be configured to implement a method of optimizing channel selection, as described herein. For example, an access point (AP) may be configured to optimize the Tx/Rx channel and/or channel width based (either automatically or manually), by determining the received signal strength at both ends of the link between the AP and a client (e.g., a CPE) that is wirelessly communicating with the AP. As described below, the apparatus may be configured to do this for every client that is connected to the AP, or just for a subset of the clients connected to the AP, such as the top to number of clients, e.g., the top twenty (tn=20) clients using the most bandwidth in a given time period. In addition, the AP may use the historical spectral data, which gives the energy in the band from other sources, including interferers, for the previous predetermined time period (e.g., 24 hours, 7 days, etc.), and using the Tx and Rx signal strength (usage data), as well as the historical spectral data, the capacity of the link can be estimated. In estimating the capacity of the link, the worst case capacity may be determined, or an average capacity may be determined, or both, from all (or the subset of) client communicating with the AP.

For example, the signal strength and interference may be used, as described above, to determine a channel capacity based on the signal to interference plus noise (SINR). For example, a lookup table may be used to calculate the data rate based on the signal strength and spectral data for each client. In practice, each client type (e.g., CPE device type) may have a slightly different lookup table for each product; in some variations a generic look-up table may be used. Thus, the signal strength and spectral information may be used to determine a data rate (e.g., per length) for each client (CPE). The method or apparatus may be configured to look at the clients with the most usage (e.g., the top to clients based on usage), and either average the data rate per length, or use some other adjusted data rate (e.g., a weighted average, a mean, median, etc.). This may provide an average or consolidated data rate for the AP and its clients, and this data rate is then typically divided by the amount of spectrum used (the channel width), such as for example, 10 MHz, 20 MHz, 40 MHz, 50 MHz, 60 MHz, 80 MHz, etc.) to give a spectral efficiency for each channel at a particular channel width (bandwidth), in bits per second per Hz. (Bps/Hz). Channels may thus be ranked by spectral efficiency. Any of the apparatuses described herein may therefore be configured to display the ranking, e.g., by listing, labeling, or otherwise showing the top (e.g., the top one, two three, four, five, etc.) channels with the highest spectral efficiencies at a particular and/or predetermined channel width.

Figure 23:
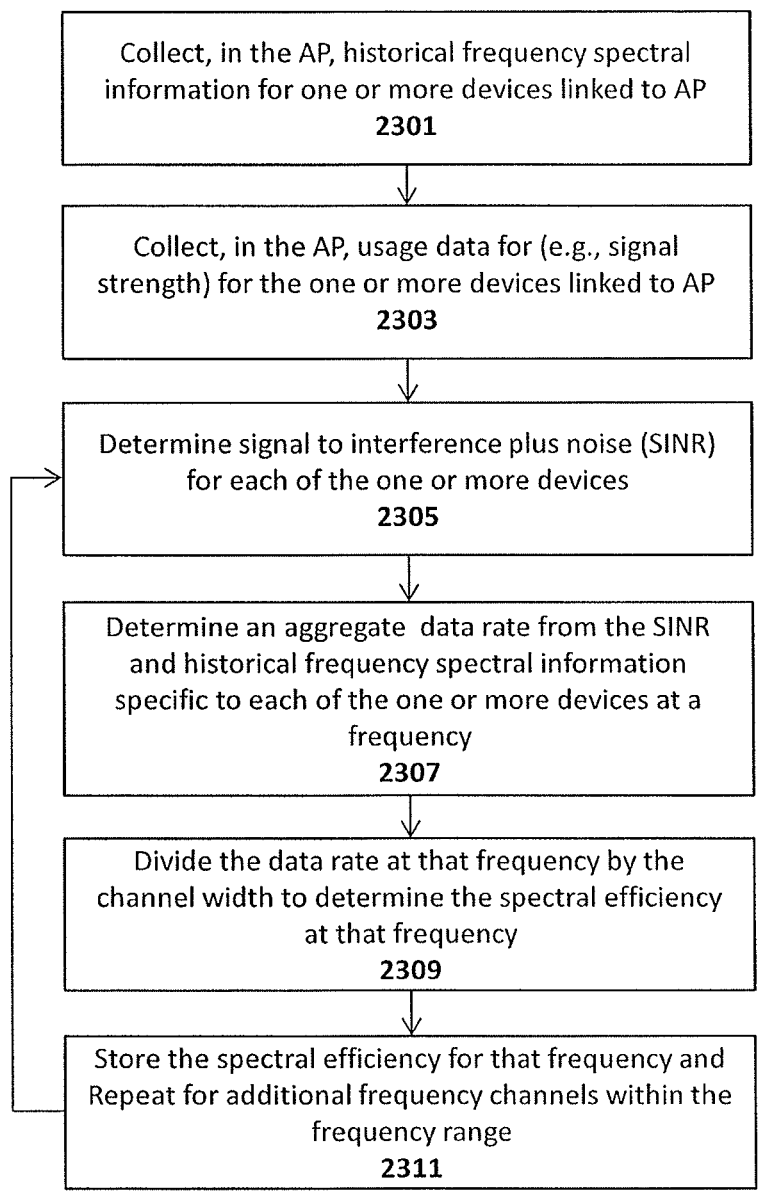
FIG. 23 is an example of a method of determining spectral efficiency of a plurality of channels within a frequency range.

For example, FIG. 23 illustrates one example of a method of determining spectral efficiency rankings for each of a plurality of frequency channels. For example, initially (and optionally) a method of determining spectral efficiency rankings may collect historical frequency spectral information for one or more devices linked to an access point (AP). This information may be collected, stored, or held, in the AP 2301. Usage data may also be collected, stored and/or held in the AP. For example, usage data (e.g., signal strength) for the one or more devices linked to AP may be collected in the AP 2303. Thereafter, at each of a plurality of channel frequencies, an interference plus noise (SINR) may be determined for each of the one or more devices 2305, and a data rate may be determined from the SINR and historical frequency spectral information specific to each of the one or more devices at each of the one channel frequencies. Once the data rates have been determined (as described above, this may be achieved by using a look-up table that is specific to each type of device) for each device, an aggregate data rate may be determined for the network; the aggregate data rate may be a function of all or a subset of the devices (e.g., average, mean, median, weighted average, maximum, minimum, etc.) 2307. An aggregate data rate may be determined at each frequency channel to be examined. For example, the frequency range may be divided up into a predetermined number of channels (e.g., between 5 and 1000 channels, 5 and 500 channels, etc. a channel every 1 kHz, etc.) and a spectral efficiency determined for each channel.

The aggregate data rate at each frequency may then be divided by the channel width to determine the spectral efficiency at that frequency 2309. The resulting set of channels and spectral efficiencies may then be stored. In some variations (as illustrated in FIG. 23), the steps may be performed iteratively, e.g., by sequentially determining the spectral efficiency at different frequencies and repeating the process at different frequencies. Alternatively, this procedure may be performed in parallel for different frequencies, or some combination of parallel and sequential, until a spectral efficiency has been determined for all of the frequency channels within the frequency range 2311.

Figure 33:
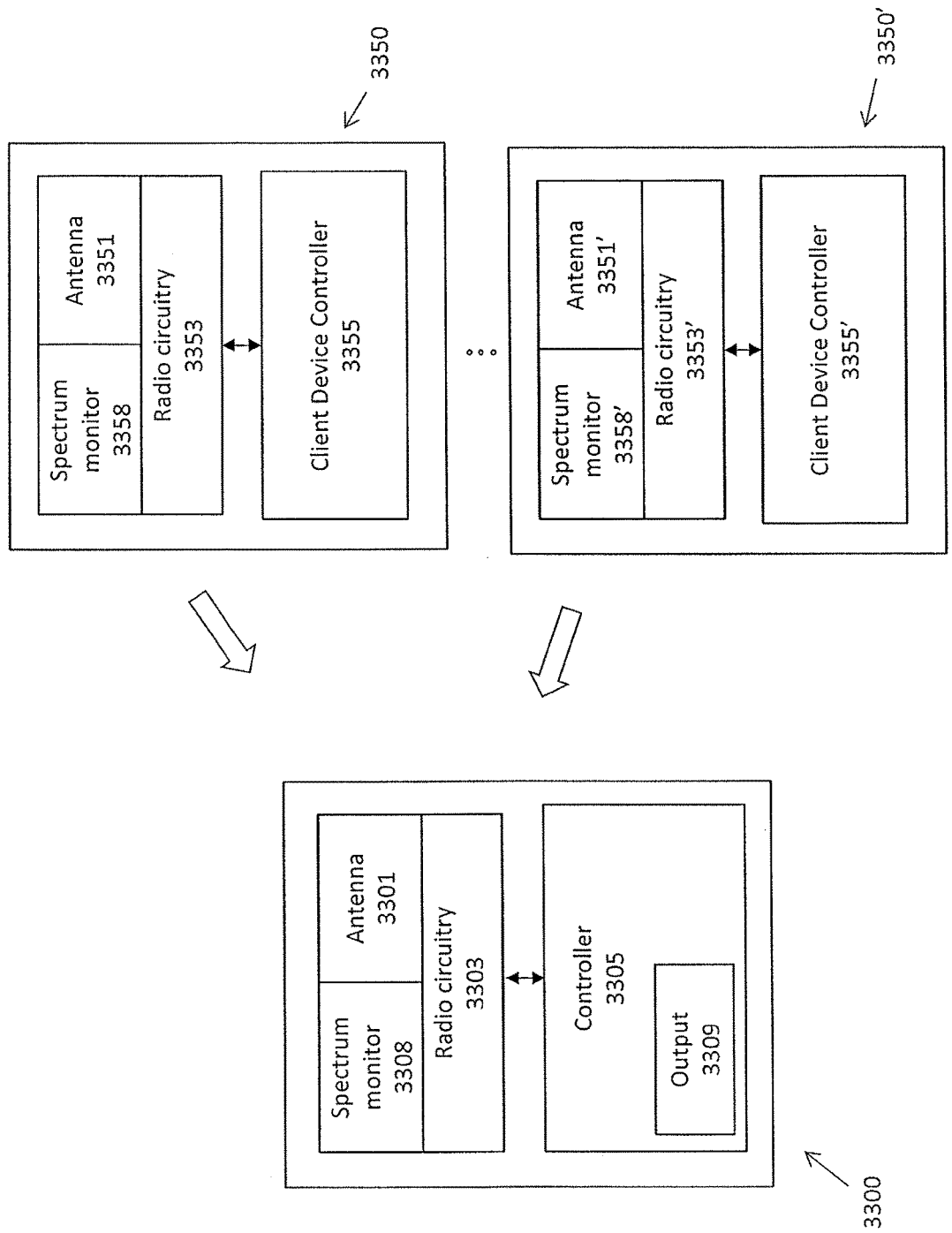
FIG. 33 is a schematic illustration of an apparatus (e.g., AP) configured to optimize the channel selection as described herein.

An apparatus, such as an access point device, may be configured to optimize the channel selection using a method such as that described above. For example, FIG. 33 illustrates one example of an access point 3300 that is wirelessly communicating with a plurality of other devices (e.g., stations, CPEs, etc.) 3350, 3350'. In this example, only two other devices 3350, 3350' are shown, however additional devices may be part of the network as well. The access point 3350 typically includes an antenna 3301, wireless radio circuitry (e.g., transceiver) 3303, and a controller that may include a processor, memory, and the like, including an output 3309 (e.g., a user interface, as described herein) for controlling operation of the access point. The control may be configured specifically to perform any of the methods described herein, including the optimization of the frequency channel. Each of the client devices (stations, CPEs, etc.) 3350, 3350' may typically include a wireless antenna 3351 and radio circuit 3353, which may be separated or integrated with a controller/processor 3355'. These devices may also each include a second receiver 3358 that is configured as a spectrum monitor for monitoring the frequency spectrum. In some variation, this spectrum monitor is not separate from the transceiver of the radio frequency, but instead the apparatus is configured to monitor the spectrum when not otherwise receiving or transmitting. Note that although FIG. 33 is described herein in reference to an apparatus configured to optimize frequency channel, this illustration of a wireless network may be relevant to any of the apparatuses and methods described herein, including in particular, method and apparatuses or providing a ranked indicator of station efficiency and/or methods and apparatuses for monitoring a wireless network including transmitting a plurality of sounding packets and determining EVM information.

Figure 24A:
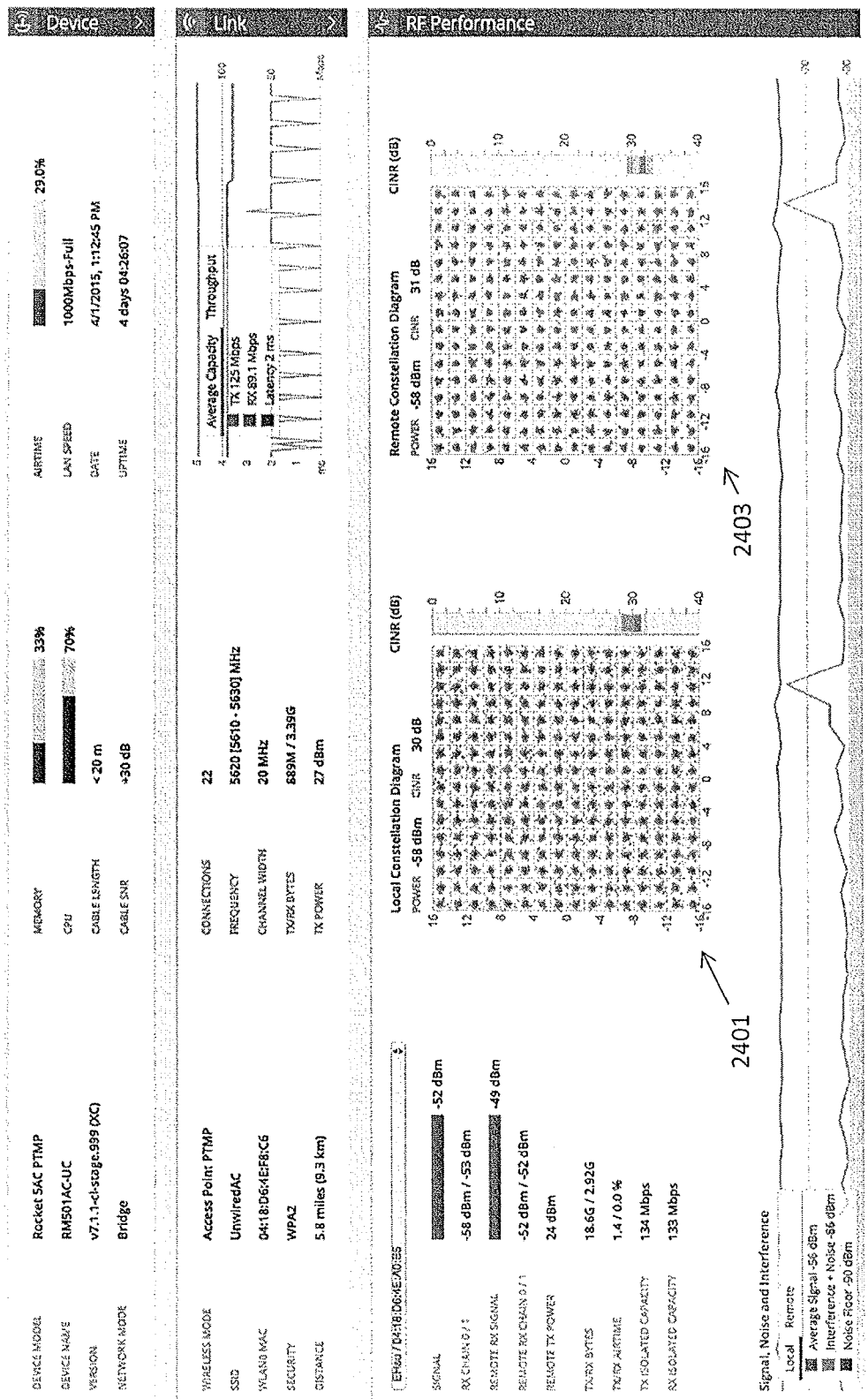
FIG. 24A illustrates one example of a user interface showing some of the network metrics described herein, including pseudo-dynamic constellation diagrams.
Figure 24B:
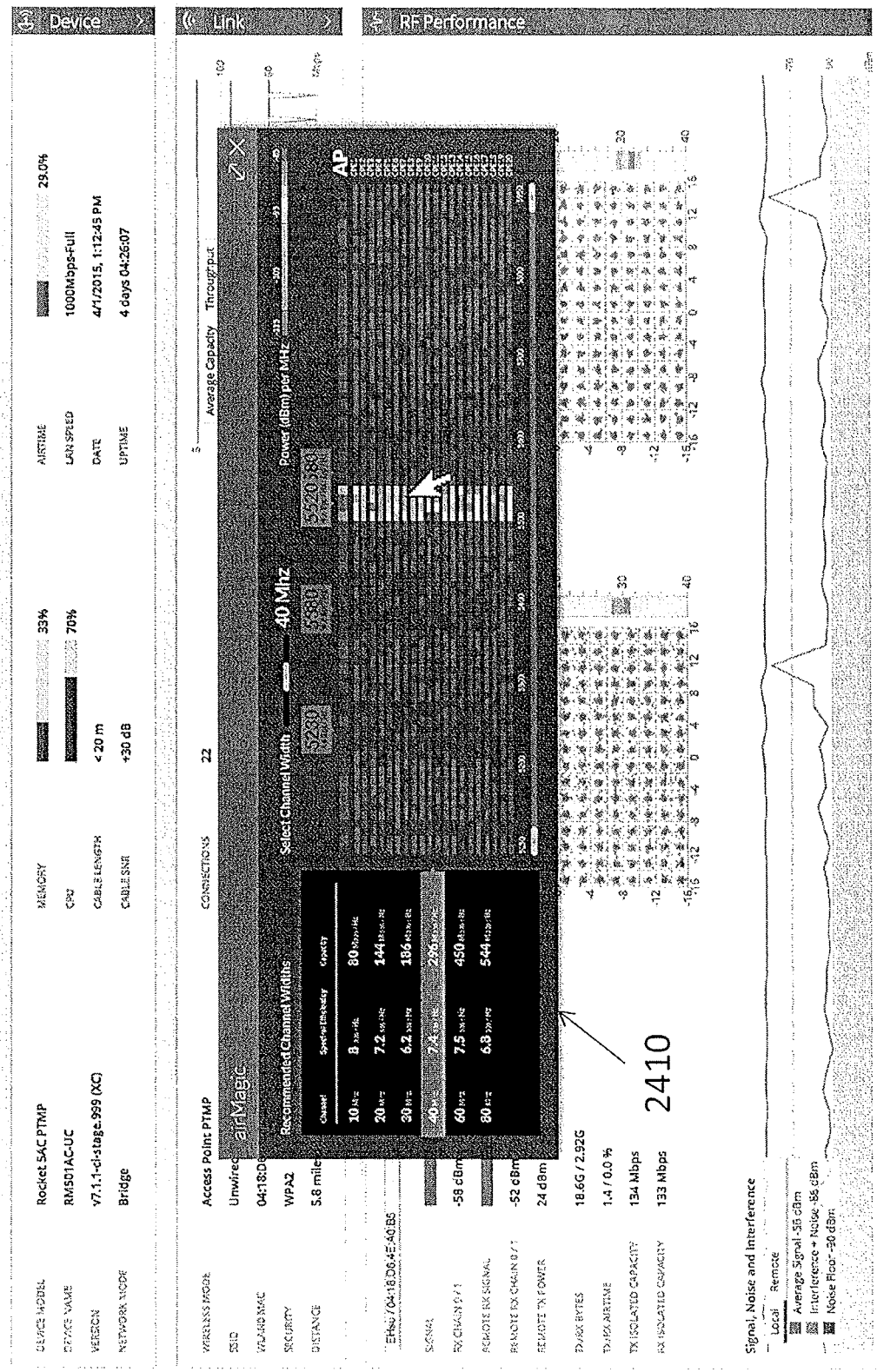
FIG. 24B shows the user interface of FIG. 24A with a channel optimization tool overlaid on top of the user interface.
Figure 24C:
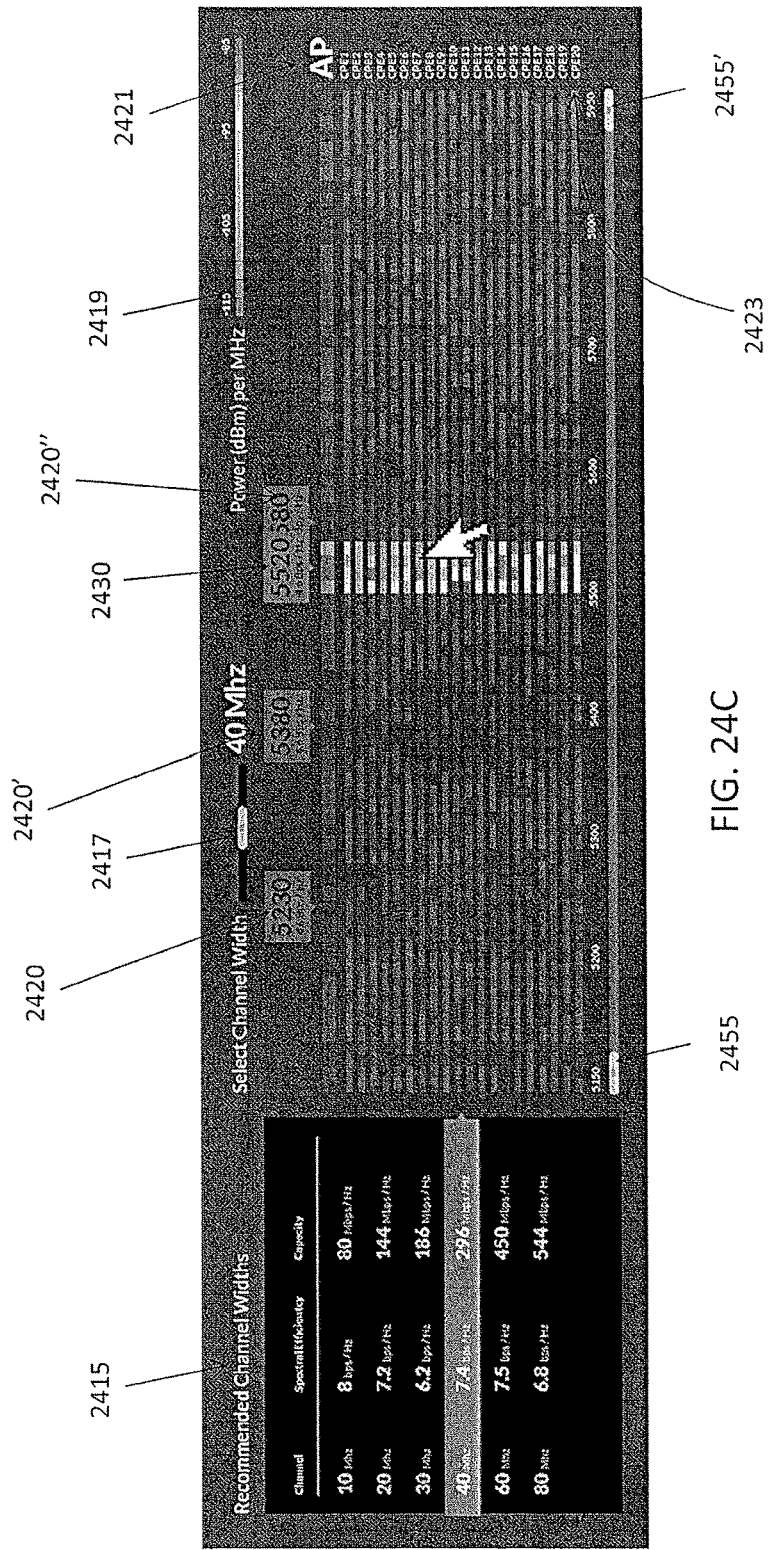
FIG. 24C is an enlarged view of the channel optimization tool, showing an example of an output of the channel optimization; this tool may also be used to provide user control of some of the parameters used to optimize the channel selection (e.g., frequency range, channel bandwidth, etc.).

In general, an apparatus of optimizing the frequency channel of an access point, and therefore of the network, may generally include a controller that is configured to generate a tool such as the tool shown in FIGS. 24B and 24C. For example, FIG. 24A illustrates a user interface for an access point that is communicating with one or more stations (e.g., CPEs), describing features and characteristics of the access point, the number of connections, and a graphical description of one or more link between the access point a station. In this example, the user interface includes a pair of constellation diagrams 2401, 2403 that may be generated as described above. This user interface (as well as any associated tools, such as the tool 2410 shown in FIGS. 24B and 24C that may allow optimization as described herein.

In FIG. 24B, the tools is a portion of the user interface that acts as a pop-up window 2410 that includes a visual indicator (e.g., chart, table, bar) of the frequency range, as well as indicating the frequency spectral information for the AP and each (or some) of the devices wirelessly connected with the AP 2423. In FIG. 24C, this is indicated by the horizontal rows (labeled on the far right side of the tool) that are labeled as heat maps indicating the energy at each point of the spectrum as measured over some time period (e.g., the last 24 hours, 48 hours, 3 days, 4 days . . . etc.). A key to this heat mapping is shown in the upper right 2419. The x-axis in this example is frequency, and the frequency range is shown along the bottom. Sliders may be used to adjust the upper 2455' and lower 2455 ends of the frequency range analyzed.

The user interface tool 2410 may also include a listing of recommended channel widths (bandwidths) 2415, as illustrated on the far left side of the tool. The recommended channel widths may include predicted spectral efficiencies and capacities for each of the different channel widths (e.g., 10, 20, 30, 40, 60, 80 MHz). Any of these channel widths may be selected (e.g., by clicking on them) using this portion of the tool and/or by using a control such as the slider 2417 in the upper middle of the tool.

In general, the access point may be configured to provide this tool either directly (e.g., by hosting a webpage that a user may access) or indirectly, by transmitting the information to a third party controller/server that may communicate with the access point and the user.

In FIGS. 24B and 24C, the tool also shows the optimized (e.g., top ranked) frequency channels determined by the methods described above at the selected bandwidth (e.g., 40 MHz in FIGS. 24B and 24C). In this example, the three channels having the highest spectral efficiency are shown in boxes above the graph of the spectral information 2420, 2420', 2420". In this example, the channels having the best spectral efficiency are 5230 GHz 2420, which has a spectral efficiency of 4.6 Bps/Hz (bits per second per Hz), 5380 GHz 2420' which also has a spectral efficiency of 4.6 Bps/Hz (bits per second per Hz), and 5580 GHz 2420", which has a spectral efficiency of 4.8 Bps/Hz (bits per second per Hz). The tool also allows the user to manually select a frequency and spectral efficiency is of the selected frequency is also shown at the top, and the historic spectral information is highlighted 2430. In this example, the gray boxes illustrate the top three recommended channels.

In this example, as mentioned above, the channel width is manually determined, however in some variations it may be automatically selected (or suggested). For example, the channel width may be optimized. The capacity for the network may be determined based on, for example, the traffic through the Ethernet port. Thus, the access point may determine how much capacity is needed to send data to each device. For example, if the access point needs only 100 Mbps per second, then, as shown in the recommended channel widths 2415 portion, the channel width maybe the smallest capacity to meet this requirement, e.g., 20 MHz in FIG. 24C.

Figure 25:
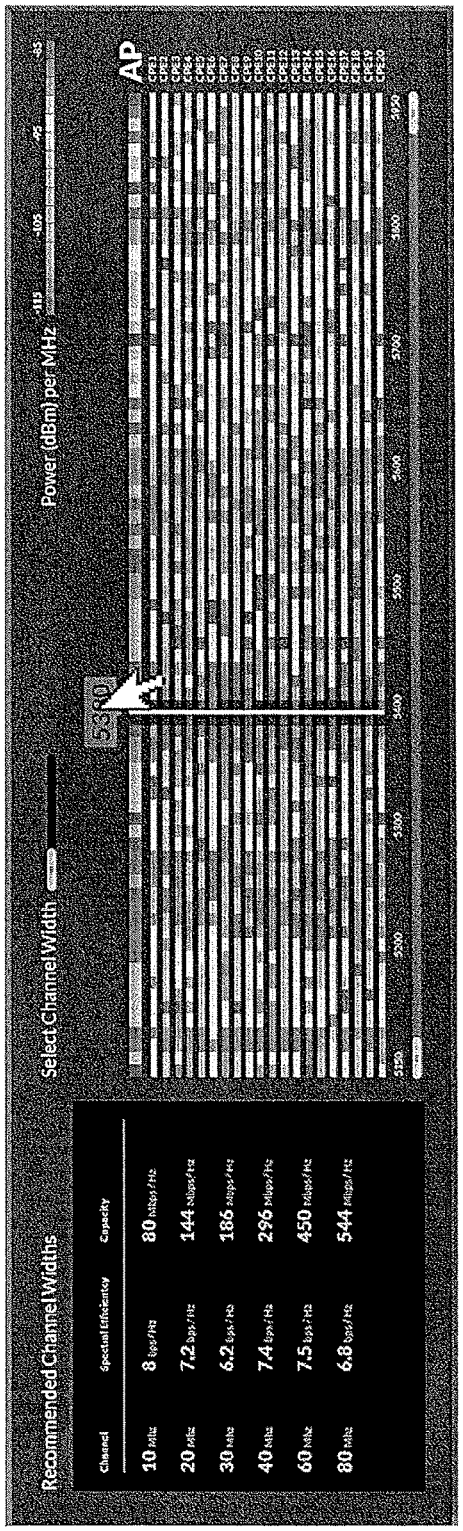
FIG. 25 illustrate another example of an output (optimization tool) for optimizing the channel selection of a network (e.g., an access point). In this example, the AP has not yet calculated/optimized channels based on spectral efficiency because the channel bandwidth (channel width) has not been selected. The tool in this example, is a user interface that shows other devices (client devices) wirelessly communicating with the AP, as well as a graphical indicator (heat map) of the frequency spectral information for each device.

As mentioned above, the user interface tool which may form part of the apparatus (e.g., an access point apparatus) may also allow manipulation of the optimization to determine channel frequency. In FIG. 25, the tool is shown without any optimization, though a heat map of the frequency spectral information for the access point and each of 20 connected units are shown. In this example, the 20 connected devices may be a subset of the total number of selected device; for example they may represent only the 20 highest-ranked devices for station efficiency, average airtime. The user may select any channel frequency by clicking on it, as shown.

Figure 26:
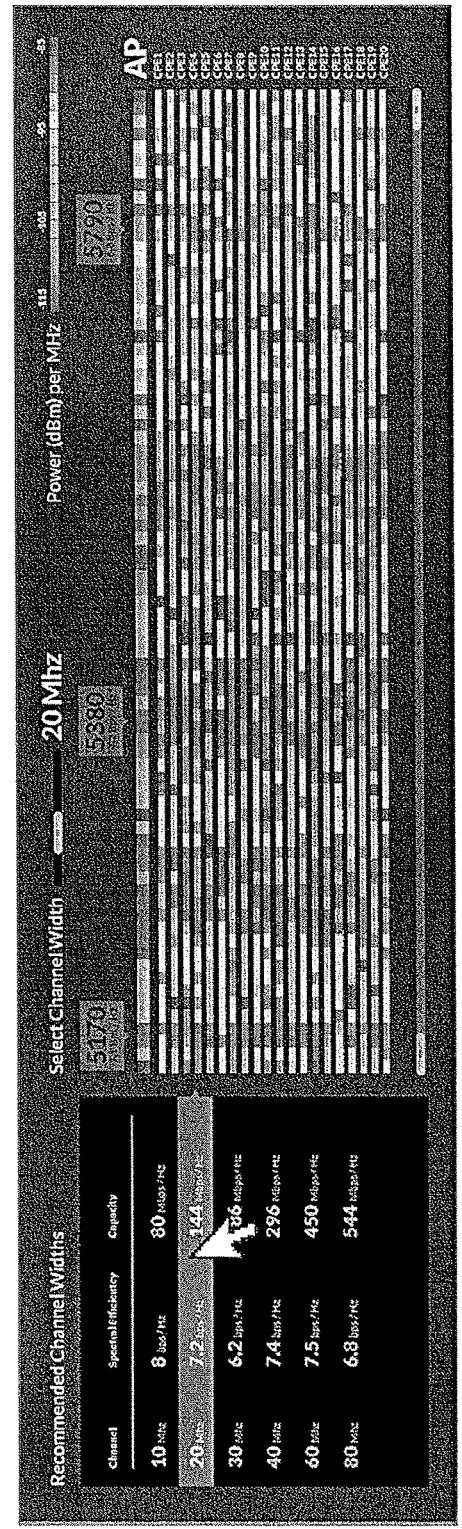
FIG. 26 is a another example of the graphical output (tool) of an AP showing the top 3 channels based on the determination of rankings of spectral efficiency as described herein.

FIG. 26 illustrates the selection of the channel width (in this example, 20 MHz) by clicking on the 20 MHz option in the recommended channel windows. Once the channel width is set, the apparatus may determine the top channel efficiencies and indicate them as described above and shown again in FIG. 26. In this example, the three most spectrally efficient channels are 5380 (7.2 Bps/Hz), 5170 (7.1 Bps/Hz) and 5790 (6.8 Bps/Hz).

Figure 27:
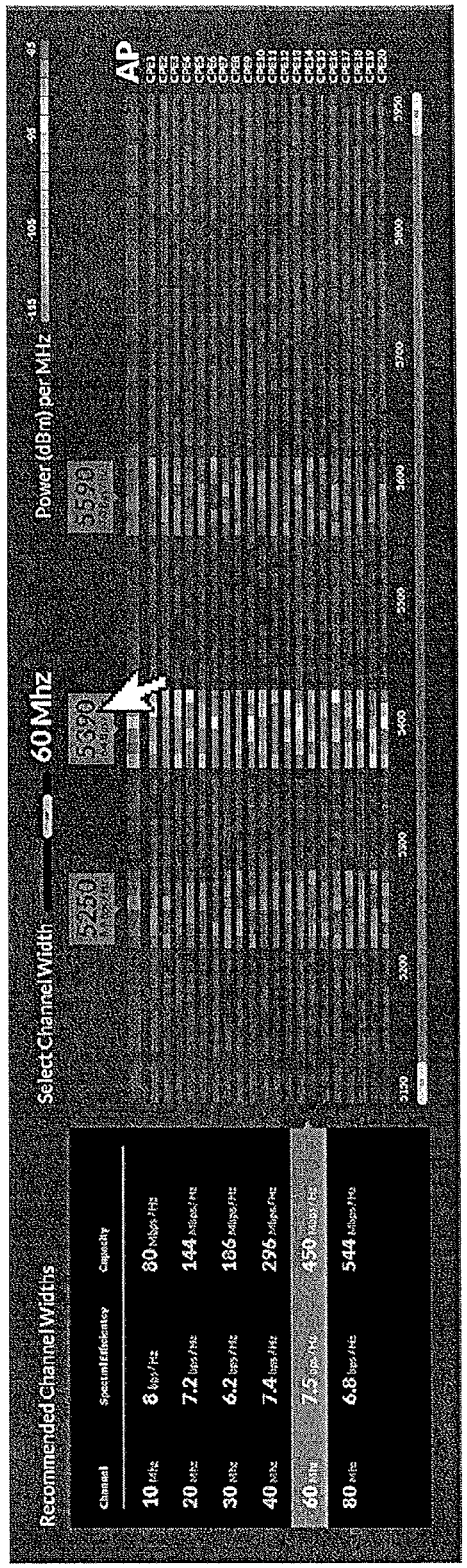
FIG. 27 is another example of the AP tool for optimizing the channel selection shown in FIGS. 25 and 26 with a different channel width (e.g., 60 MHz) selected.
Figure 28:
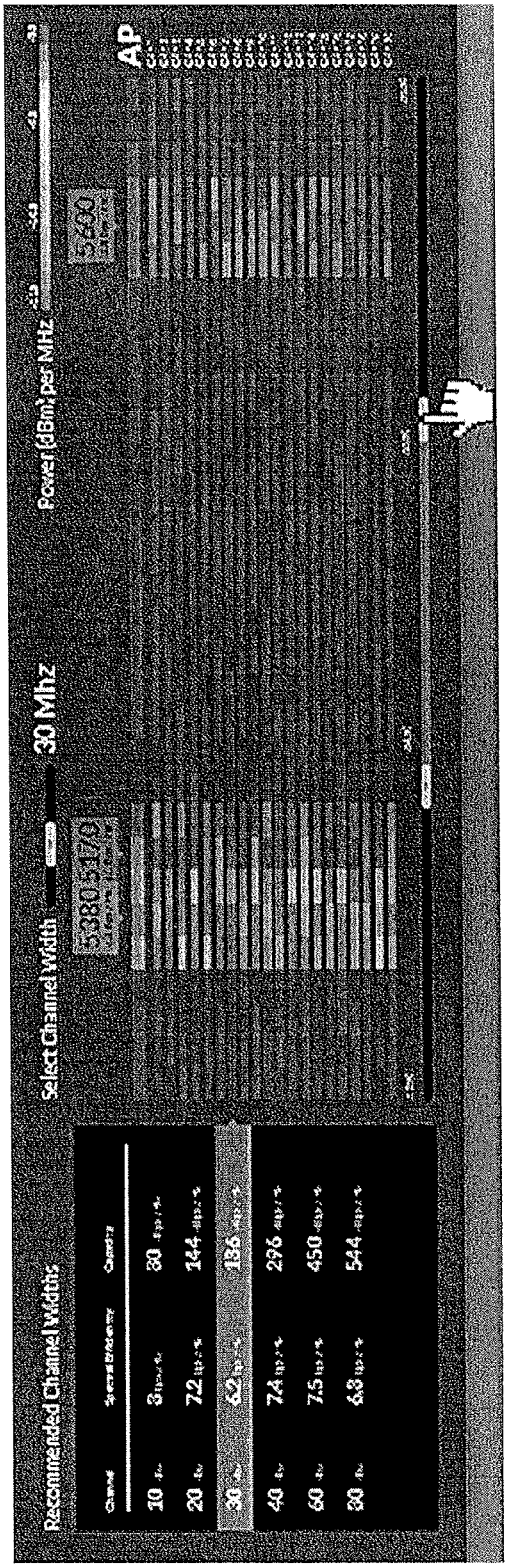
FIG. 28 is another example of the AP tool shown in FIGS. 25-27, with a selected channel width of 30 MHz and a narrower frequency range to optimize over.

FIG. 27 illustrates the selection of a different channel width (e.g., 60 MHz), which results in different top spectrally efficient channels (e.g., 5590, with 7.5 Bps/Hz, 5250, with 6.9 Bps/Hz, and 5390, with 6.4 Bps/Hz). As mentioned above, the frequency range over which the optimization is performed may also be modified, as shown in FIG. 28, in which the sliders at the bottom of the frequency range may be adjusted to narrow or expand the frequency range.

Figure 29:
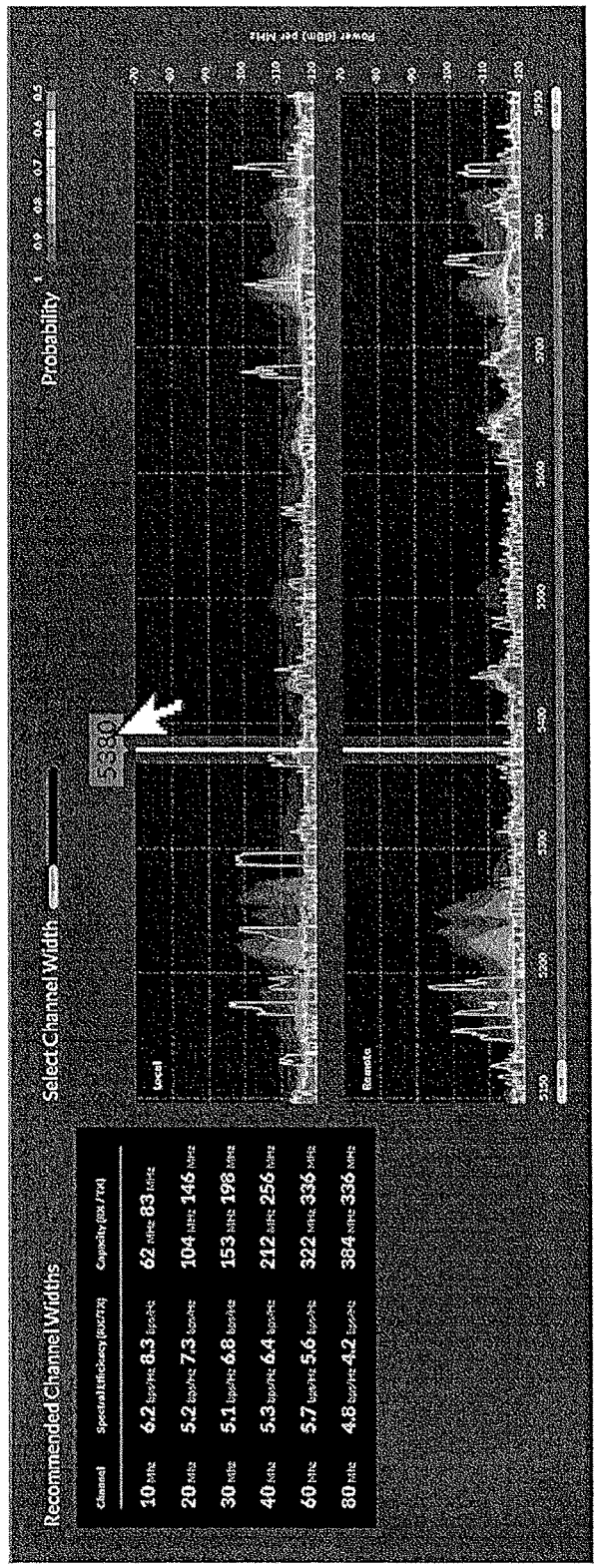
FIG. 29 is an example of an AP tool (graphical output) for an AP that is configured to optimize channel selection. In this example, the AP is operating in a point-to-point (PTP) configuration. In this example, the AP outputs a pair of graphs showing the local frequency spectral information for the AP (top, local) and the device it is communicating with (bottom, remote). The tool is otherwise similar to the variation shown in FIG. 25.
Figure 30:
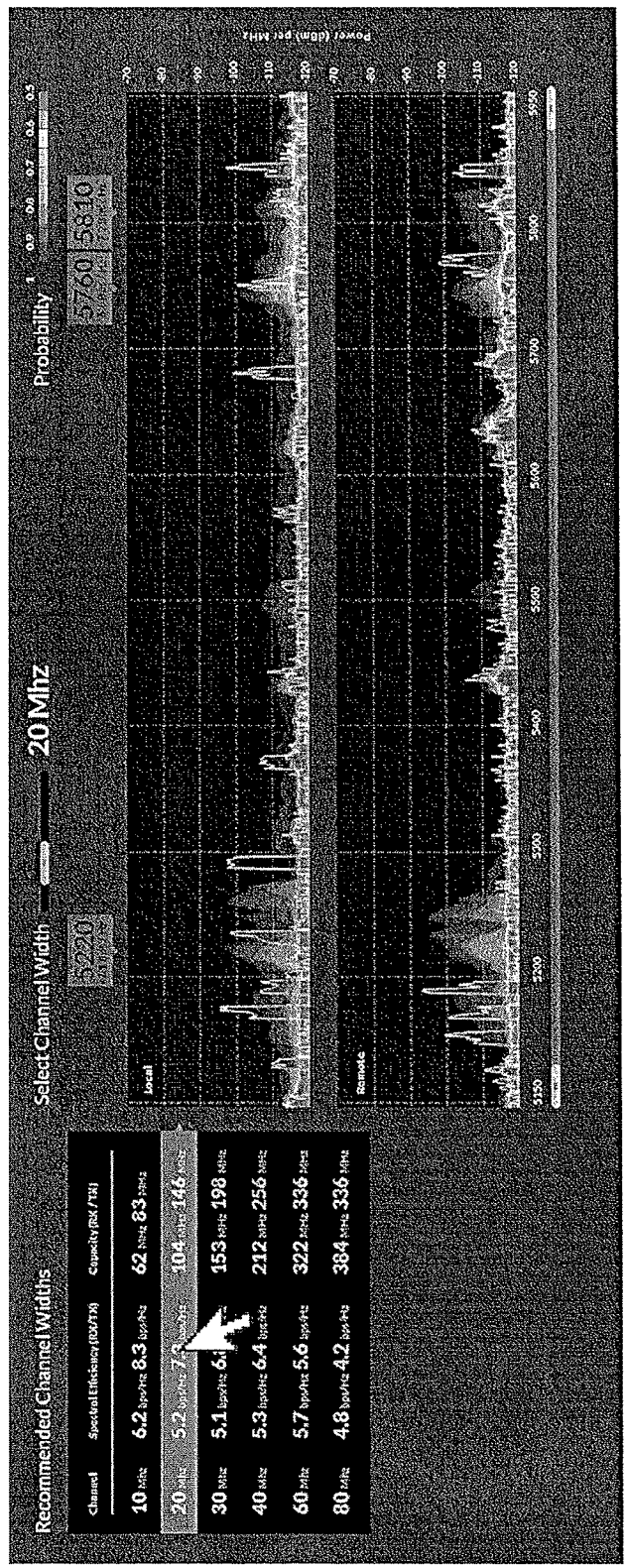
FIG. 30 illustrates another example of the apparatus of FIG. 29, in which the channel width has been selected, and the top three channels having the highest spectral efficiency for this bandwidth indicated.
Figure 31:
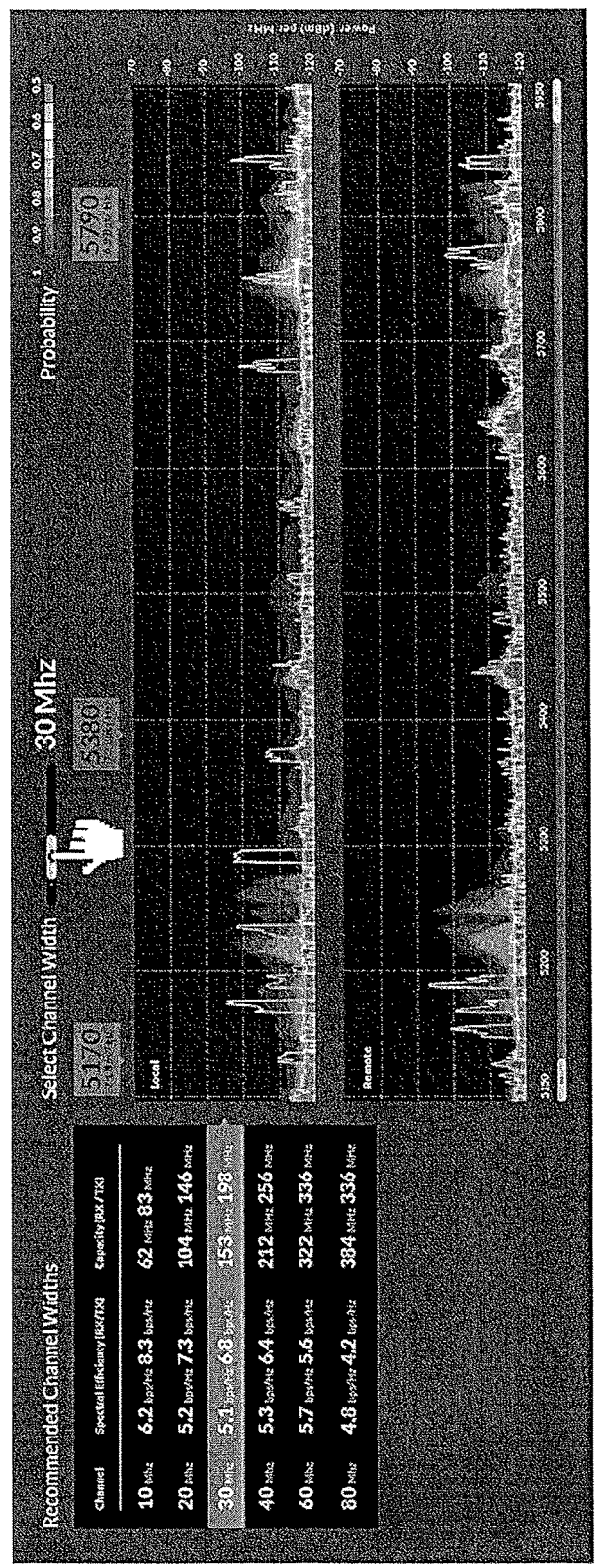
FIG. 31 is another example of the apparatus of FIG. 29, showing selection of a different channel width (e.g., 30 Mhz) resulting in different optimized channels.
Figure 32:
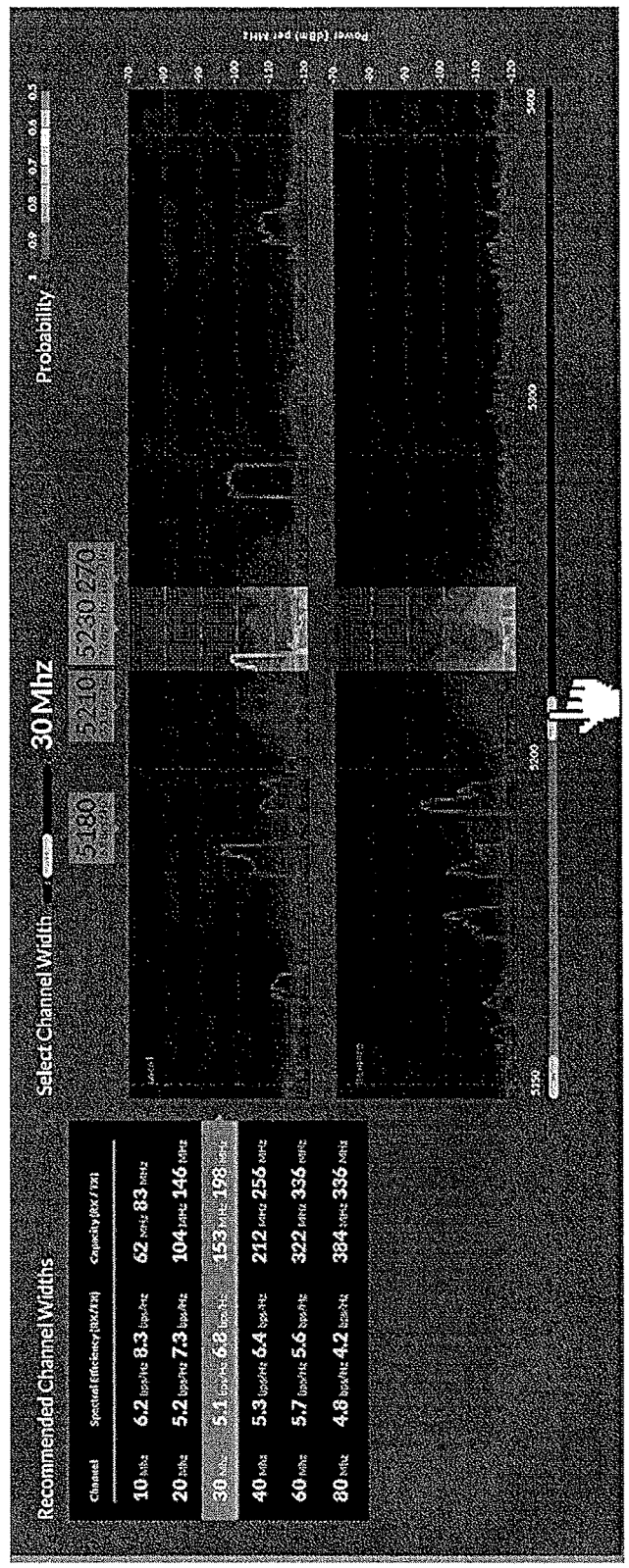
FIG. 32 is another example of the apparatus of claim 30, illustrating the selection of a narrower frequency band to optimize over (similar to the point-to-multipoint example shown in FIG. 28).

FIGS. 24-28 illustrate the tool for an access point that is configured as a point to multipoint (PTMP) device. These apparatuses, tools and methods may also be used with point to point (PTP) devices, as shown in FIG. 29. In this example, the access point device may be instead configured as a PTP device and the local and remote devices properties may be displayed, including a local frequency spectral information shown as actual spectrograms. The remote device spectrogram is shown on the bottom and the local on the top. Again, a heat map may indicate the probability of the frequency having an energy level as shown by the line (which may be an average energy level, or some other metric for that frequency). The tool is otherwise the same, and functions as described above. For example, as shown in FIG. 30, a 20 MHz channel bandwidth may be selected, and the resulting top three spectral efficiencies may be determined (e.g., 5810, with 7.2 Bps/Hz; 5220, with 7.1 Bps/Hz; and 5760 with 6.8 Bps/Hz). FIG. 31 shows the shift to a different channel bandwidth (e.g., 30 MHz) and the resulting shift in the highest spectral efficiencies. Similarly, FIG. 32 illustrates the selection of a narrower range of frequencies to optimize over.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of monitoring a wireless network, the method comprising:
   establishing link between a first radio device and a second radio device;
   periodically transmitting a plurality of sounding packets from the first radio device, wherein each of the plurality of sounding packets are transmitted in a different modulation type;
   receiving at least some of the plurality of sounding packets at the second radio device;
   determining estimated error vector magnitude (EVM) information based on a carrier-to-interference noise ratio from the received at least some of the plurality of sounding packets;
   aggregating the determined estimated error vector magnitude information for a predetermined period of time; and
   displaying an animated constellation diagram by generating pseudo-EVM data points based on the aggregated estimated error vector magnitude information, wherein the pseudo-EVM data points are determined within a standard deviation of the estimated error vector magnitude information.

2. A method of monitoring a wireless network, the method comprising:
   transmitting a plurality of sounding packets from a first radio device, wherein each of the plurality of sounding packets are transmitted in a different modulation type;
   receiving at least some of the plurality of sounding packets at a second radio device;
   determining estimated error vector magnitude (estimated EVM) information based on a carrier-to-interference noise ratio from the received at least some of the plurality of sounding packets; and
   displaying an animated constellation diagram by generating pseudo-EVM data points based on the estimated EVM information, wherein the pseudo-EVM data points are determined within a standard deviation of the estimated error vector magnitude information.

3. The method of claim 2, wherein transmitting the plurality of sounding packets from the first radio device comprises transmitting 3 or more sounding packets, wherein each of the three or more sounding packets are transmitted in a different modulation type.

4. The method of claim 2, further comprising selecting the modulation type of the constellation diagram based on the received sounding packets.

5. The method of claim 2, wherein transmitting the plurality of sounding packets from the first radio device comprises transmitting 3 or more sounding packets, wherein each of the three or more sounding packets are transmitted in a different modulation type selected from the group consisting of: BPSK, QPSK, 16QAM, 64QAM, 256QAM and 1024QAM.

6. The method of claim 2, wherein transmitting the plurality of sounding packets from the first radio device comprises repeatedly and sequentially transmitting sounding patents in each of three of more different modulation types.

7. The method of claim 2, wherein each sounding packet encodes estimated error vector magnitude (estimated EVM) information.

8. The method of claim 2, wherein determining estimated error vector magnitude (estimated EVM) information from the received at least some of the plurality of sounding packets comprises selecting the estimated error vector magnitude information from the received at least some of the plurality of sounding packets based on the highest-order modulation type received by the second radio device.

9. The method of claim 2, wherein displaying one or both of the constellation diagram and the histogram based on the estimated error vector magnitude information comprises displaying both the constellation diagram and the histogram.

10. The method of claim 2 wherein displaying an animated constellation diagram by generating pseudo-EVM data points comprises updating the constellation diagram by generating new pseudo-EVM data points based on the estimated EVM information before determining new estimated EVM information from received at least some of the plurality of sounding packets.

11. The method of claim 2, wherein transmitting the plurality of sounding packets from the first radio device comprises transmitting 3 sounding patents comprising BPSK, 16QAM, and 256QAM.

12. A wireless device configured to optimize modulation type when wirelessly communicating, the device comprising:
    a wireless radio;
    an antenna; and
    a controller coupled to the wireless radio and configured to receive a plurality of sounding packets wherein at least some of the sounding packets have been modulated with different modulation types, wherein the controller is configured to determine an estimated error vector magnitude (estimated EVM) information based on a carrier-to-interference noise ratio from the received at least some of the plurality of sounding packets, wherein the controller is further configured to generate an animated constellation diagram by generating pseudo-EVM data points based on the estimated EVM information and updating the constellation diagram by generating new pseudo-EVM data points based on the estimated EVM information before determining new estimated EVM information from received at least some of the plurality of sounding packets; and
    an output coupled to the controller and configured to output the animated constellation diagram.

13. The device of claim 12, wherein the controller is further configured to transmit a second plurality of sounding packets from the wireless radio and antenna, wherein at least some of the sounding packets of the second plurality of sounding packets are transmitted in different modulation types.

14. The device of claim 12, wherein the controller is configured to receive at least three or more sounding packets, wherein each of the three or more sounding packets are transmitted in a different modulation type.

15. The device of claim 12, wherein the controller is configured to receive the plurality of sounding packets, wherein the sounding packets are transmitted in different modulation types selected from the group consisting of: BPSK, QPSK, 16QAM, 64QAM, 256QAM and 1024QAM.

16. The device of claim 12, wherein the controller is configured to receive the plurality of sounding packets that are repeatedly and sequentially transmitted in each of three of more different modulation types.

17. The device of claim 12, wherein the controller is configured to receive sounding packets that encode estimated EVM information.

18. The device of claim 12, wherein the controller is configured to determine estimated EVM information from the received plurality of sounding packets by selecting estimated EVM information from the received sounding packets based on the highest-order modulation type received by the device.

19. The device of claim 12, wherein the controller is configured to output both of the constellation diagram and the histogram.

20. The device of claim 12, wherein the controller is further configured to output the animated constellation diagram wherein the pseudo-EVM data points are within a standard deviation of the estimated error vector magnitude information.

* * * * *